(12) United States Patent
Roach et al.

(10) Patent No.: US 12,269,209 B2
(45) Date of Patent: *Apr. 8, 2025

(54) SYSTEMS AND METHODS FOR ADDITIVE MANUFACTURING OF A GOLF CLUB

(71) Applicant: Cobra Golf Incorporated, Carlsbad, CA (US)

(72) Inventors: Ryan L. Roach, Encinitas, CA (US); Cameron J. Day, Vista, CA (US); Bryce W. Hobbs, Escondido, CA (US)

(73) Assignee: Cobra Golf Incorporated, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,759

(22) Filed: Feb. 8, 2024

(65) Prior Publication Data

US 2024/0239041 A1  Jul. 18, 2024

Related U.S. Application Data

(63) Continuation of application No. 18/102,283, filed on Jan. 27, 2023, which is a continuation of application No. 16/852,327, filed on Apr. 17, 2020, now Pat. No. 11,618,213.

(51) Int. Cl.
| | | |
|---|---|---|
| *B29C 64/153* | (2017.01) |
| *A63B 53/04* | (2015.01) |
| *B22F 10/38* | (2021.01) |
| *B22F 10/40* | (2021.01) |
| *B22F 10/68* | (2021.01) |
| *B29C 64/40* | (2017.01) |
| *B29L 31/52* | (2006.01) |
| *B33Y 10/00* | (2015.01) |
| *B33Y 80/00* | (2015.01) |

(52) U.S. Cl.
CPC ............ *B29C 64/153* (2017.08); *A63B 53/04* (2013.01); *B22F 10/38* (2021.01); *B22F 10/40* (2021.01); *B22F 10/68* (2021.01); *A63B 2053/0491* (2013.01); *B29C 64/40* (2017.08); *B29L 2031/5227* (2013.01); *B33Y 10/00* (2014.12); *B33Y 80/00* (2014.12)

(58) Field of Classification Search
CPC ................ B29C 63/486; B29C 66/742; B29C 2043/108; B29C 64/153
See application file for complete search history.

(56) References Cited

U.S. PATENT DOCUMENTS

2014/0274458 A1* 9/2014 Kronenberg ........... A63B 60/46
700/106

* cited by examiner

*Primary Examiner* — Stella K Yi
(74) *Attorney, Agent, or Firm* — Quarles & Brady LLP

(57) ABSTRACT

A process of manufacturing a golf club component includes spreading a thin layer of metal powder over a build plane defined over a build platform and bonding, using a laser, portions of the thin layer of metal powder. The spreading and bonding are repeated until the golf club component is formed. The golf club component comprises a lattice structure positioned within an internal cavity of the golf club component and the lattice structure is interrupted by a solid portion that extends along a bottom side of the golf club component from a toe region of the golf club component to a location between the toe region and a heel region of the golf club component.

20 Claims, 46 Drawing Sheets

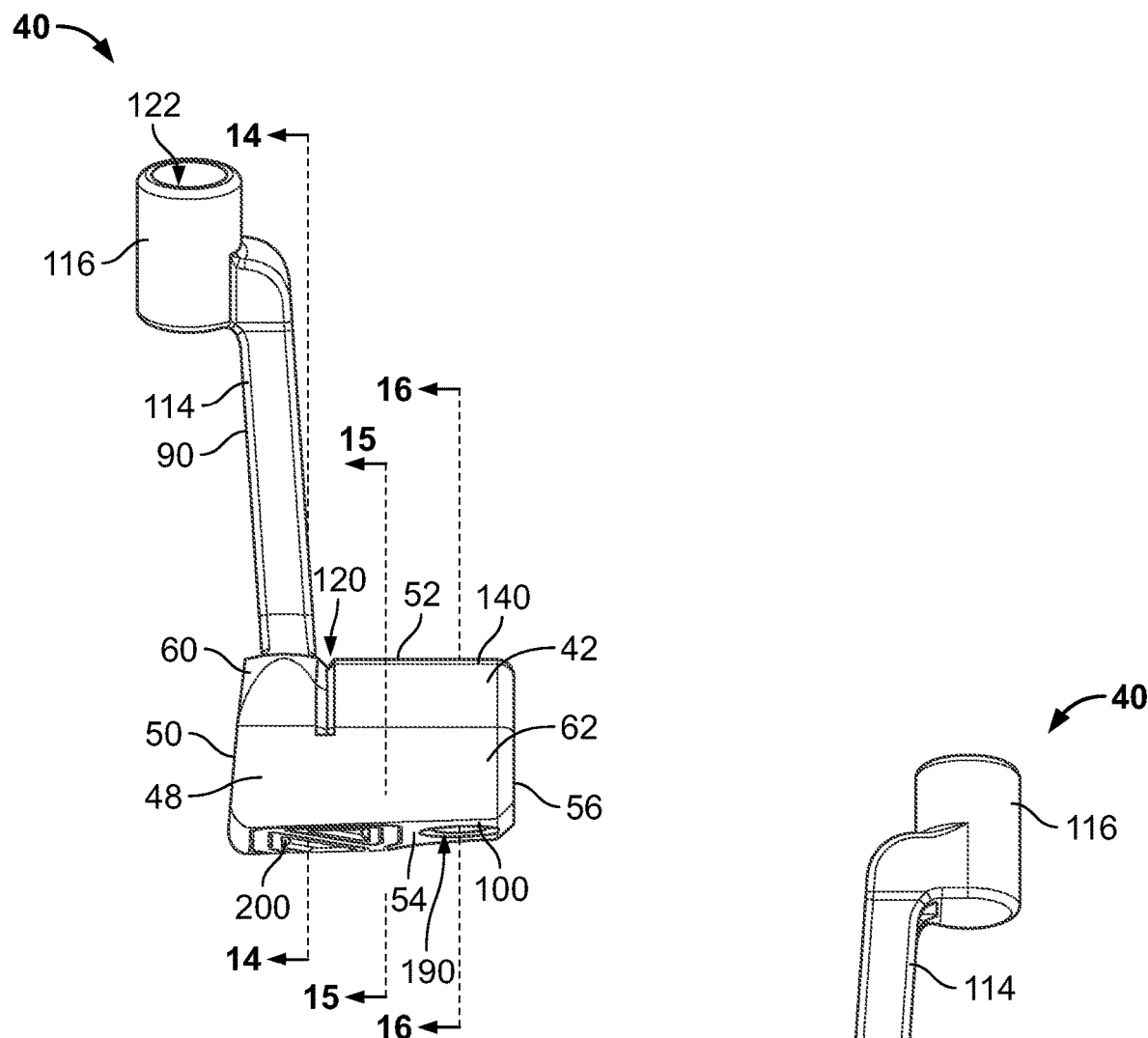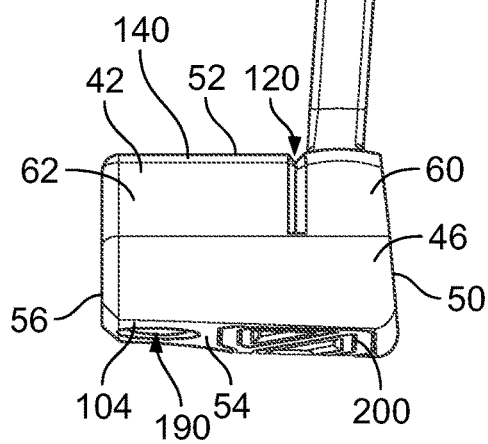

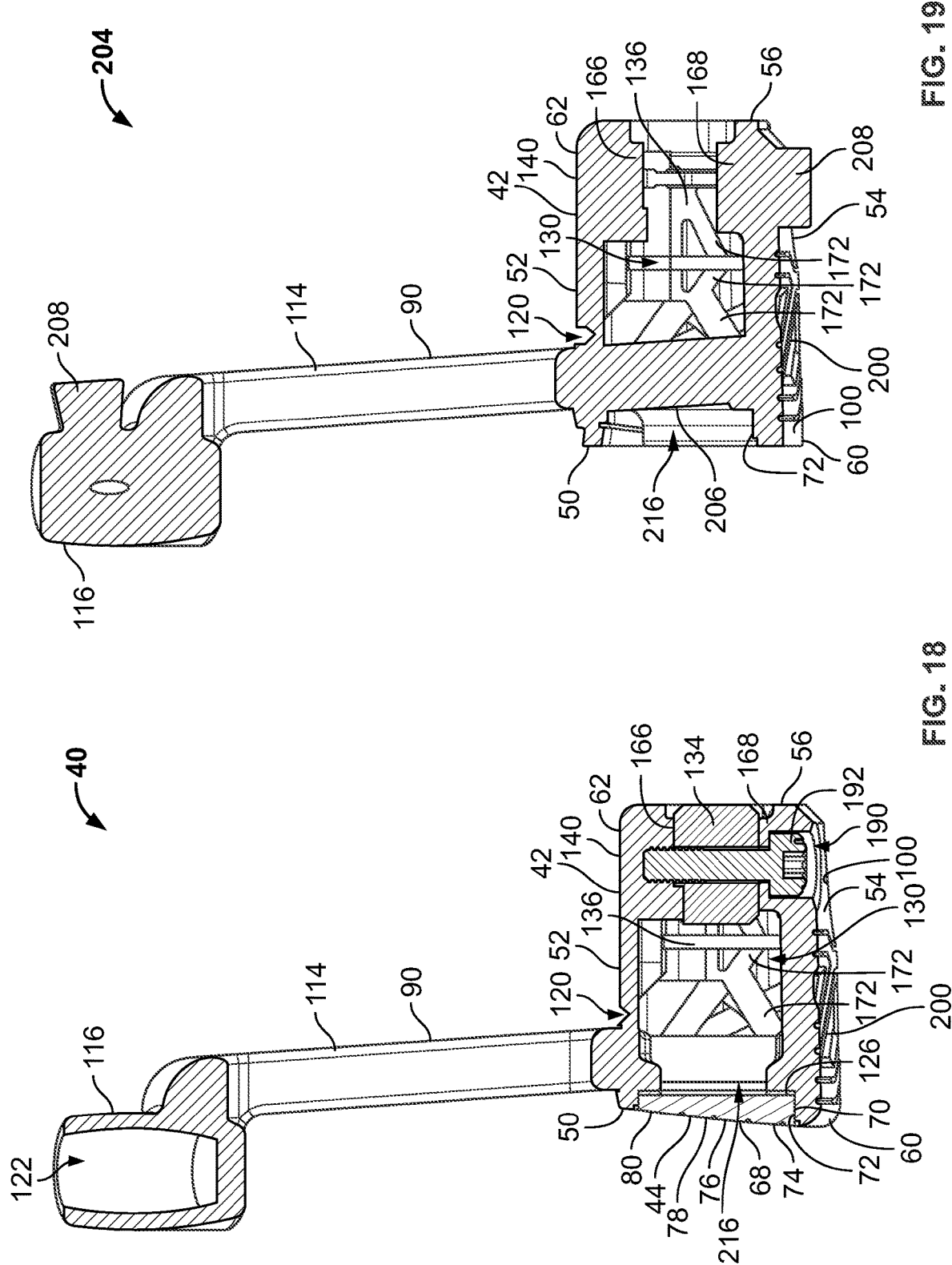

SYSTEMS AND METHODS FOR ADDITIVE MANUFACTURING OF A GOLF CLUB

CROSS REFERENCE TO RELATED APPLICATIONS

This application is a continuation of U.S. application Ser. No. 18/102,283, filed on Jan. 27, 2023, which is a continuation of U.S. application Ser. No. 16/852,327, filed on Apr. 17, 2020, and issued as U.S. Pat. No. 11,618,213, each of which is incorporated by reference herein in its entirety.

REFERENCE REGARDING FEDERALLY SPONSORED RESEARCH OR DEVELOPMENT

Not applicable.

SEQUENCE LISTING

Not applicable.

BACKGROUND

1. Field of the Disclosure

The present disclosure relates to golf clubs, and more specifically to a golf club head that is manufactured via 3D printing or another type of additive manufacturing technique.

2. Description of the Background of the Disclosure

Different types of golf clubs (e.g., irons, drivers, fairway woods, utility irons, hybrid irons/woods, putters, etc.) are used to effect different types of shots, based on a golfer's location and ball lie when playing a hole on a golf course. Typically, conventional golf club heads are formed by a forging process, a casting process, a metal injection molding process, or a machined process (e.g., milling), and then machined, ground, and/or polished to a factory finish standard (e.g., dimensions, loft, lie, weight, offset, surface finish, aesthetics, etc.).

Forging and casting processes require the use of a mold to provide the general shape or body of a golf club head, which significantly reduces the ability of a golf club head to be customized or tailored to a specific set of performance characteristics. For example, the mold used in a forging or casting process may generally define where a center of gravity (CG) will be arranged for the golf club head. Post-forming machining may be implemented to remove material and slightly alter a location of the CG, but the design of the mold is the limiting factor for CG location flexibility.

In addition, conventional golf club head manufacturing processes are limited from a geometric perspective by not being able to readily produce club heads with complex geometries. For example, golf club heads with undercut or hollow constructions may be required to be formed via a casting mold, which places volume-based constraints on CG location. Further, the geometric limitations of conventional golf club head manufacturing processes do not enable club heads to be manufactured with properties that leverage advantages from various club head types. For example, a large-volume, hollow construction club head generally provides a higher moment of inertia (MOI) when compared to a low-volume, forged club head (e.g., muscle back), but the low-volume forged club head may provide more consistent launch conditions and distance variability. Conventional club head manufacturing processes are limited to leveraging one set of advantages based on the type of club head being manufactured.

Therefore, a need exits for golf club heads that are modifiable or customizable, and that can leverage performance advantages from a variety of club head types in a single club head without the restrictions present in conventional golf club head manufacturing processes.

SUMMARY

The present disclosure is directed to golf club heads constructed using 3D printing or another type of additive manufacturing technique.

In some embodiments, the present disclosure provides a golf club head that includes a body, a solid portion, and a lattice structure. The body includes a topline, a sole, and an internal cavity arranged between the topline and the sole. The solid portion is arranged within the internal cavity and is fabricated from a solid material. The lattice structure is arranged within the internal cavity and is formed layer by layer via an additive manufacturing process. The lattice structure defines a lattice volume and the solid portion defines a solid volume. An orientation of the lattice structure between the topline and the sole and a volume ratio between the lattice volume and the solid volume define a location of a center of gravity defined by the body In some embodiments, the present disclosure provides a golf club head including a body and a lattice structure. The body includes a topline, a sole, and a front face. The lattice structure is formed on a portion of the body layer by layer along a build plane via an additive manufacturing process. When the build plane is oriented parallel to a normal defined by the front face, a lattice build angle defined between a lattice plane and the build plane is greater than or equal to about 30 degrees.

In some embodiments, the present disclosure provides a golf club head including a body and a lattice structure. The body includes a topline, a sole, and a front face. The front face defines a rear surface that extends along a plane and the body defines a solid center of gravity plane. The lattice structure is formed on a portion of the body layer by layer via an additive manufacturing process. The portion of the body is bounded by the plane, the solid center of gravity plane, and an intersection between the plane and the solid center of gravity plane.

In some embodiments, the present disclosure provides a golf club head that includes a body and a lattice structure. The body includes an insert wall, a crown, a sole, a heel, and a toe. A head cavity is defined by the crown, the sole, the heel, and the toe. The lattice structure is disposed within the head cavity and extends from the crown and the sole. The lattice structure is unitary with the body.

In some embodiments, the present disclosure provides a golf club head that includes a body and a lattice structure. The body includes an insert wall, a crown, a sole, a heel, and a toe. A head cavity is disposed within the body. The lattice structure is disposed within the head cavity and includes segments that extend from the crown and the sole. The lattice structure and the hosel are unitary with the body.

In some embodiments, the present disclosure provides a 3-D printed golf club head post-printed component that includes a body, one or more material deposits, and a lattice structure. The body includes an insert wall, a crown, a sole, a heel, and a toe. A head cavity is disposed within the body. The one or more material deposits extend from one or more of the body and the hosel. The lattice structure is disposed within the head cavity and extends from internal surfaces of the body. The lattice structure and the hosel are unitary with the body.

In some embodiments, the present disclosure provides a process of manufacturing a golf club head including the step of generating, via an additive manufacturing process, a golf club head. Generating the golf club head includes the steps of printing a first material, layer by layer, along a first plane, and creating a first blow through aperture that allows air to pass from a front portion of the golf club head to a head cavity disposed within a rear portion of the golf club head. The process further includes the steps of blowing excess material out from within the head cavity using the first blow through aperture and removing excess material formed at one or more material deposits disposed along the golf club head.

In some embodiments, the present disclosure provides a process of manufacturing a golf club head including the step of generating, via an additive manufacturing process, a golf club head. Generating the golf club head includes the steps of printing a first material, layer by layer, to create a body defining a sole, a toe portion, a medial portion, a heel portion, and a head cavity, and creating a first blow through aperture that allows air to pass from a front portion of the golf club head to a rear portion of the club head component. The process further includes blowing excess material out from within the head cavity using the first blow through aperture.

In some embodiments, the present disclosure provides a process of manufacturing a golf club head including the step of generating, via an additive manufacturing process, a golf club head. Generating the golf club head includes the steps of printing a first material, layer by layer, along a first plane, and creating a first blow through aperture that allows air to pass from a front portion of the golf club head to a head cavity disposed within a rear portion of the golf club head. The process further includes sintering the golf club head by setting the golf club head into a furnace such that the golf club head is resting on a second plane that defines an angle of between 10 degrees and about 50 degrees with respect to the first plane.

In some embodiments, the present disclosure provides a process of manufacturing a golf club head that includes the steps of forming, via an additive manufacturing process, a body of the golf club head by printing, layer by layer, a boundary that encloses a volume and is formed by at least one layer, and sintering the body to form a solid material within the volume.

In some embodiments, the present disclosure provides a process of manufacturing a golf club head that includes the steps of forming, via an additive manufacturing process, a body of the golf club head. Forming the body of the golf club head includes the steps of creating a cavity arranged within the body, printing a plug within the cavity that is separated from internal surfaces defined by the cavity, removing excess material within the cavity, moving the plug to a desired location within the cavity, filling the cavity with a filler material.

In some embodiments, the present disclosure provides a process of manufacturing a face insert of a golf club head that includes the steps of forming via an additive manufacturing process, a mold insert, creating a mold from the mold insert formed via the additive manufacturing process, and molding an insert from the mold insert. The mold insert includes a lattice structure or a ribbed structure protruding therefrom.

In some embodiments, the present disclosure provides a process of manufacturing a golf club head that includes the steps of forming, via an additive manufacturing process, a body of the golf club head, arranging the body on a sintering support including a face surface and a hosel surface, and sintering the body of the golf club head.

In some embodiments, the present disclosure provides a golf club head that includes a body formed layer by layer and having a topline, a sole, and an internal cavity arranged between the topline and the sole. The golf club head further includes at least one aperture formed through at least one of a hosel extending from the body, a rear surface of the body, and a toe portion of the body. The at least one aperture is configured to form a flow path that extends along the internal cavity and the at least one aperture.

In some embodiments, the present disclosure provides a sintering support for a golf club head. The golf club head includes a front face and a hosel. The sintering support includes a face surface, a hosel surface that extends at an angle from one side of the face surface, and a support wall that extends from a side of the face surface opposite to the hosel surface.

BRIEF DESCRIPTION OF THE DRAWINGS

FIG. 5 is left or toe side elevational view of the putter-type club head of FIG. 1;

FIG. 6 is a right or heel side elevational view of the putter-type club head of FIG. 1;

FIG. 18 is a side cross sectional view taken through line 18-18 of FIG. 3;

FIG. 19 is a side cross sectional view taken through line 19-19 of FIG. 11;

DETAILED DESCRIPTION OF THE DRAWINGS

Figure 1:
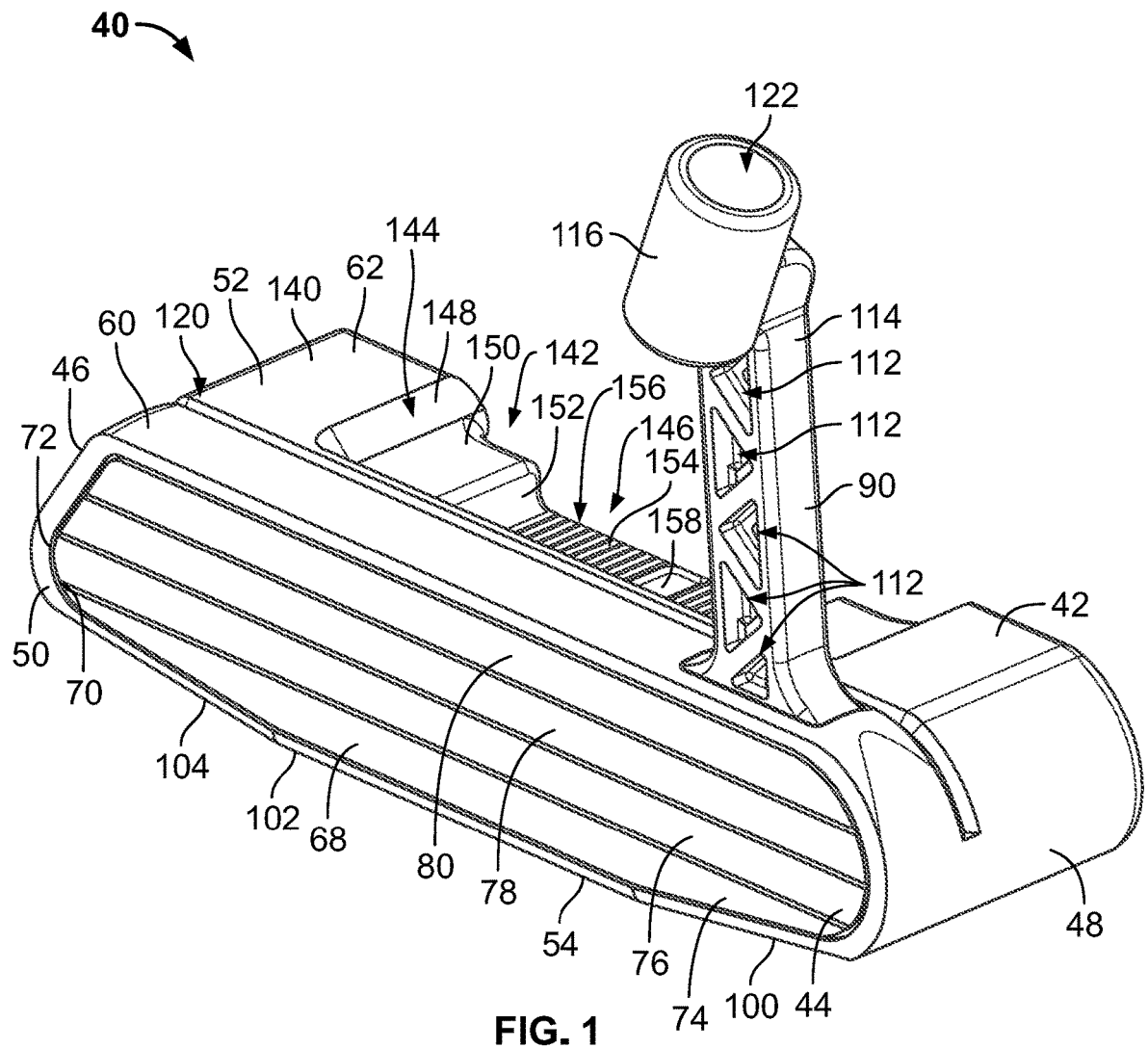
FIG. 1 is a top, front, and left side isometric view of a putter-type club head in accordance with the present disclosure.

The present disclosure is directed to golf club heads that are produced using an additive manufacturing process (i.e., printed layer by layer). In particular, a golf club head of the present disclosure includes a club head body that is manufactured using an additive manufacturing process and may be fabricated from a metal material or a metal alloy. In some embodiments, the club head body may include a segmented or lattice portion that is created during the additive manufacturing process and, therefore, is formed integrally with the club head body (i.e., the lattice portion and the club head body are a unitary component). In general, the incorporation of a segmented or lattice portion enables various material and/or performance characteristics of a golf club head to be selectively manipulated to achieve, for example a desired CG locations, MOI's, mass properties, face flex, distance variability, launch conditions, aesthetics, among other things.

The use of the terms "segmented portion," "lattice portion," or "lattice structure," herein refer to portions of a golf club head that are formed by one of a plurality of interconnected segments, interconnected shapes, or connected surfaces. In some embodiments, the plurality of interconnected segments, interconnected shapes, or connected surfaces may be formed integrally with a club head body by an additive manufacturing process. In some embodiments, the lattice portion may define at least one cutout, or absence of material, that is formed within a unit cell (e.g., a repeated pattern defined by the lattice structure). The use of a lattice portion within a golf club head may allow various manufacturing and performance characteristics to be modified or customized. For example, a lattice portion may define a substantially reduced weight or density when compared to a solid material. As such, the placement of a lattice portion within a golf club head may be varied using an additive manufacturing process to selectively locate the CG of a golf club head in a desired location. In addition, the incorporation of a lattice portion into a golf club head may reduce the overall volume of material needed to manufacture the golf club head.

The golf club heads disclosed herein may be manufactured using one or more of a variety of additive manufacturing processes. For example, a golf club head according to the present disclosure may be at least partially fabricated using a metal powder bed fusion additive manufacturing processes that fuses, melts, or bonds metal powder particles layer by layer along a build plane. In some embodiments, the metal powder particles may be melted or fused by a laser that forms cross-sections of a golf club head layer by layer along a build plane. In some embodiments, the metal powder particles may be melted or fused by an electron beam or ultrasonic energy to form cross-sections of a golf club head layer by layer along a build plane. In some embodiments, the metal powder particles may be bonded to form cross-sections of a golf club head layer by layer along a build plane via the deposit (e.g., printing) of a binder.

The various methods of additive manufacturing used to manufacture a golf club heads according to the present disclosure may include binder jetting, direct energy deposition, selective laser melting (SLM), direct metal laser sintering (DMLS), fused deposition modeling (FDM), electron beam melting, laser powered bed fusion (LPBF), ultrasonic additive manufacturing, material extrusion, material jetting, Joule printing, electrochemical deposition, cold spray metal printing, DLP metal printing, Ultrasonic Consolidation or Ultrasonic Additive Manufacturing (UAM), LENS laser-based printing, electron beam freeform fabrication (EBF3), laser metal deposition, or carbon fiber additive manufacturing.

Referring now to FIGS. 1-8, a putter-type club head 40 is shown in accordance with the present disclosure that may be formed through an additive manufacturing process. The club head 40 defines a body 42 and a face insert 44, which may be coupled to one another after machining of the body 42, as will be discussed in greater detail below. The body 42 defines a toe side 46, a heel side 48, a front side 50, a top side or crown 52, a bottom side or sole 54, and a rear side 56. Referring to FIG. 1, the body 42 of the club head 40 is formed from metallic and/or non-metallic materials. For example, the body 42 may be formed from any one of or a combination of aluminum, bronze, brass, copper, stainless steel, carbon steel, titanium, zinc, polymeric materials, and/or any other suitable material.

The body 42 includes a front portion 60 and a rear portion 62, the front portion 60 defining a face insert cavity 64 (see FIGS. 9 and 11), that is configured to receive the face insert 44. The face insert 44 defines a striking surface 68. The striking surface 68 comprises an entirety of the front surface of the face insert 44, and is configured for contacting a golf ball. A peripheral edge 70 of the face insert 44 aligns with an inset edge 72 of the face cavity 64 (see FIG. 9) of the body 42. The striking surface 68 further defines a first surface 74, a second surface 76, a third surface 78, and a fourth surface 80 that define various angles with respect to a plane normal to the ground when the club head 40 is at address. The first surface 74 of the striking surface 68 may define an angle of about 1 degree, the second surface 76 may define an angle of about 2 degrees, the third surface 78 may define an angle of about 3 degrees, and the fourth surface 80 may define an angle of about 4 degrees. However, in come embodiments the surfaces 74, 76, 78, 80 may define different angles, or may define the same angle. To that end, the striking surface 68 may comprise only a single, planar surface that defines a constant angle.

Figure 3:
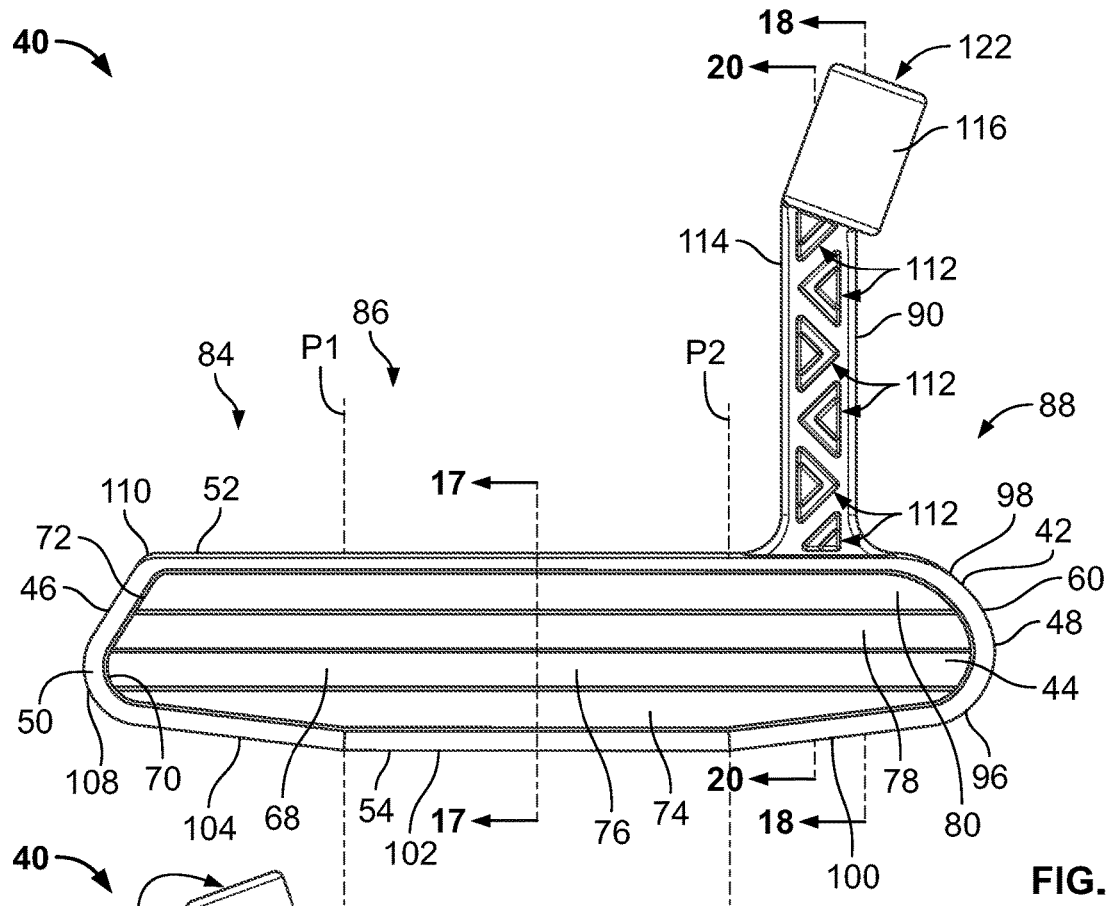
FIG. 3 is a front elevational view of the putter-type club head of FIG. 1.

Referring to FIG. 3, the body 42 defines a toe portion or region 84, a medial portion or region 86, and a heel portion or region 88. The heel region 88 of the body 42 includes a hosel 90 that extends upward therefrom. In some embodiments, the heel region 88 defines an aperture (not shown) that is disposed within the heel region 88, which is configured to receive and secure a shaft (not shown) of the golf club (not shown).

Figure 4:
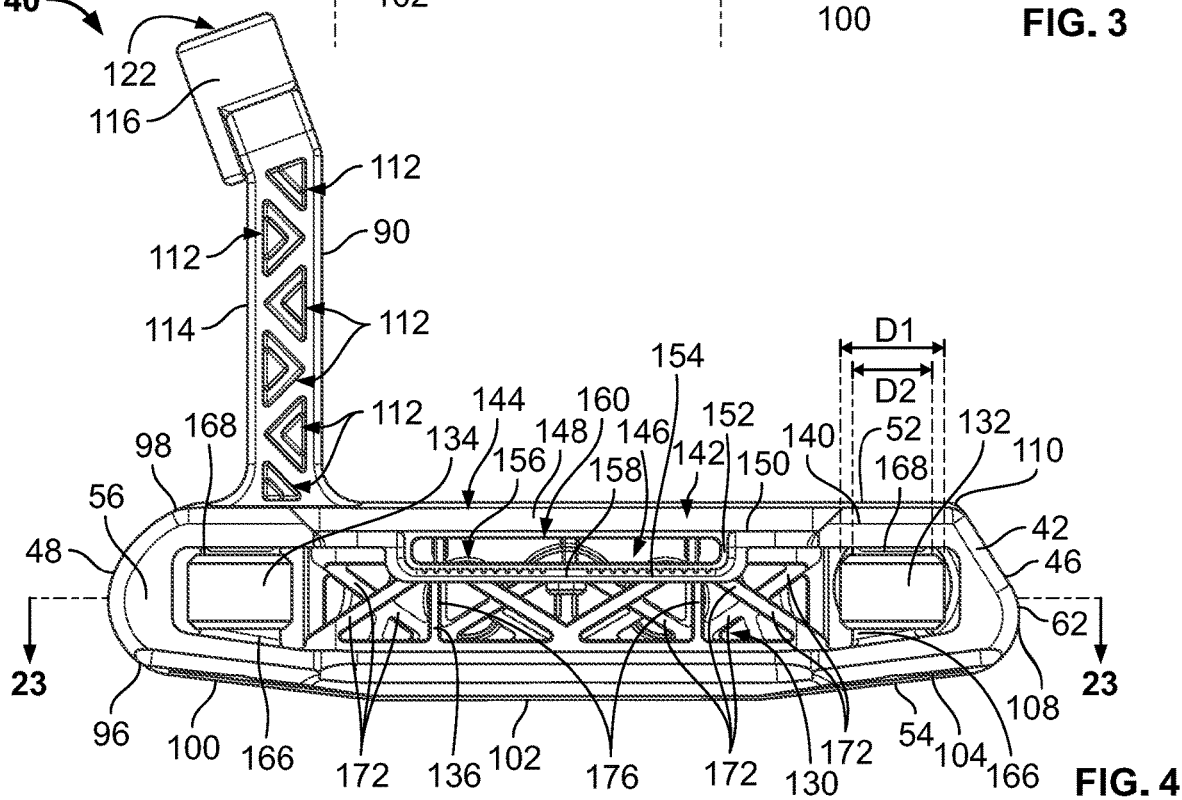
FIG. 4 is a rear elevational view of the putter-type club head of FIG. 1.

Referring specifically to FIGS. 3 and 4, the heel side 48 of the body 42 is rounded and extends from a lower heel-side inflection point 96 to an upper heel-side inflection point 98. The sole 54 of the body 42 intersects with the heel side 48 at the lower heel-side inflection point 96, while the crown 52 of the body 42 intersects with the heel side 48 at the upper heel-side inflection point 98. The sole 54 defines a heel segment 100, a medial segment 102, and a toe segment 104. The heel segment 100 and the toe segment 104 are generally angled and planar when viewed in elevation, while the medial segment 102 connects the toe segment 104 with the heel segment 100 and is generally planar. Further, portions of the medial segment 102 are parallel with respect to the ground (not shown) when the head 40 is at address.

A portion of the toe segment 104 curves upward to a lower toe-side inflection point 108 where the toe segment 104 of the sole 54 intersects with the toe side 46. A portion of the toe side 46 curves upward and inward, in a direction of the hosel 90, and defines a generally straight portion of the toe side 46 that extends to an upper toe-side inflection point 110. The top side 52 intersects with the toe side 46 at the upper toe-side inflection point 110. When viewed from the front, the top side 52 extends laterally from the upper toe-side inflection point 110 to the upper heel-side inflection point 98, and is interrupted by the hosel 90.

Referring to FIG. 3, the toe region 84, the medial region 86, and the heel region 88 are defined by vertical lines or planes P1 and P2 that extend through intersections of the heel segment 100 and the medial segment 102, and the toe segment 104 and the medial segment 102, respectively. The hosel 90 is located within the heel region 88, and extends vertically from the top side 52. In some embodiments, the hosel 90 may be at least partially disposed within the medial region 86. The hosel 90 includes a plurality of cutouts 112 defined within a hosel arm 114, which are generally in the shape of alternating triangles. The cutouts 112 may extend entirely through a width of the hosel 90, or the cutouts 112 may not extend entirely through the hosel 90, i.e., in the present embodiment, the hosel 90 does not include apertures that extend completely through the hosel arm 114. In some embodiments, the cutouts 112 may align on a front and rear of the hosel 90 (see FIGS. 3 and 4). In alternative embodiments, only the front side of the hosel 90 may include the cutouts 112 or only the rear side of the hosel 90 may include the cutouts 112. A shaft bore 116 extends from the hosel 90, the shaft bore 116 being sized and shaped to receive a shaft (not shown), or an element that may be coupled with the shaft.

Referring again to FIG. 1, a surface defining the front region 60 of the top side 52 is generally planar, while surfaces defining the rear region 62 of the top side 52 comprise a plurality of depressions, recesses, and other features. The front region 60 and the rear region 62 of the top side 52 are separated by a seam or groove 120 that extends from the heel side 48 to the toe side 46. However, in embodiments that do not include the seam or groove 120, the front region 60 and the rear region 62 are defined by a plane that extends vertically through the seam 120. A shaft cavity 122 is further shown in FIG. 1, the shaft cavity 122 defining a cylindrical cavity within the shaft bore 116 into which the shaft (not shown) may be inserted. The shaft cavity 116 may be modified or formed to achieve any number of putter shaft positions, including heel, centered, and hosel offset.

Still referring to FIG. 1, the face insert 44 is attached to or press fit within the insert cavity 64 of the body 42. In some embodiments, the face insert 44 is secured and anchored via an interlocking structure (not shown). As provided in the cross-sectional views below, a bonding agent or adhesive 126 (see FIGS. 17 and 23) may be used to help secure the face insert 44 into the face cavity 64. Regardless of the type of retention mechanism used, the face insert 44 is fixed securely within the face cavity 64 of the body 42.

Figure 2:
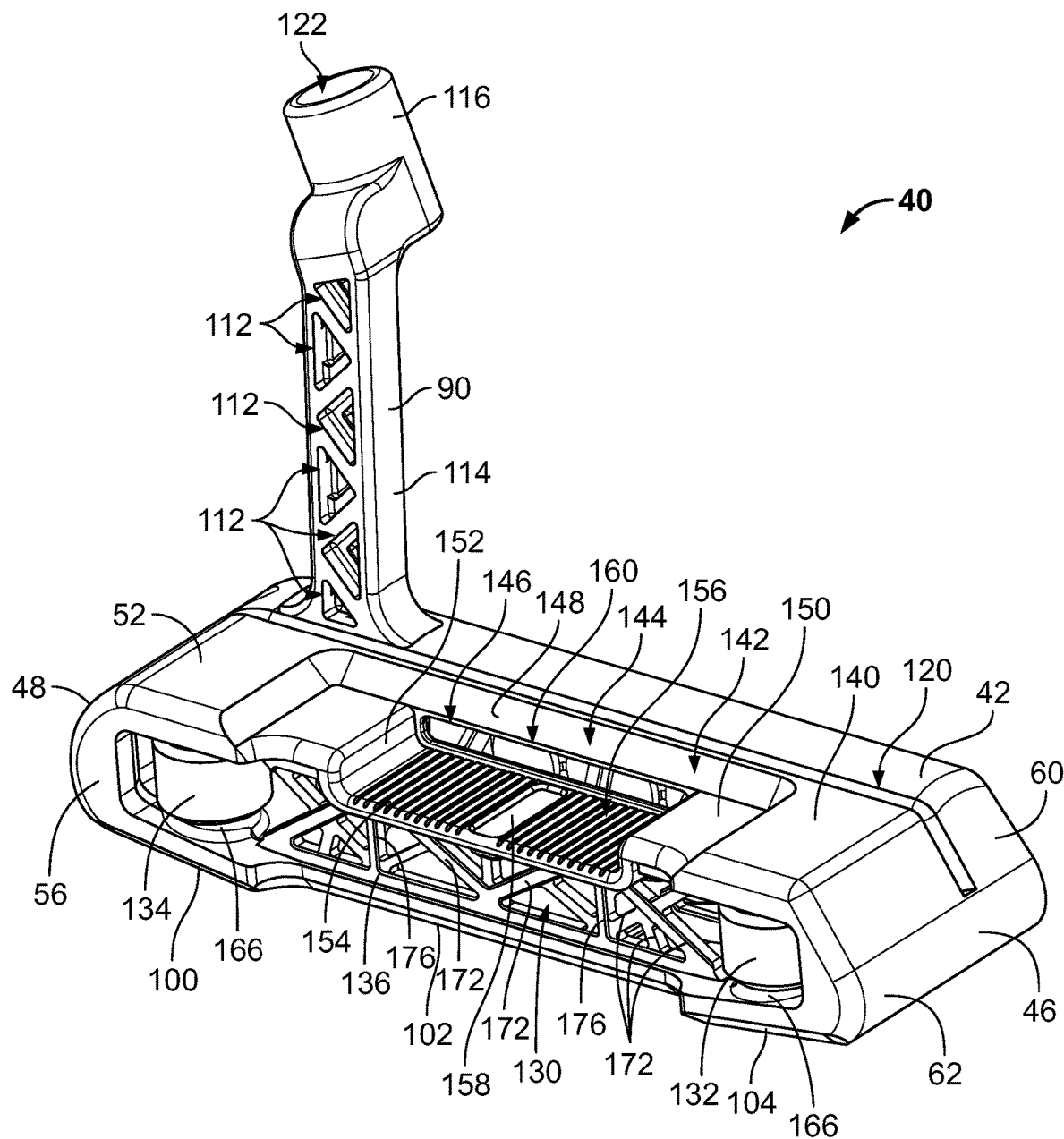
FIG. 2 is a top, rear, and right side of the putter-type club head of FIG. 1.

Referring now to FIG. 2, a rear view of the club head 40 is shown. A head cavity 130 is visible from the rear view, which houses a first weight 132, a second weight 134, and an internal lattice structure 136. In some embodiments, the club head 40 may not include the first weight 132 and the second weight 134. For example, the club head 40 may include solid material, the internal lattice structure 136, or a cavity (i.e., no material) in place of the first weight 132 and the second weight 134. In the illustrated embodiment, the lattice structure 136 is unitary with the body 42, i.e., the lattice structure 136 comprises the same material and is manufactured at the same time as they body 42. The first weight 132 and the second weight 134 are separate components, which may comprise tungsten or another type of metal. The lattice structure 136 is preferably 3D printed with the rest of the body 42. However, in certain embodiments, the lattice structure 136 may comprise a separate cartridge that is insertable into the cavity 130. The first weight 132 is located within the heel region 88, the second weight 134 is located within the toe region 84, and the lattice structure 136 extends across the heel region 88, the toe region 84, and the medial region 86.

Still referring to FIG. 2, the front portion 60 and the rear portion 62 of the club head 40 are shown separated by the groove 120. As noted above, outer sides defining the front portion 60 are generally planar, while the rear portion 62 defines a rear upper side 140 and an inset region 142. The inset region 142 defines a first or upper inset region 144 and a second or lower inset region 146. The upper inset region 144 is defined by a first inset side 148, which is a beveled edge that extends downward from the rear upper side 140 toward the sole 54. A first inset platform 150 extends from portions of the first inset side 148, the first inset platform 150 being generally parallel with respect to the rear upper side 140. The first inset side 148 is generally U-shaped, and defines a periphery of the first inset region 144.

The second inset region 146 is also shown in FIG. 2, the second inset region 146 being defined by second inset sides 152 that are disposed on opposing sides of an alignment platform 154. The alignment platform 154 includes a plurality of alignment notches or features 156. The plurality of alignment features 156 may comprise any number and any type of designs that are sufficient to aid a golfer to align the putter-type golf club head 40 with a cup. In the present embodiment, the alignment features 156 are notches that are three dimensional features; however, in alternative embodiments, the alignment features 156 may be planar features, and may be painted along the alignment platform.

A central alignment feature 158 is disposed centrally along the alignment platform 154, and is configured to allow a golfer to align the putter head 40 with the cup before striking a golf ball (not shown). A window 160 is disposed within the second inset region 146, between the second inset sides 152, the window 160 being an opening that allows for air to enter the cavity 130 above the alignment platform 154. As will be discussed in greater detail below, it is preferable to include blow through apertures along varying portions of a 3D printed putter head to allow excess material to be removed from the putter head 40 during the manufacture thereof, i.e., de-caking. It is for at least this reason that various apertures may be included along portions of the club 40 during at least some stages of the manufacturing process. Any commercial blower or air moving device may be used to blow excess material from within the putter head 40.

In some embodiments, a vacuum may be used to suck excess material from within the putter head 40. In other embodiments, one or more tools including brushes, chisels, picks, or other implements are used to manually remove powder from within the putter head 40. During post-printing processing, excess powder may be vacuumed or blown off of a build box that may include one or more of the putter heads 40. After initially vacuuming or blowing, manual material removal is done to remove excess material from the putter head 40. At this stage, remaining excess powder may be removed with one or more of the above-noted tools.

Still referring to FIG. 2, the profiles of the alignment features 156 may define a variety of shapes or cross sections that are sufficient to delineate the size and shape of the alignment features 156. The alignment features 156 may define shallow grooves in the alignment platform 154, the depths of which may be selected to sufficiently enable application and retention of a paint fill. In some embodiments, the alignment features 156 are filled with a paint or other organic coating that may be distinguished in appearance from its surrounding environment. In some embodiments, the grooves are partially or entirely filled with a material distinguished in appearance from its surrounding environment, e.g., a colored opaque or translucent polymer.

Referring now to FIG. 4, the first and second weights 132, 134, the window 160, the alignment platform 154, the first inset side 148, and the lattice structure 136 are shown in greater detail. The cutouts 112 along the hosel 90 are also visible in the rear view of FIG. 4. The first weight 132 and the second weight 134 are shown snugly disposed between an upper retention feature 166 and a lower retention feature 168. The upper and lower retention features 166, 168 generally define cylindrical portions having voids therebetween that allow the first and second weights 132, 134 to be inserted therein, such that the first and second weights 132, 134 fit snugly between the upper and lower retention features 166, 168. In some embodiments, a lock and key feature (not shown) within the cavity 130 retains the first and second weights 132, 134 in place, so as to prevent undesired rotation of the first and second weights 132, 134.

While the first and second weights 132, 134 are shown having a particular diameter, varying types and sizes of weights are contemplated. In some embodiments, the weights 132, 134 are removable, and may be removed and replaced by a user or a technician. As shown in the figures, the first and second weights 132, 134 define an outer diameter D1 that is identical, and that is larger than an outer diameter D2 of the upper and lower retention features 166, 168. Further, while the first and second weights 132, 134 are shown being disposed entirely within the heel region 88 and the toe region, respectively, it is contemplated that the first and second weights 132, 134 may extend across one or more of the regions 100, 102, 104.

Figure 23:
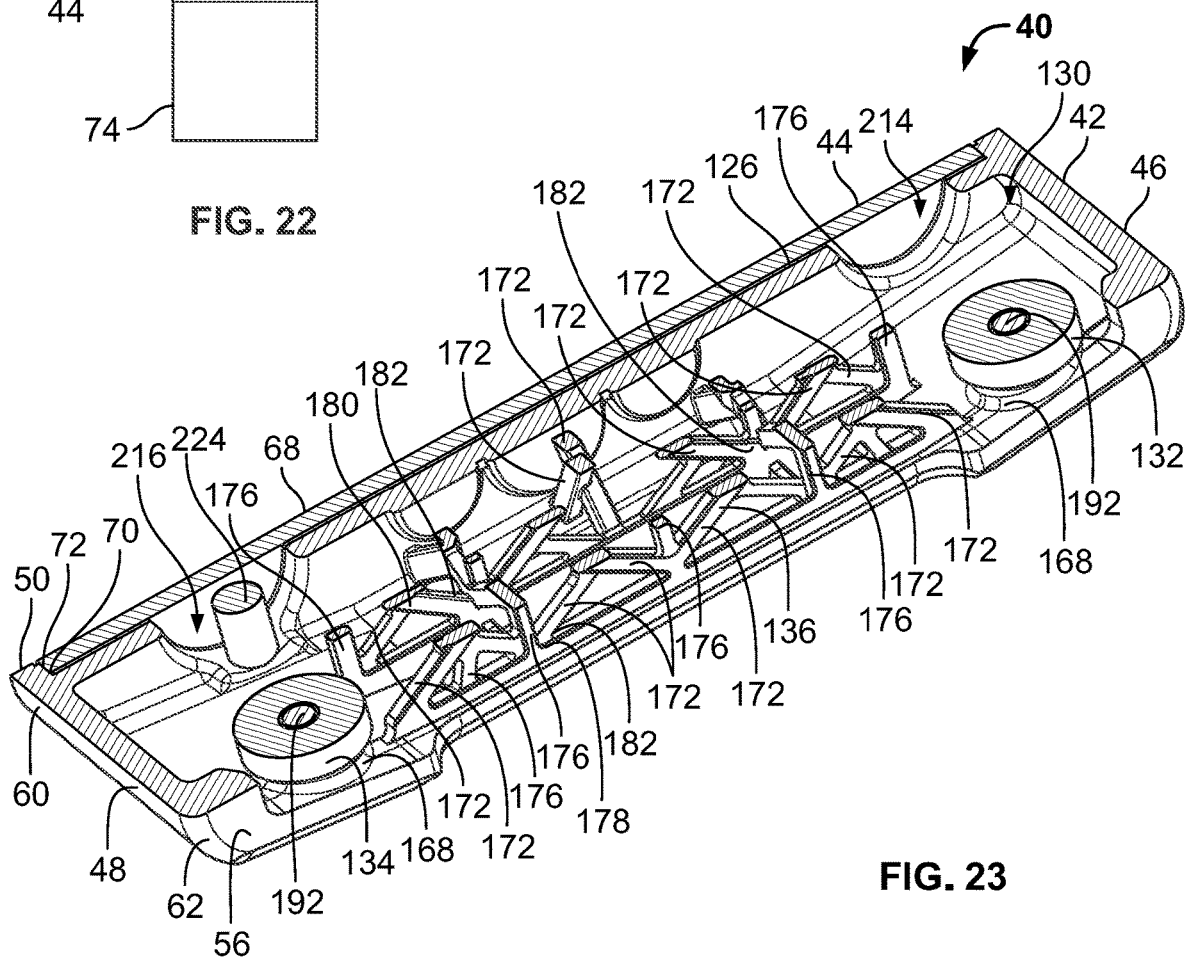
FIG. 23 is a top, rear, and left side isometric view taken through line 23-23 of FIG. 4.

Still referring to FIG. 4, the lattice structure 136 is shown in greater detail. The lattice structure 136 is defined by a plurality of angled segments 172, a plurality of horizontal segments 174, and a plurality of vertical segments 176, which combine to form a plurality of triangles or triangular portions. Air spaces are formed between the plurality of segments 172, 174, 176, which may be filled with a filler material in some embodiments, as discussed in greater detail below. An outermost or rearmost row 178 (see FIG. 23) of the lattice structure 136 defines four separate right triangles, each of the right triangles being partially defined by one of the angled segments 172 and one of the vertical segments 176. An innermost row 180 is also shown in FIG. 23. Curved rounds are defined at intersection points 182 of the segments 172, 174, 176. The intersection points 182 are rounded (e.g., define a curvature, or a radius of curvature, and are not formed by the intersection of one or more straight lines) rather than cornered for manufacturing purposes. For example, it has been found that the overall strength of the lattice structure 136 is increased with the inclusion of curved rounds at the intersection points 182. Through testing, it has been determined that when the intersection points 182 define sharp corners, the lattice structure is more likely to crack or break. Adding radii to sharp edges within geometry that is formed through 3D printing solves several issues, including: helping with de-caking (helps against green part destruction when blowing air against the lattice structure 136), reducing sintering drag, and avoiding stress concentrations by adding radii on the edges of the lattice structure 136.

In some embodiments, the club head 40 may be 3D printed using binder jetting, which is a cost-effective way to produce low batch production with geometries that cannot be efficiently manufactured using conventional manufacturing methods. Metal binder jetting builds components by depositing (e.g., printing) a binding agent onto a layer of powder through one or more nozzles. The club head 40 is 3D printed, layer by layer, along of a first or build plane, as discussed in greater detail herein. The printing occurs at room temperature, or slightly above room temperature, which means that thermal effects are typically not present in the final printed components. However, printing may occur at higher or lower temperatures. Metal binder jetting is a two-stage process, and involves a printing step and an essential post-processing step (sintering). Binder jetting involves spreading a thin layer of metal powder over a build platform, selectively depositing droplets of a binding agent that bonds the metal powder particles, and repeating the process until the build is complete. Once the build process is complete, the printed part may be excavated from the powder in the build platform and subsequently removed from the build platform. The result of the printing process is a part that is in the so-called "green" state, which is moved to a post-processing step to remove the binding agent and create the metal part.

After the club head 40 has been printed, additional intermediate steps may be required before the club head 40 enters into a sintering step. In some embodiments, the part may need to go through a curing stage to allow the binder to set properly. Still further, in some embodiments before sintering, a de-binding step may be required to drive out any remaining binder. However, in some embodiments the curing step and the de-binding step may not be needed.

There are two variations for the post-processing step. When using infiltration, the green part is first washed off from the binding agent to create a "brown" part with significant internal porosity, e.g., 70%. The brown part is then heated in an oven in the presence of a low-melting-point metal, such as bronze. The internal voids are filled, resulting in a bi-metallic part. When using sintering, the green part is placed in an industrial furnace. There, the binder is first burned off and the remaining metal particles are sintered together. The result is a fully metal component having dimensions that are approximately 20% smaller than the original green part. To compensate for shrinkage, the parts are printed larger, i.e., about 10%, or about 15%, or about 20%, or about 25%, or about 30% larger than final club head 40. In some embodiments, the parts are printed between about 10% and about 30% larger, or between about 15% to about 25% larger, or between about 16% and about 20% larger. In some embodiments, the larger dimensions defined by the printed part (pre-sintering) may leave enough material to enable a printed club head to meet factory finish standards. In some embodiments, the golf club head may be machined (e.g., via milling or turning) post-sintering to obtain, for example, the loft, lie, weight, dimensions, volume, shape, etc., defined by the factory finish.

In some embodiments, the club head 40 may be 3D printed using DMLS, or another one of the above-listed additive manufacturing techniques. In embodiments where the club head 40 is created using DMLS, a high powered laser is used to bond metal particles together, layer by layer, to create the club head 40. While the process of DMLS involves fusing material particles to one another on a molecular level, many different metal alloys are compatible with this type of additive manufacturing technique. After printing, i.e., after a laser has selectively bonded the metal particles to one another, the club head 40 is cooled and loose powder is extracted. Post-processing steps may involve stress relief via thermal cycling, machining, heat treatment, or polishing. Various other post-processing steps may also be involved through printing of the club head 40 using DMLS or any of the above techniques.

For example, in some additive manufacturing processes (e.g., DMLS) one or more supports (not shown) may be included on the club head 40 during printing to prevent the part from warping. Further, in DMLS, because the printed club head 40 is bonded to a build plate, a method of cutting may be required to cut the printed parts from the build plate. Electrical discharge machining (EDM) may be used to cut the printed parts from the build plate. Cutting or removing the parts may be required when using DMLS to build the parts, but may also be required when using other forms of additive manufacturing such as directed energy deposition DED or material extrusion.

Referring now to FIGS. 5 and 6, side profiles of the club head 40 are shown in detail. More specifically, the toe side 46 is shown in FIG. 5, while the heel side 48 is shown in FIG. 6. The sole 54 or underside of the club head 40 is visible in the figures, and a plurality of design elements are visible spanning the front portion 60 and the rear portion 62 of the sole 54. Fastener apertures 190 are also visible, the fastener apertures 190 being sized and shaped to allow fasteners 192 (see FIG. 8) to be inserted into the fastener apertures 190, to thereafter retain the first and second weights 132, 134 in position. The fastener apertures 190 are formed after the 3D printing process has occurred, i.e., in a post-printing state, as will be discussed in greater detail hereinafter below. Still referring to FIGS. 5 and 6, the hosel 90 is shown in greater detail, the hosel 90 being disposed at an angle offset from a plane that is normal with respect to the ground. The front face 50 of the body 42 is also shown disposed at an offset angle with respect to a plane that is normal with respect to the ground when the club head 40 is at address. The front face 50 and the hosel 90 are angled in opposing directions with respect to the plane that is normal with respect to the ground when the club head 40 is at address.

Figure 7:
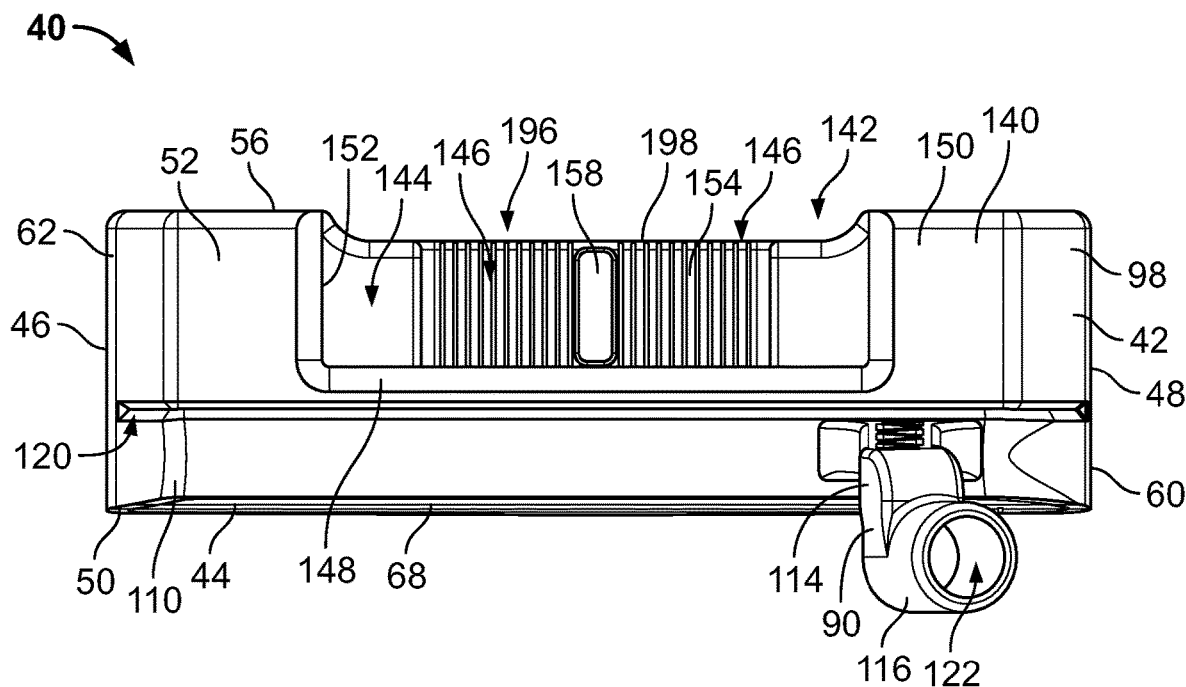
FIG. 7 is a top plan view of the putter-type club head of FIG. 1.
Figure 8:
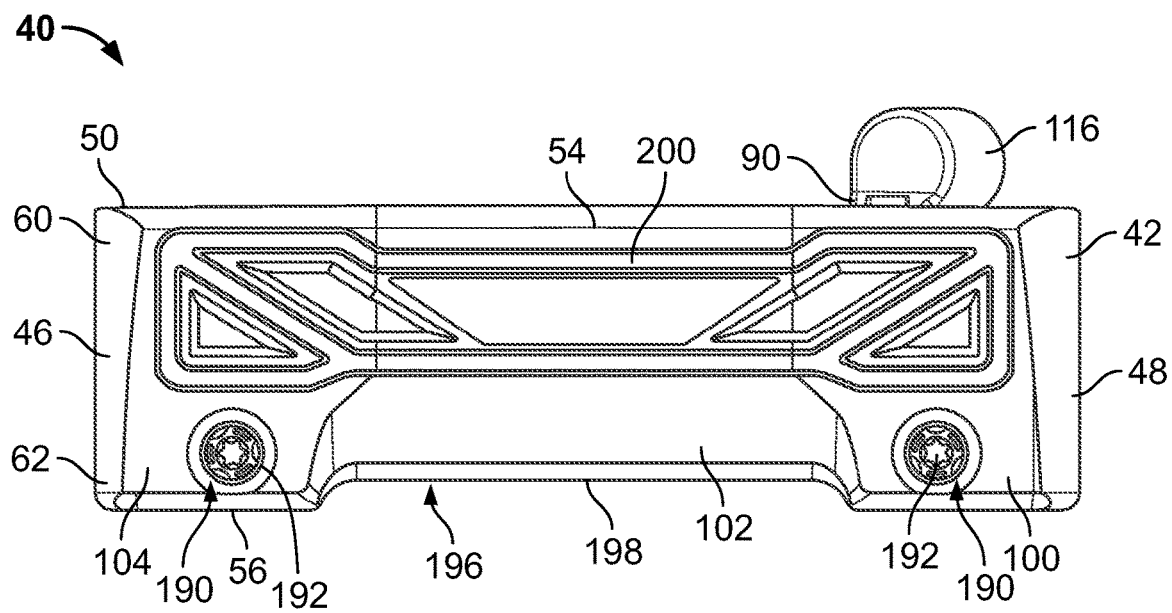
FIG. 8 is a bottom plan view of the putter-type club head of FIG. 1.

Referring now to FIGS. 7 and 8, top and bottom views of the club head 40 are shown in detail. Referring specifically to FIG. 7, the front portion 60 and the rear portion 62 are clearly shown being separated by the groove 120. However, as noted above, in embodiments that do not include the groove 120, the front portion 60 and the rear portion 62 are separated by a plane that extends through the groove 120. The shaft bore 116 and shaft cavity 122 are also shown in greater detail. The shaft cavity 122 is disposed at an offset angle with respect to an axis normal to the ground when the club head 40 is at address. The planar portions along the front region 60 of the body 42 are also shown clearly in FIG. 7. Further, the first and second inset regions 144, 146 are depicted, and the plurality of alignment features 156 are shown surrounding the central alignment feature 158. As illustrated in FIGS. 7 and 8, a cutout region 196 is visible, the cutout region 196 following a profile of the second inset sides 152 and an outer edge 198 of the alignment platform 154 when viewed in the plan views of FIGS. 7 and 8. While the term "cutout" is used herein, it should be appreciated that the manufacturing techniques utilized to create the club head 40 mayor may not require the physical removal or grinding down of some portions, while certain portions do have to be removed or otherwise grinded down, as discussed with respect to FIGS. 9-13 below. As such, a "cutout" may refer to a portion that is devoid of material, not necessarily a portion that has had material that has been physically removed therefrom.

Referring to FIG. 8, a bottom view of the club head 40 is shown. Various design features 200 are shown spanning the front portion 60 and the rear portion 62 of the sole 54, and two fasteners 192 are shown along the rear portion 62 of the sole 54, the fasteners 192 being aligned with the weights 132, 134. The cutout region 196 is visible in FIG. 8, which is shown defining various curved and straight surfaces. The fasteners 192 are shown disposed on opposing sides of the cutout region 196. In some embodiments, the fasteners 192 are configured to be removed. However, in some embodiments, the fasteners 192 are permanently affixed to the club head 40 via an adhesive or another type of retention mechanism. The particular location of the fastener apertures 190 may be adjusted depending on a desired weight or center of gravity (CG) of the club head 40. Still further, additional weights (not shown) may be added along the club head 40.

During manufacturing of the club head 40, the weights 132, 134 are inserted into the head cavity 130 and secured to the club head 40 via one or more fasteners, an adhesive, or another type of securement mechanism.

Referring now to FIGS. 9-13, a golf club head post-printed component 204 is shown. The post-printed component 204 depicts the club head 40 in a post-printed, pre grinded state. Further, the post-printed component 204 is shown without the face insert 44 applied to the body 42, thus, the face insert cavity 64 is visible, the face insert cavity 64 being at least partially defined by an insert wall 206. The post-printed component 204 is preferably formed using binder jetting, as described above. The post-printed component 204 may be printed at an angle that is offset by about 30 degrees with respect to the orientation shown in FIG. 12, i.e., 30 degrees counterclockwise. In some embodiments, the post-printed component may be printed at an angle of between about 5 degrees and about 60 degrees offset, or between about 10 degrees and about 50 degrees offset, or between about 20 degrees and about 40 degrees offset from the orientation shown in FIG. 12, i.e., from when the component 204 is at address.

When manufacturing a golf club head via an additive manufacturing process, it is beneficial to ensure that the layer lines created during the additive manufacturing process avoid sharp surface interfaces (e.g., corners, edges, etc.) that fall along layer line edges. For example, in a binder jetting process, if a golf club head is printed such that the front face or striking surface is arranged parallel to the build plane (e.g., the front face is printed flat), the printed club head may show visible layer lines at shallow elevation changes, which may produce sharp corners that fall directly on a layer line edge and create cracks. The rotational offset that the post-printed component 204 is printed at, described above, may aid in preventing the printing of visible layer lines with sharp corners that fall on the layer line edge. In addition, printing at the rotation offset may prevent cracking of the green part during the print or sintering stages.

Further, the rotational offset that the post-printed component 204 is printed at may also aid in Z-height limitations in, for example, a binder jetting process. For example, a thickness in the Z-direction (i.e., a height defined by a layer perpendicular to the build plane) may be reduced as the layers increase in Z-height during a binder jetting process. That is, the lower layers lay define an increased thickness relative to the upper layers due to weight of the overall structure weighing down on the lower layers. By printing the post-printed component at a rotational offset, the total Z-height defined by the component during the build is reduced, when compared to printing the component in the orientation of FIG. 12.

In some embodiments, the club head 40 may be printed in multiple components. For example, the hosel 90 and the body 42 may be printed, via binder jetting, as separate components. In this way, for example, the Z-height defined by the components being printed may be further reduced and the build efficiency (i.e., the amount of components printed during a build job) may be increased.

Figure 9:
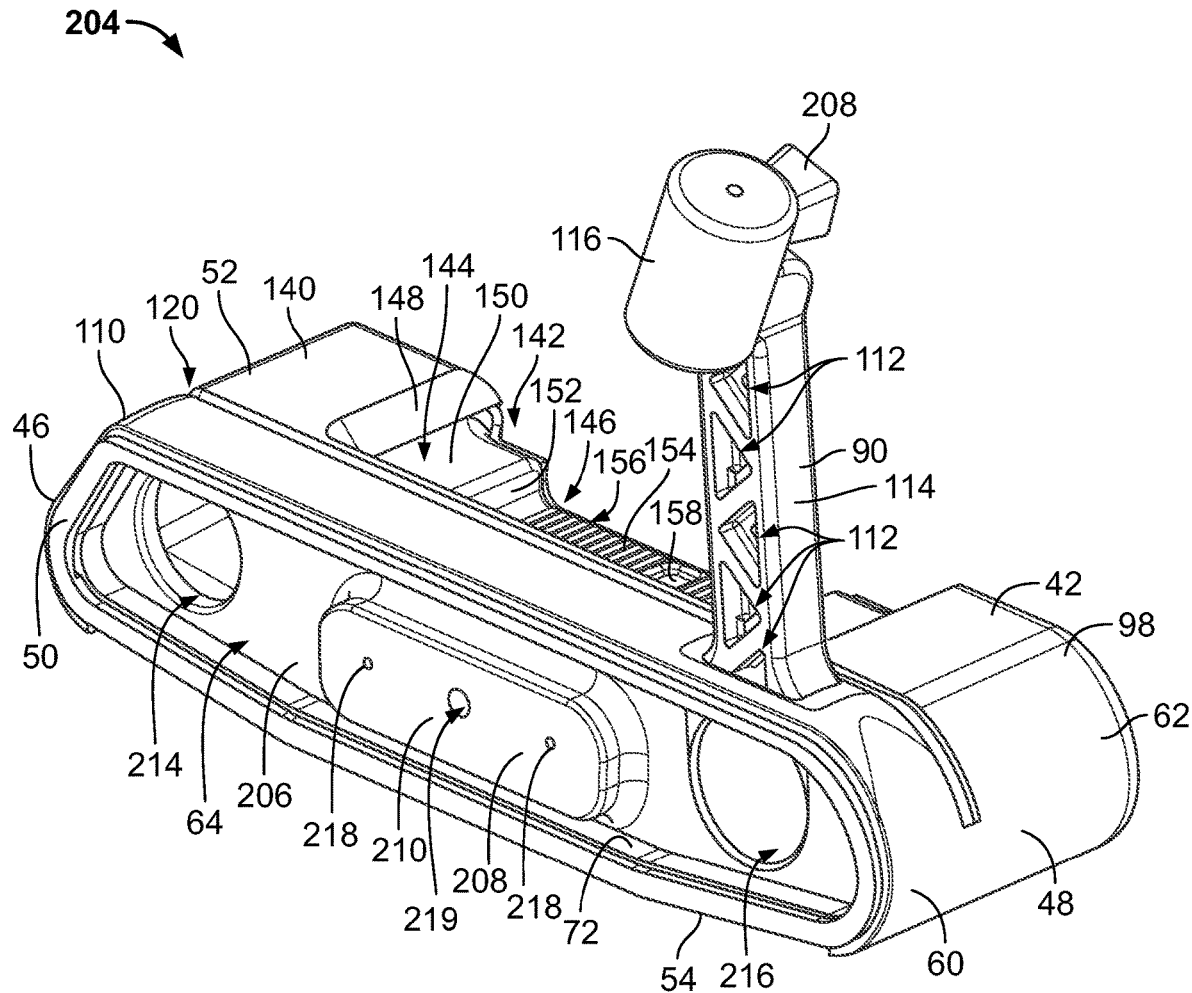
FIG. 9 is a top, front, and left side isometric view of the putter-type club head of FIG. 1 in a post 3D-printed state and a post-printed state.

Referring specifically to FIG. 9, the face insert cavity 64 is shown in greater detail. The face insert cavity 64 is defined by the peripheral edge 70 that generally corresponds with an outer profile of the face insert 44 (see FIG. 1) and the insert wall 206. A material deposit 208 is centrally disposed within the face insert cavity 64 and extends outward from the insert wall 206, the material deposit 208 defining a planar surface 210 and an outwardly extending platform. The material deposit 208 is intended to be machined off of the club head 40. However, in some embodiments, only a portion of the material deposit 208 may be removed from the post-printed component 204. The centrally disposed material deposit 208 may be provided or printed along what may be considered the "sweet spot" of the club head 40. As a result, the machining of the centrally disposed material deposit 208 may allow for removal to enhance or otherwise modify the sweet spot. The location and size of any remaining portion of the material deposit 208 within the inset cavity may affect the characteristic time ("CT") of the club head 40.

Still referring to FIG. 9, a first or toe-side aperture 214 and a second or heel-side notch 216 are shown within the insert cavity 64. As noted below, the heel-side notch 216 becomes the heel-side aperture 216 after processing of the post-printed component 204. The toe-side aperture 214 is sized and shaped to allow air to flow through the post-printed component 204 during the manufacturing process to allow certain post-production material to be removed from the post-printed component 204. The toe-side aperture 214 may also be sized and shaped to receive one or more portions of the face insert 44, for example, in a lock-and-key fashion, so as to retain the face insert in place within the insert cavity 64. During the post-processing step of manufacturing, the heel-side notch 216 is machined to become a heel-side aperture 216, similar to the toe-side aperture. In some embodiments, there may be one or more additional apertures that are provided along the insert wall 206. Since the particular face insert 44 described herein has regions defining different degrees, the face insert cavity 64 may be sized and shaped differently to receive alternatively shaped inserts.

Figure 10:
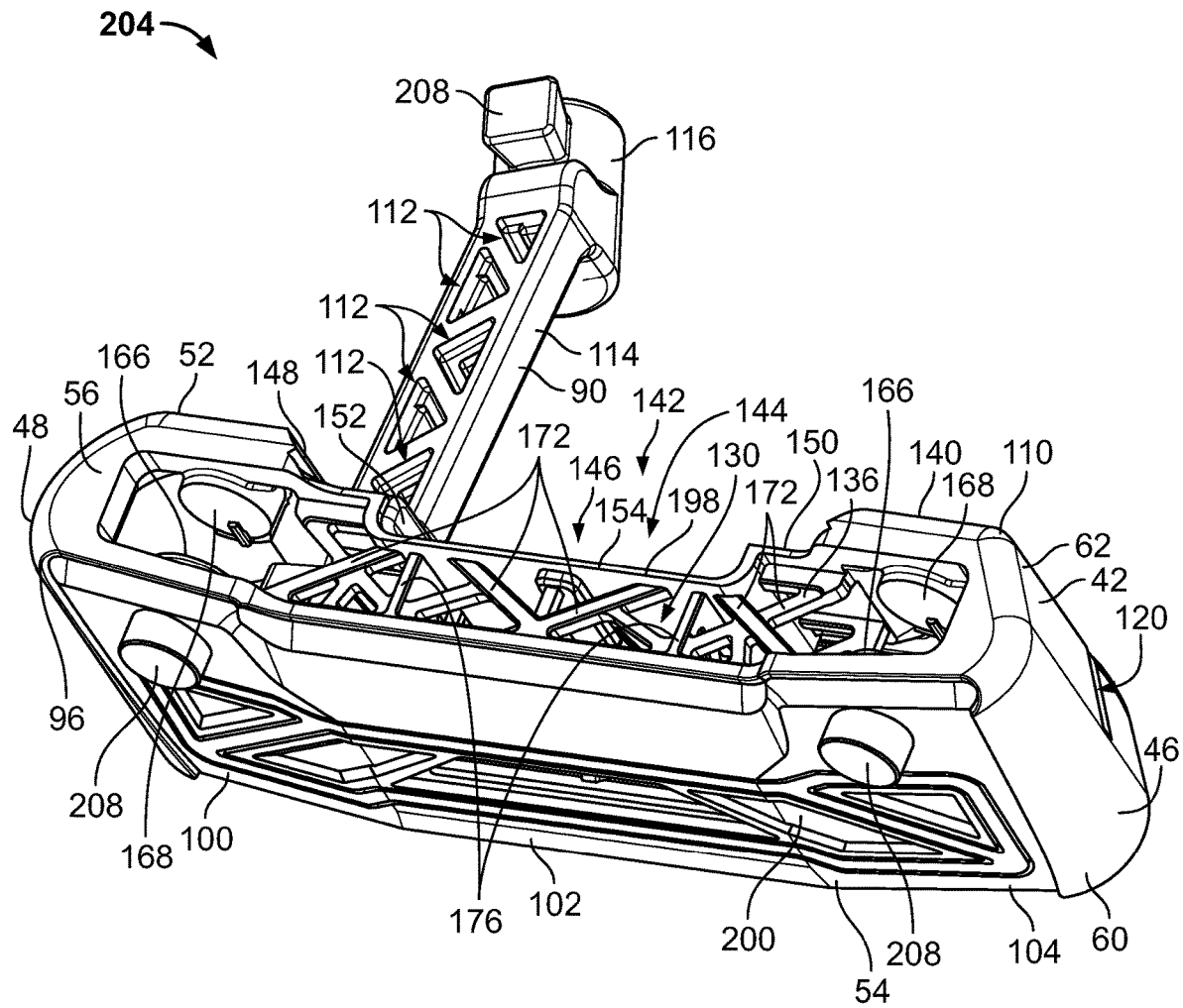
FIG. 10 is a bottom, rear, and right side isometric view of the post-printed putter-type club head of FIG. 9.

Referring now to FIG. 10, the sole 54 of the post-printed component 204 is shown in greater detail. A rear side of the hosel 90 is also shown in greater detail. As shown in this particular view, the post-printed component 204 includes several locations with additional material deposits 208 that are ultimately removed during a post-processing step. However, since the post-printed component 204 is depicted in a form after having been 3D printed, various portions of the post-printed component 204 include the material deposits 208, which are machined off or are otherwise removed during a post-printing process. For example, and still referring to FIG. 10, the material deposits 208 along the sole 54 that are cylindrical in nature are formed where the fastener apertures 190 are disposed in the final form of the club head 40. Still further, one of the material deposits 208 is shown extending outwardly from the hosel 90. The material deposits 208 may be formed in varying locations along the post-printed component 204, which may be exist after 3D printing because of one or more factors associated with 3D printing. For example, certain material deposits may be formed to enhance certain structural features of the post-printed component 204 during post-processing steps. Still further, material deposits may be formed or printed because of the technique that is utilized for manufacturing the post-printed component 204, or to aid in verifying specifications, machining, polishing (as guides), or fixturing the post-printed component.

In some embodiments, the one or more material deposits 208 may be provided so as to act as a reference circle to indicate a center of a desired bored or tapped hole. For example, the material deposits 208 located along the sole 54 are concentric circles that indicate where the hole should be drilled through in which the weights are located. The material deposits 208 may be a specified height so as to more easily machine portions of the post-printed component 204.

Figure 11:
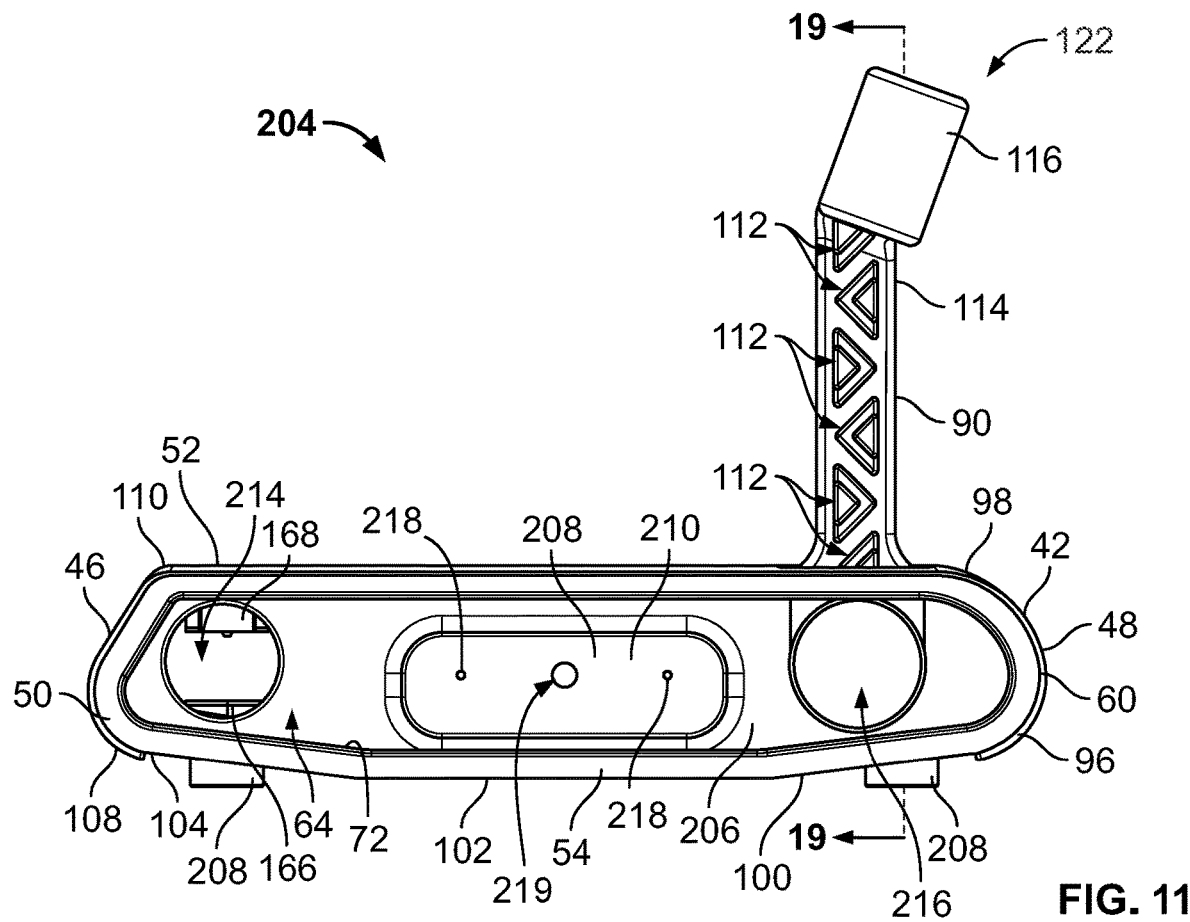
FIG. 11 is a front elevational view of the post-printed putter-type club head of FIG. 9.

Referring to FIG. 11, the material deposits 208 along the sole of the post-printed component 204 are shown more clearly. The toe-side aperture 214 is also shown in greater detail, and the upper and lower retention features 166, 168 for the first weight 132 are visible through the toe-side aperture 214. Guide holes 218 are shown disposed along the centrally raised planar surface 210. A centered hole 219 is also shown in FIG. 11, which, in combination with the guide holes 218, are used to center the post-printed component 204 for various post-printing processes. For example, the centered hole 218 is located in the geometric center of the post-printed component 204, and may be used as a machining "chuck" to elevate the post-printed component 204 and allow for machining of the various surfaces of the post-printed component. By placing the hole 219 centrally along the surface 210, various efficiencies are achieved since it is preferable to elevate the post-printed component 204 by machining surfaces to tighter tolerances.

Figure 12:
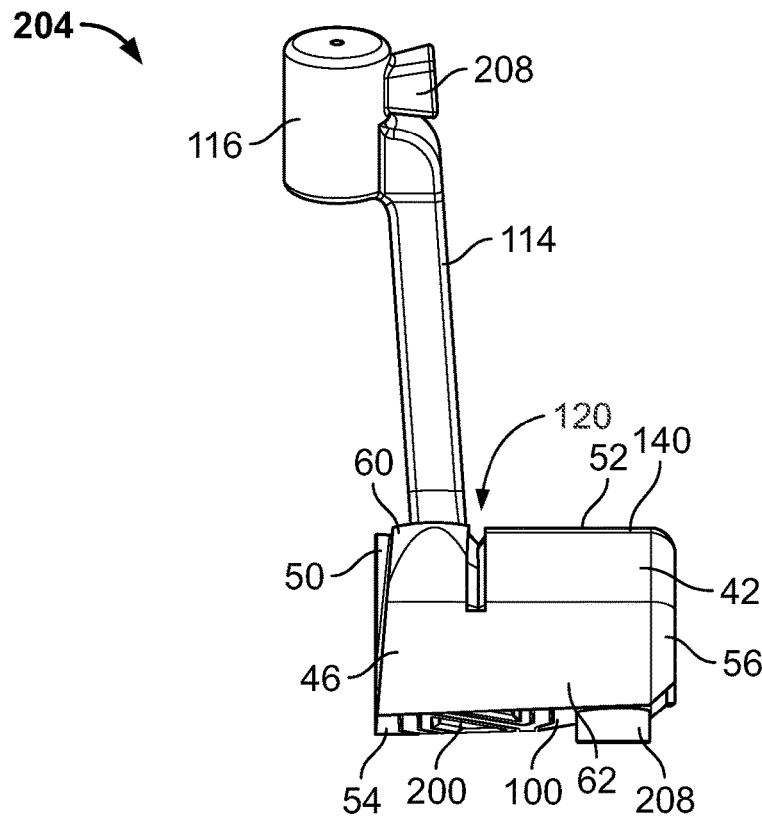
FIG. 12 is a left side elevational view of the post-printed putter-type club head of FIG. 9.
Figure 13:
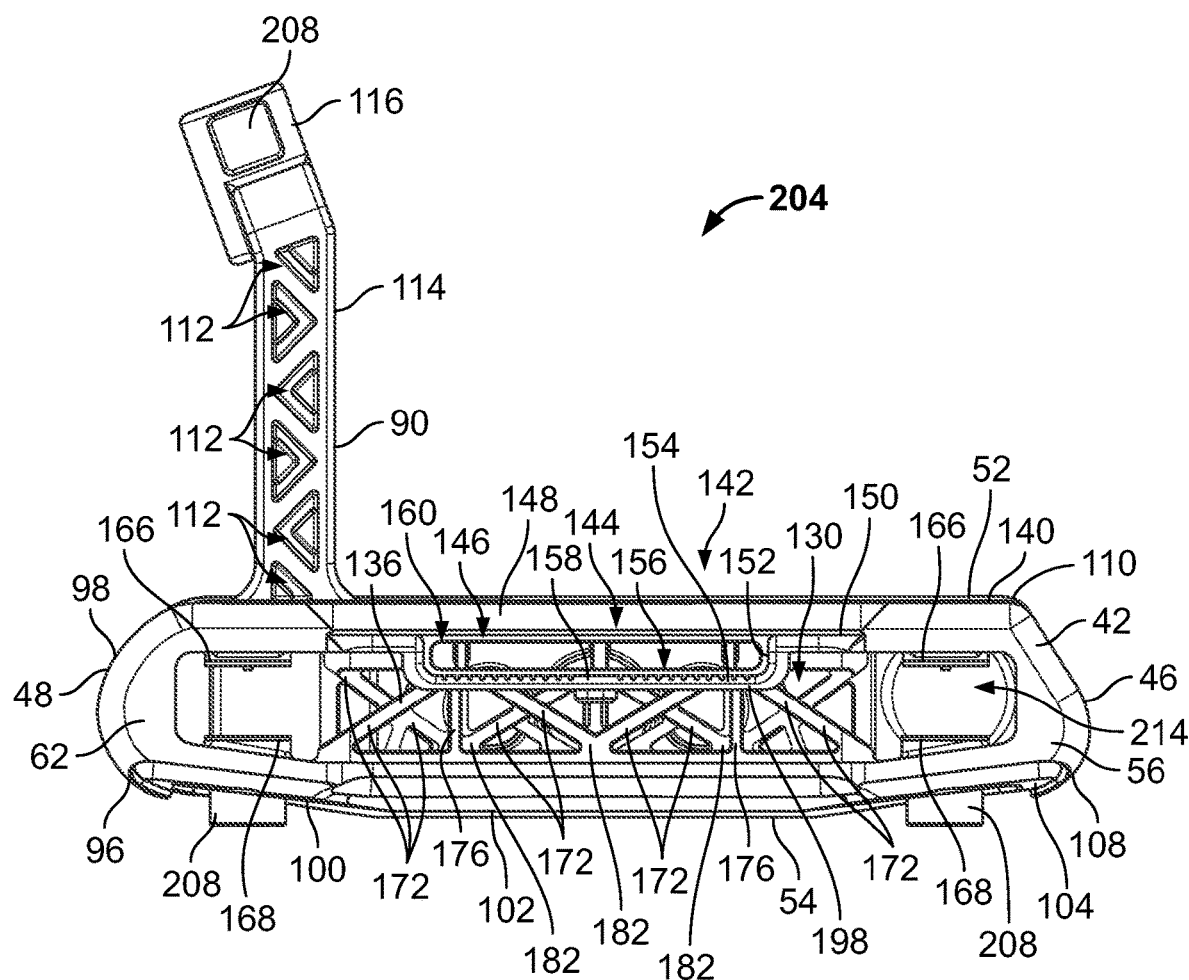
FIG. 13 is a rear elevational view of the post-printed putter-type club head of FIG. 9.

Referring to FIG. 12, the material deposit 208 that extends from the shaft bore 116 is shown in greater detail. Further, the shaft cavity 116 is entirely filled in, i.e., there is no shaft cavity 122 until the material disposed within the shaft bore 116 has been machined out to create the shaft cavity 122. A rear view of the post-printed component 204 is shown in FIG. 13, where the material deposits 208 are shown in greater detail. The heel-side aperture 216 is also visible through FIG. 13, the heel-side aperture 216 being aligned with the upper and lower retention features 166, 168 within the heel region 88. The lattice structure 136 is visible in FIG. 13, which is generally in the same configuration as it is within the club head 40. While the foregoing description relating to the post-printed component 204 includes various aspects that are not shown or included within the club head 40, alternative variations of the post-printed component 204 are contemplated that can achieve various aspects of the club head 40. Once the post-printed component 204 is ready for sintering, the post-printed component is placed into a sintering furnace face down, i.e., with the face cavity 64 facing downward. In some embodiments, the post-printed component 204 may be sintered in an orientation other than face down. For example, the post-printed component 204 may be sintered sole down (i.e., with the sole 54 facing downward). Alternatively a sintering support (see FIGS. 67-70) may be used to support the post-printed component 204 in a desired rotation orientation relative to gravity.

Figure 14:
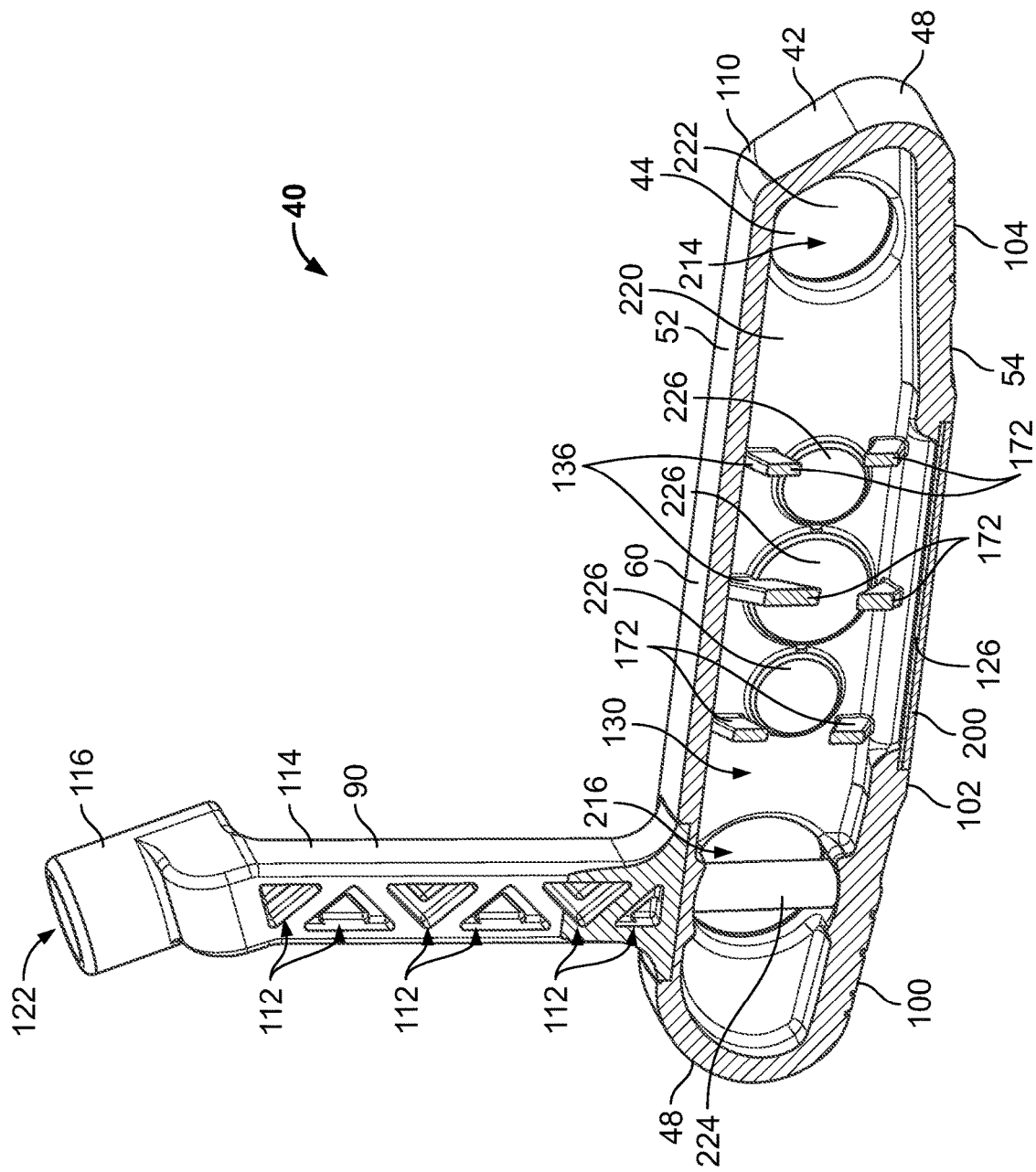
FIG. 14 is a top, rear, and right side cross-sectional view taken through line 14-14 of FIG. 5.

Now turning to the views of FIGS. 14-17, cross sectional views of the club head 40 are shown to illustrate the internal structure within the club head 40. Referring specifically to FIG. 14, some of the angled segments 172 of the lattice structure 136 are shown extending from an inner surface 220 of the insert wall 206. The heel-side aperture 216 is also shown, and a back side 222 of the face insert 44 is visible. The angled segments 172 of the lattice structure 136 extend from upper and lower ends of the insert wall 206, toward the rear portion 62 of the club head 40. A hosel bar 224 is also shown, the hosel bar 224 being aligned with the hosel 90, but being disposed entirely within the cavity 130. The hosel bar 224 is generally aligned with the hosel 90, and extends vertically between the crown 52 and the sole 54 of the body 42. One of the design elements 200 is further shown in FIG. 14 with a layer of the adhesive or bonding agent 126 disposed intermediate the design element 200 and the body 42. Still further, circular protrusions 226 are shown extending outward from the inner surface 220 of the insert wall 206. The circular protrusions 226 may be disposed along the inner surface 220 to aid with acoustics, altering the CT of the club head 40, or for another reason.

Figure 15:
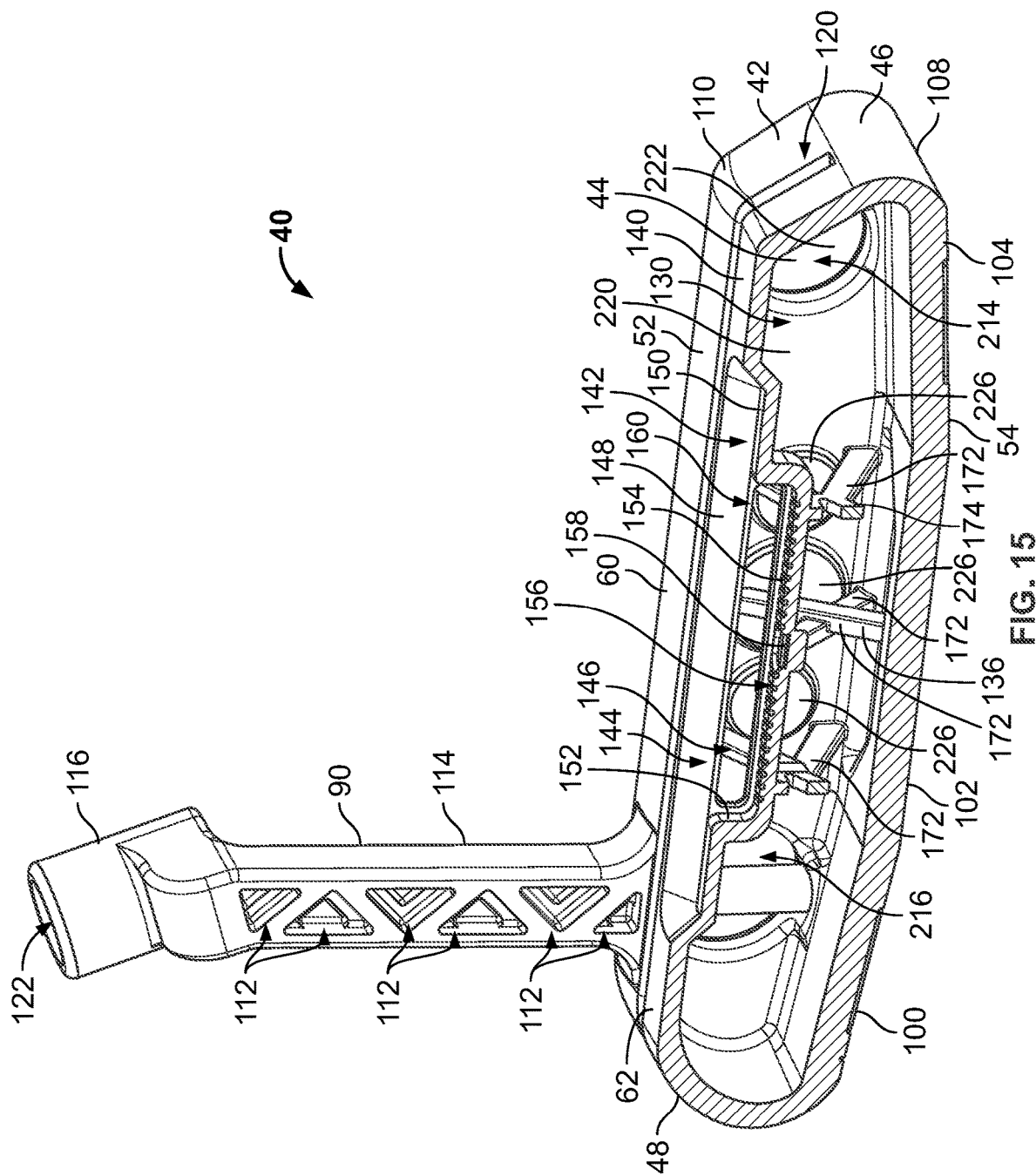
FIG. 15 is another top, rear, and right side cross-sectional view taken through line 15-15 of FIG. 5.

Referring now to FIG. 15, another cross-sectional view of the club head 40 is shown. The angled segments 172 of the lattice structure 136 that extend from the inner surface 220 of the insert wall 206 are shown intersecting with other angled segments 172. Referring specifically to the centrally located angled segments 172, these angled segments 172 are offset from one another, such that the angled segments 172 are not disposed entirely within the same plane. Various other segments 172, 174, 176 are also offset from one another, such that intersecting segments 172, 174, 176 are not disposed within the same plane as one another. Still referring to FIG. 15, the upper inset region 144 and the lower inset region 146 are partially shown, along with the various alignment features 156 along the alignment platform 154. A portion of the central alignment feature 158 is also shown in FIG. 15. The window 160 is further shown, with portions of the angled segments 172 being visible through the window 160.

Figure 16:
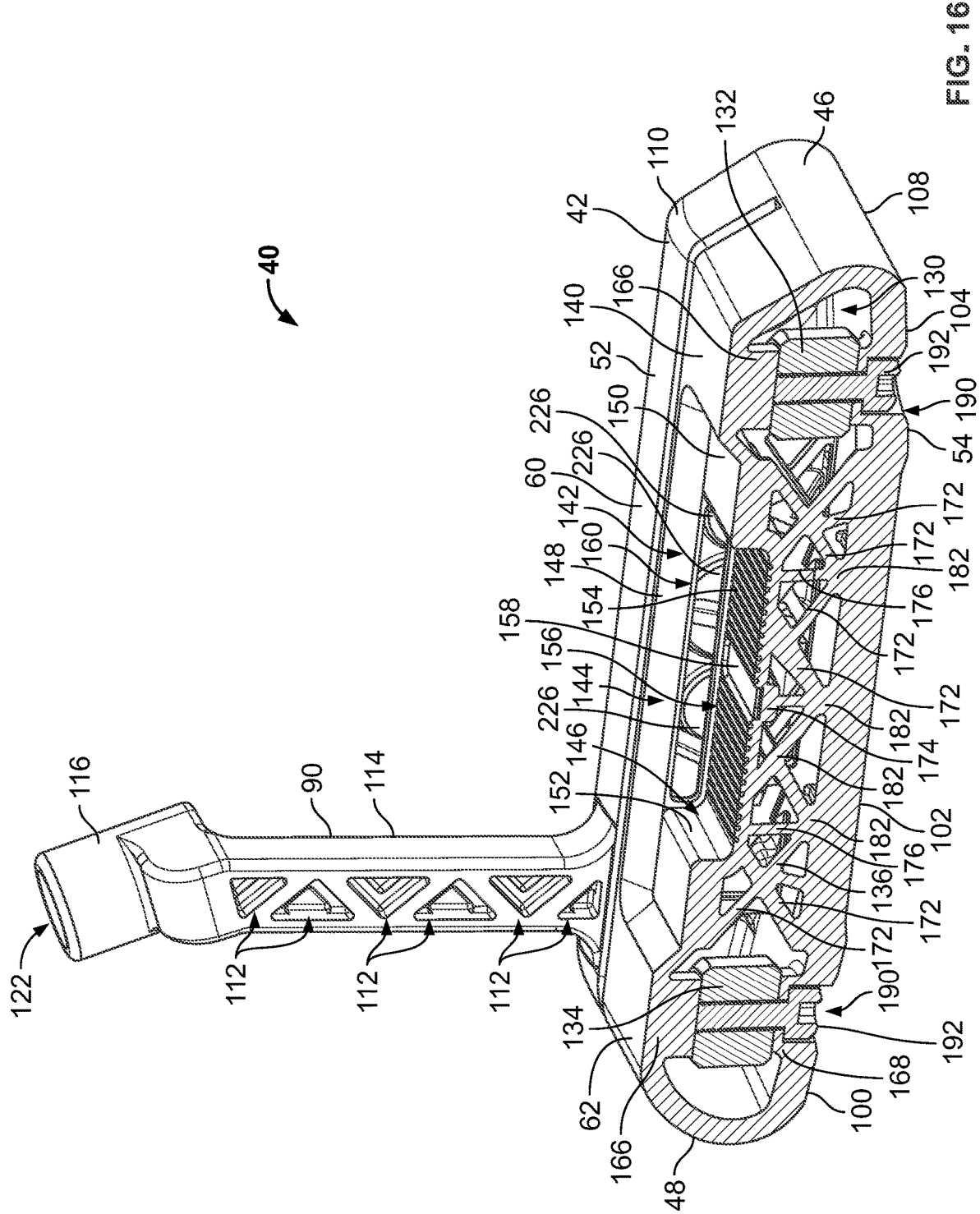
FIG. 16 is still another top, rear, and right side cross-sectional view taken through line 16-16 of FIG. 5.

Referring now to FIG. 16, a cross-sectional view taken through the fasteners 192 and the weights 132, 134 is shown. Various segments 172, 174, 176 are shown, which intersect at varying locations. Many of the intersection points 182 of the segments 172, 174, 176 are defined by the rounds, which may define acute, obtuse, or right angles. The fasteners 192 are further shown being disposed within the fastener apertures 190, and retaining the weights 132, 134 between the upper and lower retention features 166, 168. While the window 160 is shown being see-through, it is contemplated that an insert or another feature may be positioned within the window 160 to prevent debris from entering into the cavity 130 during use of the club head 40. Still further, it is contemplated that a polymer or another type of filler material (not shown) may be disposed within the head cavity 130 such that the material is disposed within the lattice structure 136. The material may be included to add weight or modify certain characteristics of the club head 40. In some embodiments, the material may be added within the head cavity 130 to prevent materials such as dirt or other foreign matter from becoming engaged within the head cavity 130.

Figure 17:
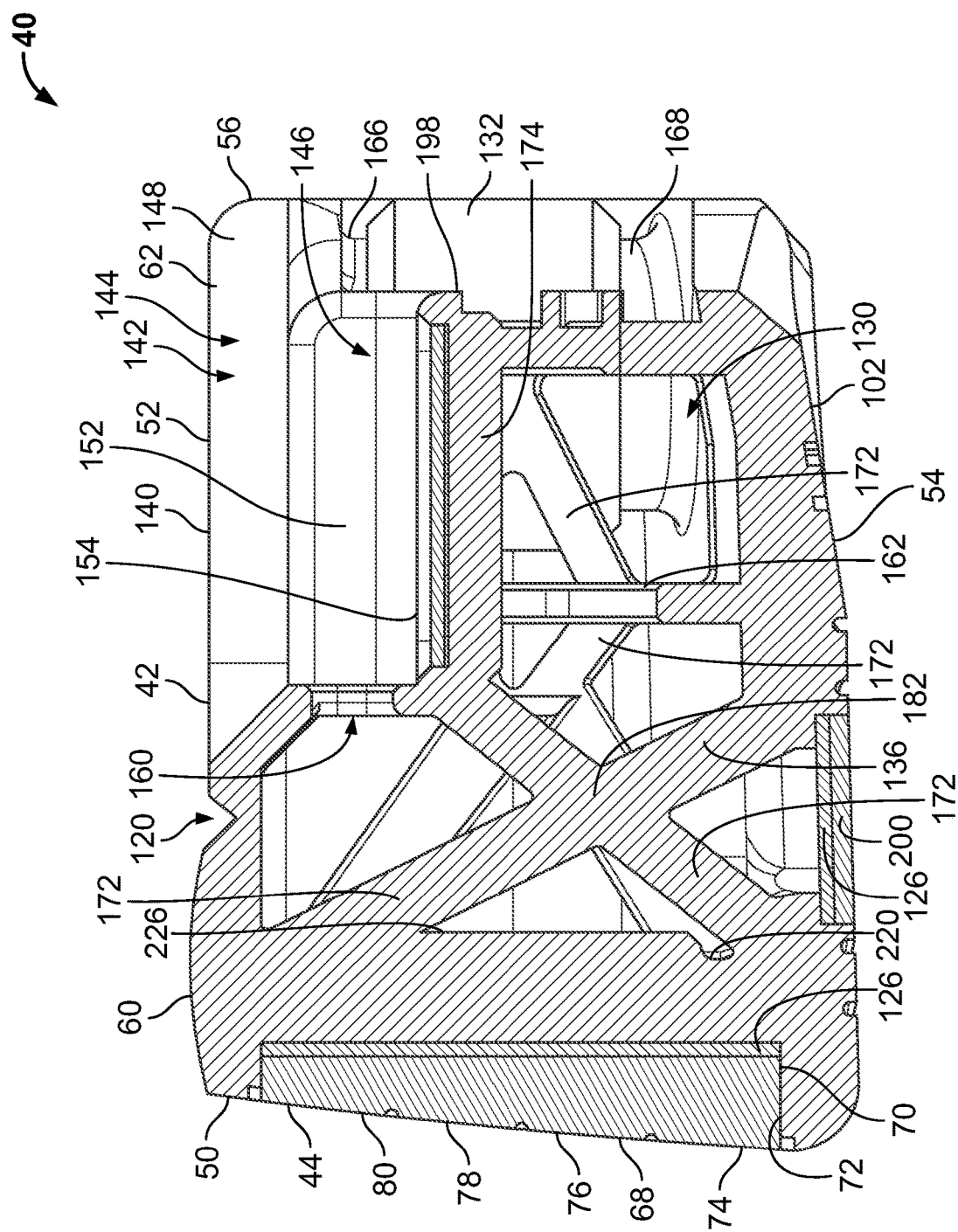
FIG. 17 is a side cross sectional view taken through line 17-17 of FIG. 3.

Referring to FIG. 17, a cross-sectional view taken through the central alignment feature 158 is shown. The design feature 200 along the sole 54 of the club head 40 is shown with a layer of the adhesive 126 disposed between the design feature 200 and the body 42. The face insert 44 is also shown with a layer of the adhesive 126 disposed between the face insert 44 and the insert wall 206. One of the circular protrusions 226 is also shown extending from the inner surface 220 of the insert wall 206. Varying other segments 172, 174, 176 of the lattice structure 136 are also shown extending across varying portions of the club head 40. The first weight 132 is visible within the background of FIG. 17. The upper inset region 144 and the lower inset region 146 are further shown, along with the upper inset edge 148 and the lower inset edge 152.

Now referring to FIGS. 18 and 19, cross-sectional views of the club head 40 and the post-printed component 204 are shown, respectively, to illustrate contrasts between the club heads after and before post printing processing, respectively. The various material deposits 208 are visible in FIG. 19, while the material deposits are shown having been removed, i.e., grinded down, drilled out, or otherwise machined in FIG. 18. Further, the heel-side notch 216 in FIG. 19 has become the heel-side aperture 216 in FIG. 18, which is achieved through drilling, grinding, or another type of machining process. The shaft cavity 122 is also shown having been drilled out or otherwise machined in FIG. 18, while the shaft cavity 122 is shown filled-in in FIG. 19. Various other differences are visible between the pre- and post-processing versions of the club head, which may be achieved through a number of manufacturing techniques known to those skilled in the art. For example, certain surfaces and corners are grinded down or otherwise machined to achieve the club head 40 shown in FIG. 18.

Figure 20:
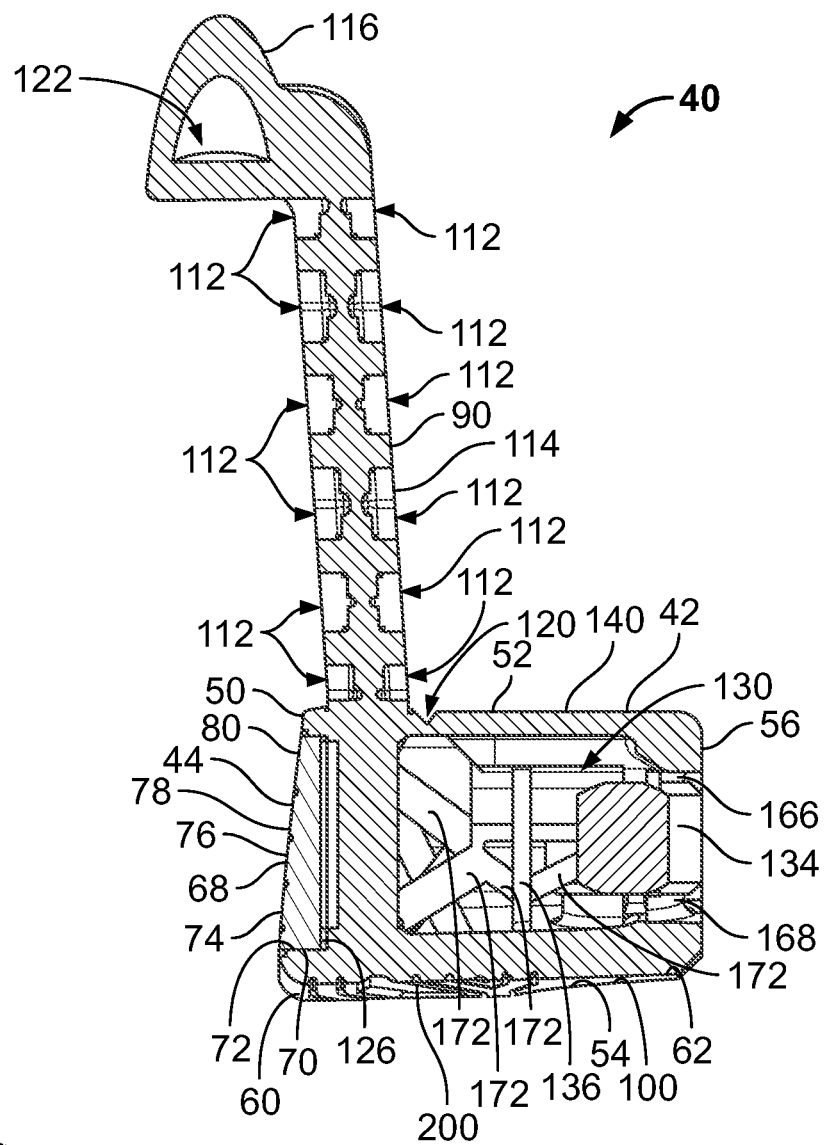
FIG. 20 is a side cross-sectional view taken through line 20-20 of FIG. 3.

Referring to FIG. 20, a cross-sectional view of the club head 40 is shown that is taken through a center of the hosel 90. The hosel notches 112, which do not extend all the way through the hosel 90, are shown, the hosel notches 112 taking various different forms along the hosel 90. To that end, the hosel arm 214 is shown extending centrally through a center of the hosel 90, the hosel arm 214 defining the various hosel notches 112 that are cutout from the hosel 90. The hosel notches 112, in some embodiments, may be disposed in a direction that is orthogonal with respect to the orientation shown in FIG. 20. The groove 120 that separates the front region 60 and the rear region 62 of the body 42 is further shown in FIG. 20, the groove 120 being generally v-shaped in cross-section.

Figure 21:
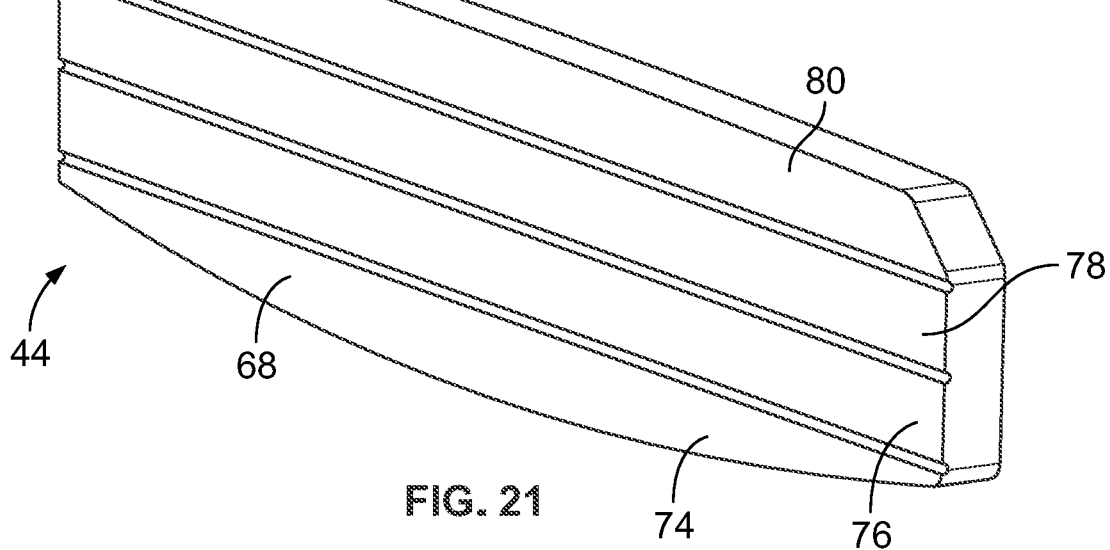
FIG. 21 is a top, front, and left side view of a face insert that is insertable into the face cavity shown in the post-printed putter-type club of FIGS. 9-13.
Figure 22:
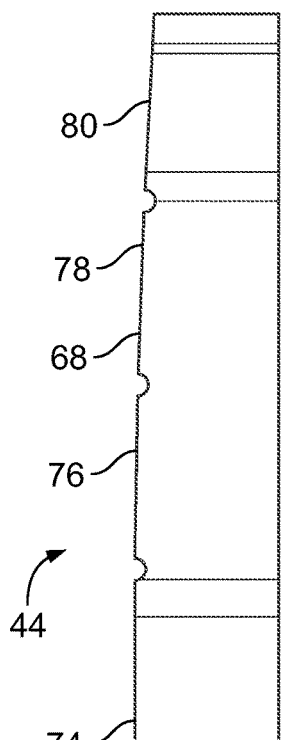
FIG. 22 is a side elevational view of the face insert of FIG. 21.

Referring now to FIGS. 21 and 22, the face insert 44 is shown in greater detail. As noted above, the face insert 44 defines the striking surface 68, which includes the first surface 74, the second surface 76, the third surface 78, and the fourth surface 80. In this particular embodiment, Descending Loft Technology™ is utilized, which comprises four flat surfaces that are milled into the face insert 44. In a preferred embodiment, each of the surfaces 74, 76, 78, 80 descends in loft by 1° from a top of the face insert 44 to a bottom of the face insert 44. As a result of this configuration, when a player's shaft is pressed at impact, the ball contact will be higher on the face insert 44. The face insert 44 therefore delivers consistent launch angles from putt to putt, which can lead to more consistent and predictable rolls.

Referring now to FIG. 23, a horizontal cross-sectional view of the club head 40 is shown. In this view, the hosel bar 224, the first weight 132, and the second weight 134 are shown in cross section. The fasteners 192 are also shown in cross section, along with the lattice structure 136. The rear lattice row 182 and the front lattice row 180 are also shown. The front lattice row 180 and the rear lattice row 182 define a plurality of the segments 172, 174, 176, which extend in a wide range of directions. In some embodiments, the disposition of the one or more segments 172, 174, 176 may be modified to change one or more characteristics of the club head 40, such as the CG, CT, weight distribution, or another characteristic. Still further, in some embodiments, additional lattice rows may be added, and the segments 172, 174, 176 may be disposed in alternative configurations. As provided in FIG. 23, the lattice structure 136 is generally limited to the medial region 86 of the club head 40, with edge portions slightly crossing over into the heel region 88 and the toe region 84. In some embodiments, the lattice structure 136 may extend entirely across one or more of the toe region 84, the medial region 86, and the heel region 88. The lattice structure 136 may also extend only in a region defined between the first weight 132 and the second weight 134.

In general, the additive manufacturing principles and advantages of the putter-type club head 40 and the corresponding post-printed component 204 may be applied to other types of golf club heads. For example, an iron-type golf club head may be manufactured using an additive manufacturing technique and, in some embodiments, designed to include an internal or an external lattice structure or portion. The incorporation of a lattice structure into an iron-type golf club head via additive manufacturing may provide several manufacturing and performance advantages, in addition to enabling the design of an iron-type golf club head to leverage performance benefits from various iron club head designs.

For example, conventional iron-type golf club heads may generally be designed with a muscle back design, a cavity back design, or a hollow construction. Typically, these conventional iron designs are limited in CG movement due to their volume and manufacturing method (e.g., forging, casting, metal injection molding, machined, etc.). Certain players may benefit from playing a mid or large volume club head design that performs like a low volume club head. For example, hollow constructions are typically designed with a club face insert that may only be supported around a periphery of the face insert (e.g., the face insert is generally unsupported over the surface area that contacts a golf ball). Unsupported face inserts may provide inconsistent launch conditions and greater distance variability when compared to an iron design with a supported face (e.g., a muscle back design), but may provide greater distance and forgiveness. Additive manufacturing may allow for the design of a larger volume club head, which defines a higher MOI, with a supported face (e.g., similar to a low volume iron design) and the ability to adjust a CG location by adjusting mass and lattice structure locations.

Referring now to FIGS. 24-27, an iron-type golf club head 300 is shown in accordance with the present disclosure that may be formed through an additive manufacturing process. The iron-type golf club head 300 includes a body 302 that defines an external skin or shell 304 that encloses an internal cavity 306 (see FIGS. 26 and 27). The external shell 304 may be formed around an external boundary of the body 302 (e.g., a boundary that is externally visible). In general, the iron-type golf club head 300 may be formed by an additive manufacturing process to define the appearance of a hollow construction iron design (e.g., a larger volume when compared to a muscle back design), which creates extra volume (i.e., the internal cavity 306) within the external shell 304 to manipulate club head properties and/or performance. For example, the internal cavity 306 may be manipulated by adding solid material, a lattice structure, a weight, leaving it hollow, or any combination thereof to create unique CG locations and mass properties to influence face flex and performance.

In general, the external shell 304 may form a thin border around a substantial portion or an entirety of the body 302 to give the appearance that the iron-type golf club head 300 is solid when viewed externally. The internal cavity 306 may be formed by a boundary defined by an inner periphery of the external shell 304.

Figure 24:
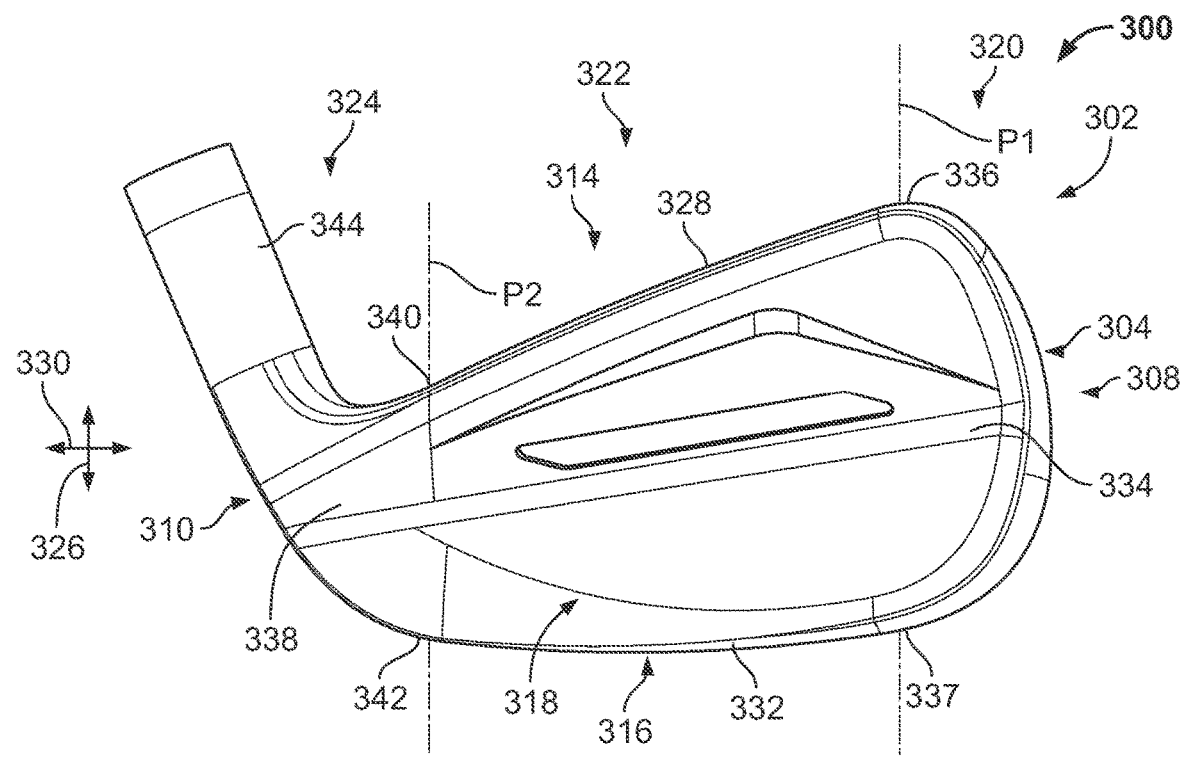
FIG. 24 is a rear view of an iron-type golf club head according to one aspect of the present disclosure.
Figure 25:
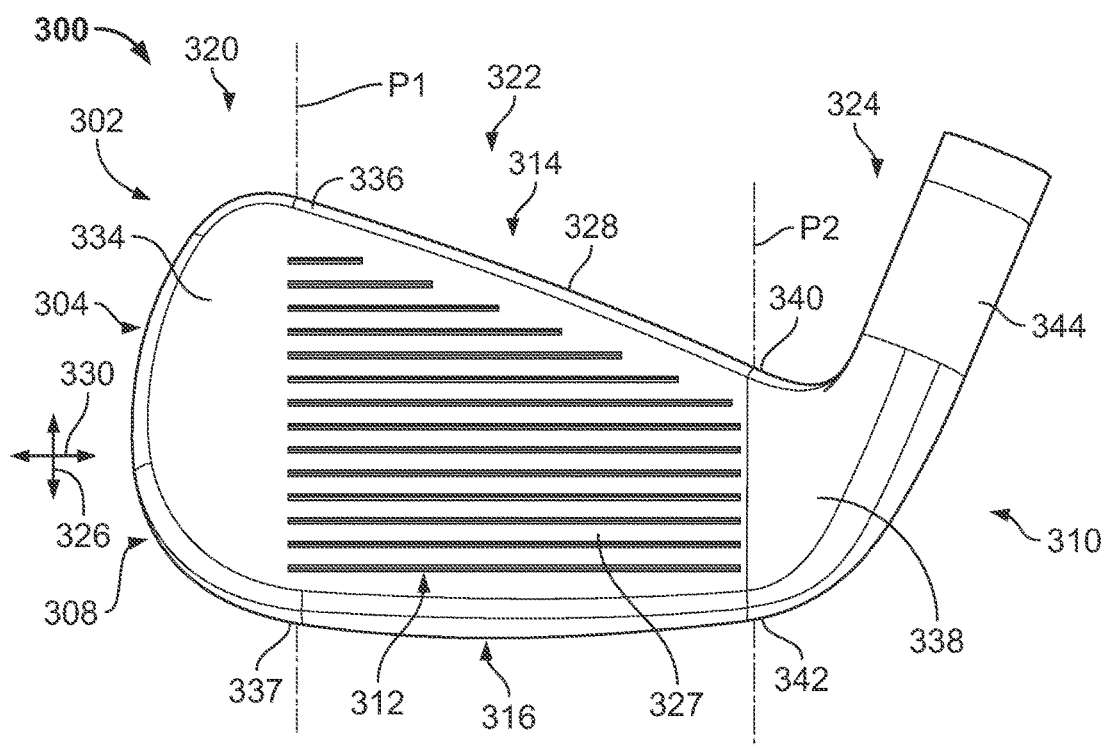
FIG. 25 is a front view of the iron-type golf club head of FIG. 24.
Figure 26:
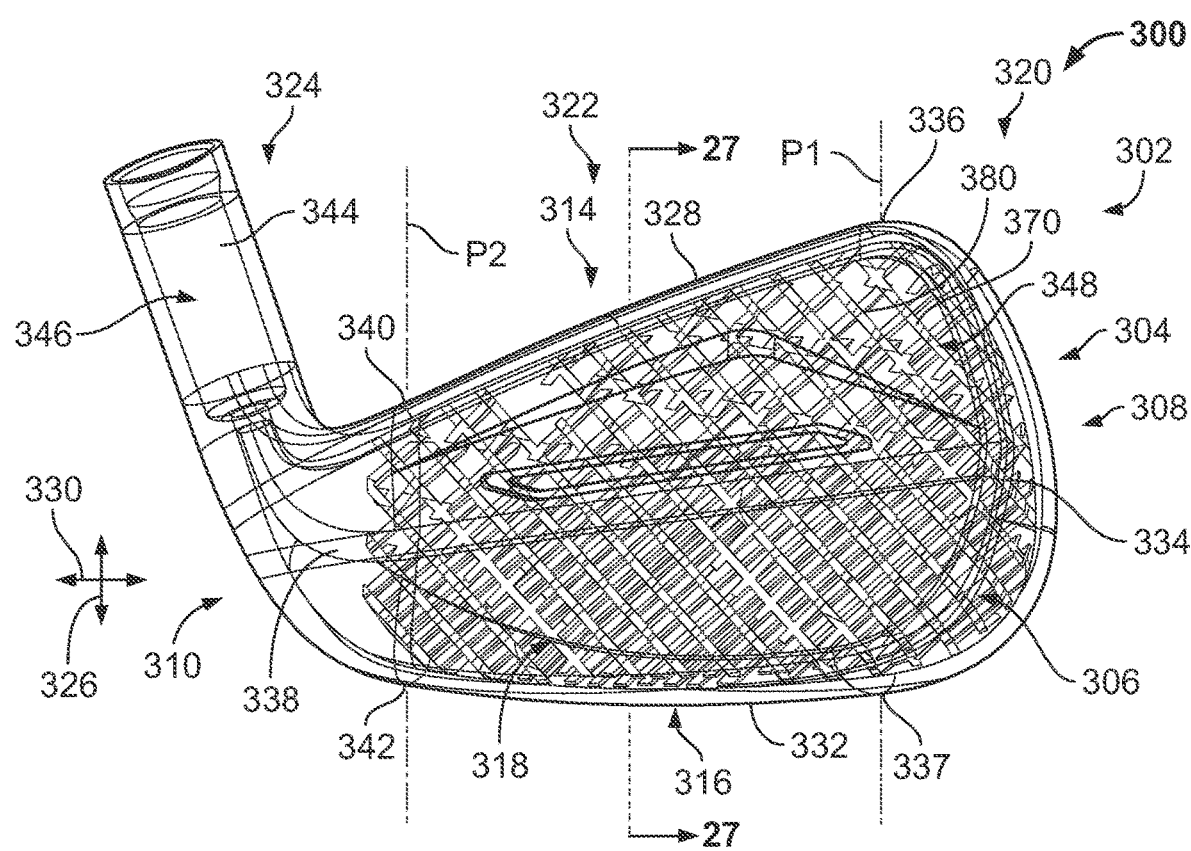
FIG. 26 is a rear view of the iron-type golf club head of FIG. 24 with an external shell transparent and a lattice structure extending over an internal cavity.
Figure 27:
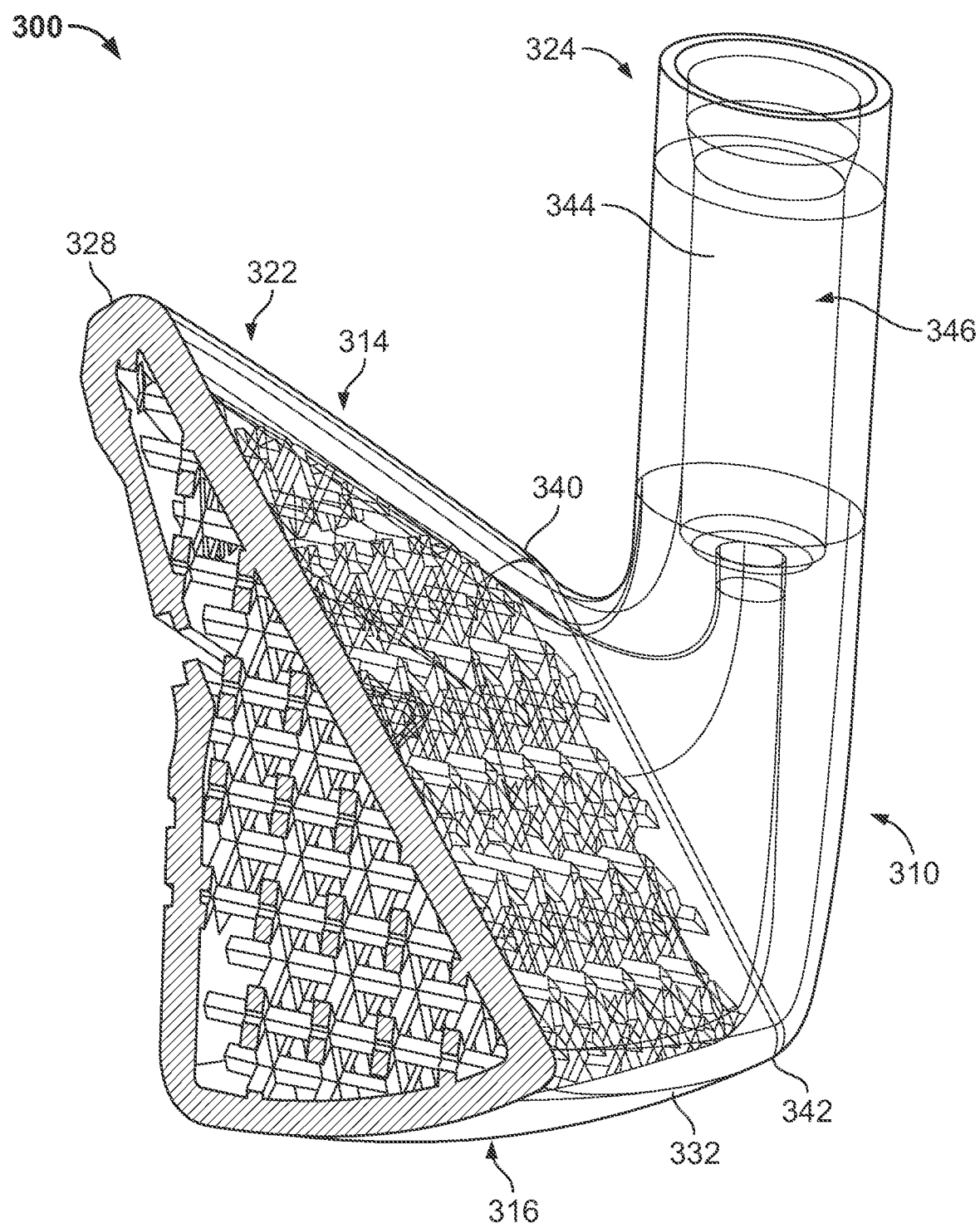
FIG. 27 is a cross-sectional view of the iron-type golf club head of FIG. 26 taken along line 27-27.
Figure 28:
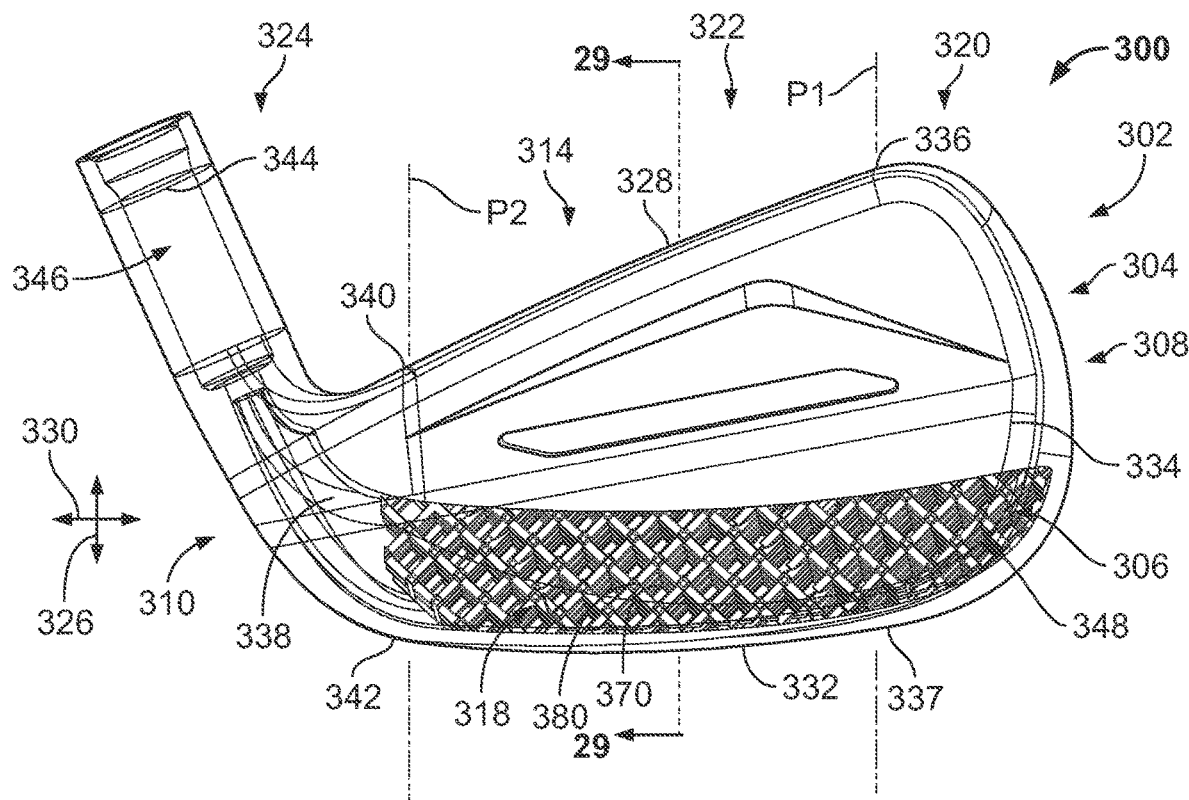
FIG. 28 is a rear view of the iron-type golf club head of FIG. 24 with an external shell transparent and a lattice structure extending over a portion of an internal cavity adjacent to a sole.
Figure 29:
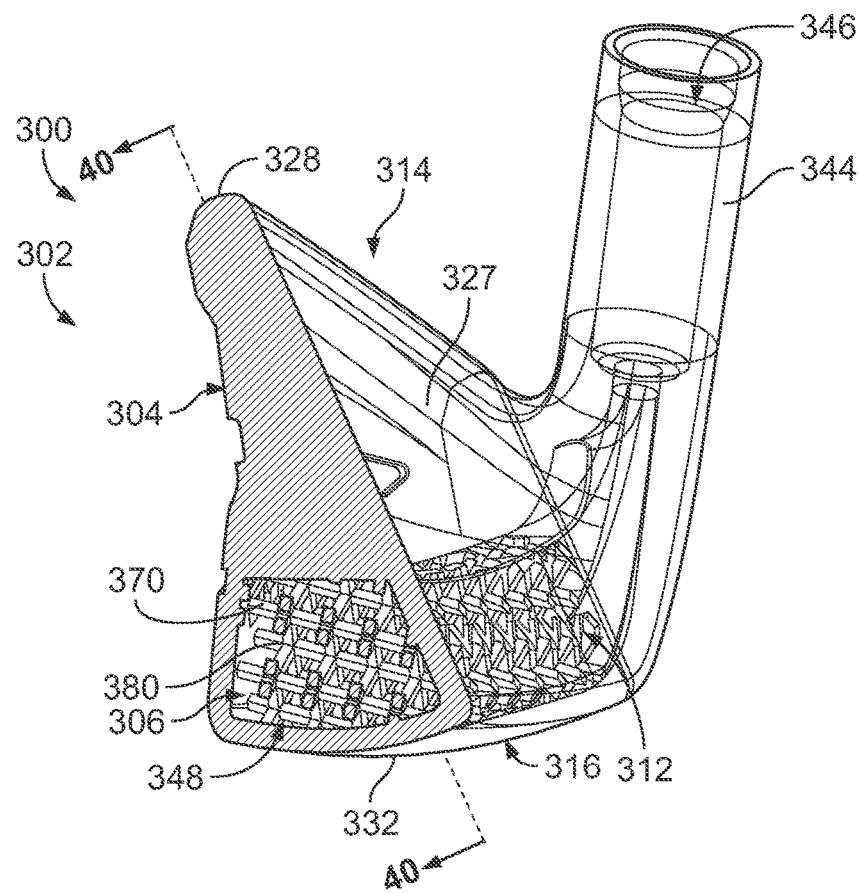
FIG. 29 is a cross-sectional view of the iron-type golf club head of FIG. 28 taken along line 29-29.
Figure 30:
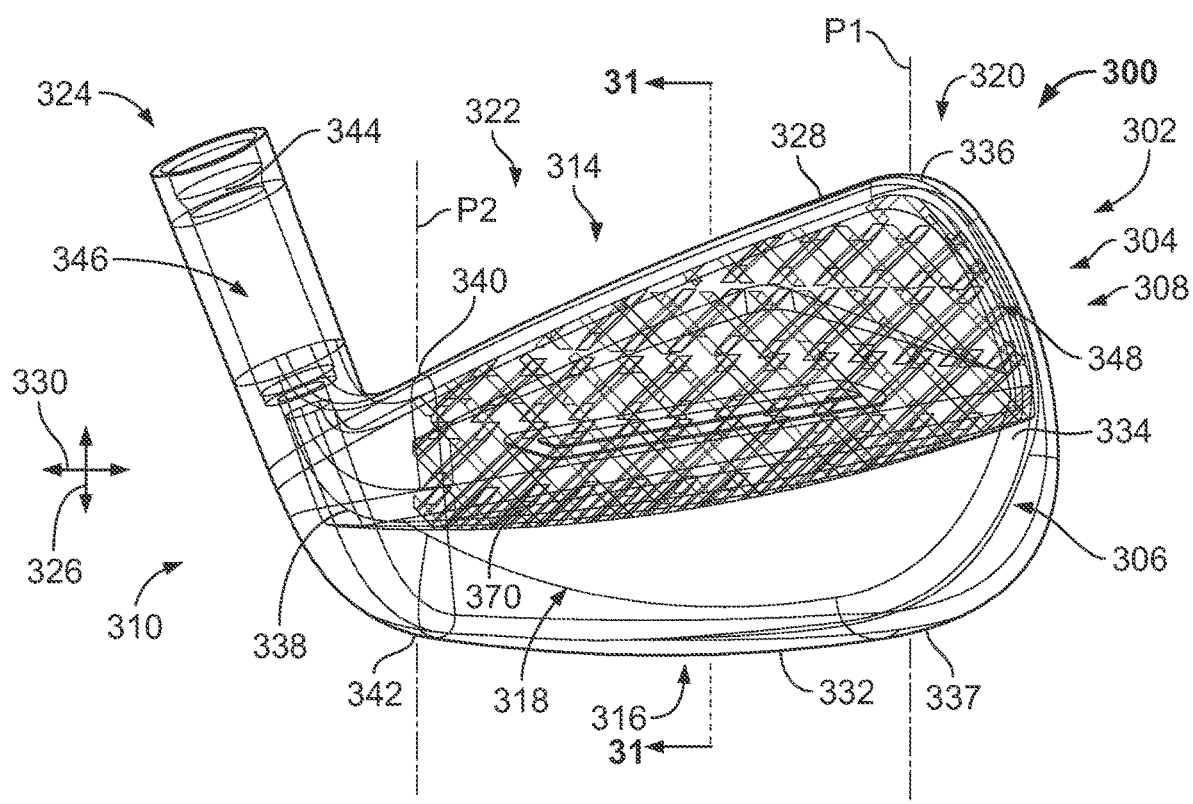
FIG. 30 is a rear view of the iron-type golf club head of FIG. 24 with an external shell transparent and a lattice structure extending over a portion of an internal cavity adjacent to a topline.
Figure 31:
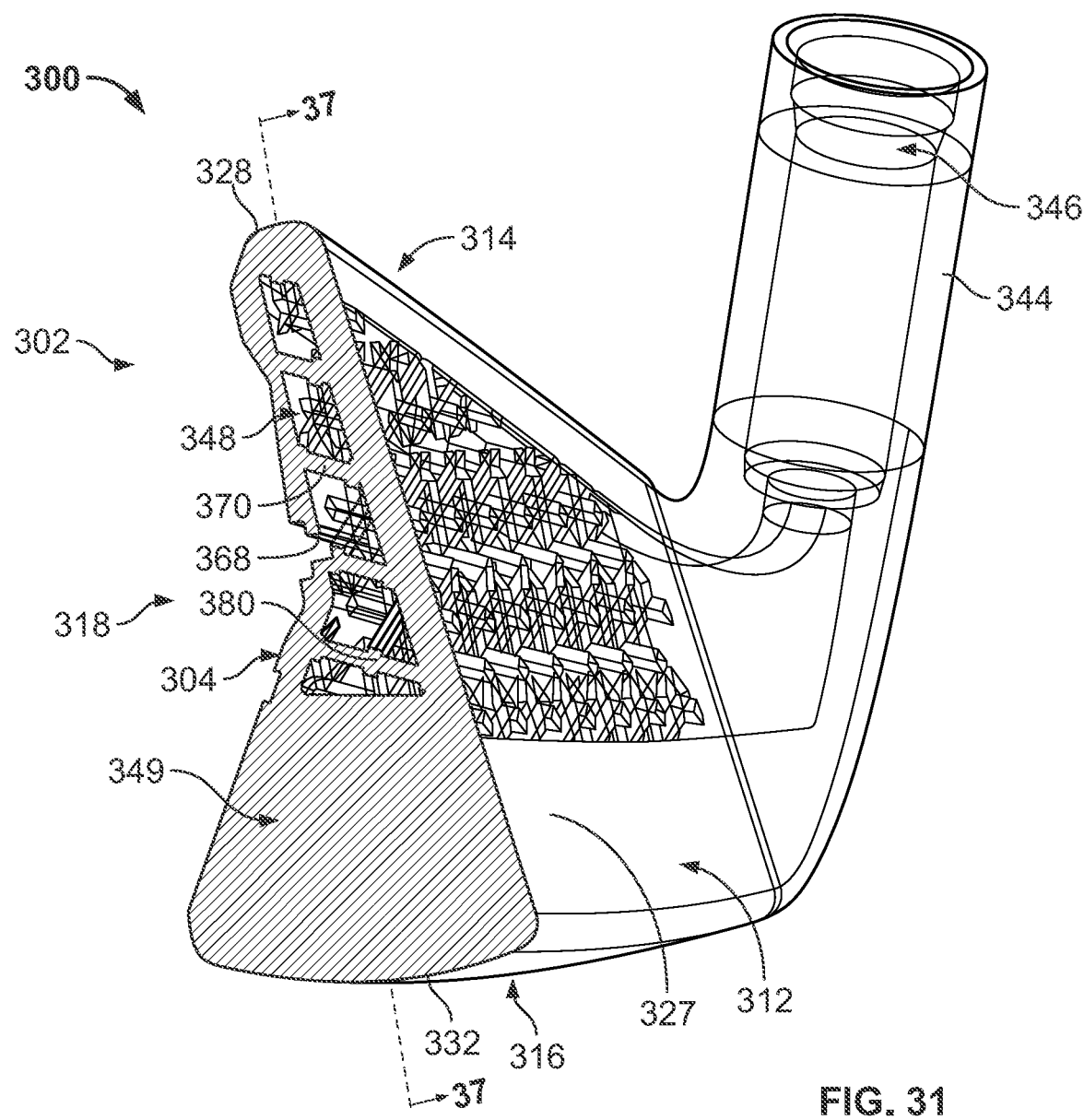
FIG. 31 is a cross-sectional view of the iron-type golf club head of FIG. 30 taken along line 31-31.

The iron-type golf club head 300 defines a toe side 308, a heel side 310, a front side 312, a top side 314, a bottom side 316, and a rear side 318. The body 302 includes a toe region 320, a medial region 322, and a heel region 324. Referring specifically to FIGS. 24 and 25, the toe region 320, the medial region 322, and the heel region 324 are defined by lines or planes P1 and P2 that extend through the iron-type golf club head 300 in a sole-topline direction 326 (e.g., a vertical direction from the perspective of FIGS. 24 and 25). The toe region 320 and the heel region 324 are arranged at laterally-opposing ends of the body 302, and the medial region 322 is arranged laterally between the toe region 320 and the heel region 324.

The front side 312 of the body 302 may define a front face 327 that extends along the front side 312 of the body 302 from the toe region 320, through the medial region 322, and into at least a portion of the heel region 324. In some embodiments, the front face 327 may define an entire front surface of the body 302 that extends laterally from the toe region 320, through the medial region 322, and into the heel region 324 to a junction between the front surface and a hosel 344 extending from the heel region 324. In some embodiments, a portion of the front face 327 defined along the medial region 322 defines a striking face, which may include a plurality of laterally-extending grooves that are spaced from one another in the sole-topline direction 326 (see FIG. 39).

The iron-type golf club head 300 defines a topline 328 extending laterally in a heel-toe direction 330 (e.g., a horizontal direction from the perspective of FIGS. 24 and 25) along the top side 314, and a sole 332 extending laterally in the heel-toe direction 330 along the bottom side 316. The toe region 320 includes a toe portion 334 of the body 302 that is defined by a portion of the body 302 between a distal end of the toe side 308 and the plane P1. In some embodiments, the plane P1 may be defined along a lateral edge of the grooves (not shown) formed in the front side 312 that is adjacent to the toe side 308. In some embodiments, the plane P1 may intersect the top side 314 of the toe portion 334 at a toe-topline intersection point 336 along the topline 328 where the slope of a line tangent to the topline 328 is approximately zero (e.g., a point where a line tangent to the periphery of the top side 314 is approximately parallel to the ground at address). In these embodiments, the plane P1 may extend through the toe portion 334 in the sole-topline direction 326 to a toe-sole intersection point 337.

The heel region 324 includes a heel portion 338 of the body 302 that is defined by a portion of the body 302 between a distal end of the heel side 310 and the plane P2. In some embodiments, the plane P2 may be defined along a lateral edge of the grooves (not shown) formed in the front side 312 that is adjacent to the heel side 310. In some embodiments, the plane P2 may intersect the top side 314 at a heel-topline inflection point 340 (e.g., a point where the periphery of the top side 314 transitions from concave down to concave up). In these embodiments, the plane P2 may extend through the heel portion 338 in the sole-topline direction 326 to a heel-sole intersection point 342.

The heel portion 338 includes the hosel 344 that extends from the heel portion 338 at an angle (e.g., a lie angle formed between a plane parallel to the ground on which the club head rests at address and a center axis defined through the hosel 344) in a direction away from the toe portion 334. The hosel 344 defines a hosel cavity 346 (see FIG. 26) within which a shaft (not shown) may be inserted for coupling to the iron-type golf club head 300. In some embodiments, a ferrule (not shown) may abut or be at least partially inserted into the hosel 344. In some embodiments the hosel cavity 346 may extend through at least a portion of the hosel 344.

The topline 328 may extend along an outer periphery of the top side 314 of the body 302 from the heel-topline inflection point 340, along the medial region 322, to the toe-topline intersection point 336. The sole 332 may extend along a periphery of the bottom side 316 of the body 302 from the toe-sole intersection point 337, along the medial region 322, to the heel-sole intersection point 342.

With reference to FIGS. 26-31, the internal cavity 306 of the body 302 includes a lattice structure 348 arranged within at least a portion of the internal cavity 306. For example, in some embodiments, the lattice structure 348 may extend in the sole-topline direction 326 along the entire internal cavity 306 (see FIGS. 26 and 27). In some embodiments, the lattice structure 348 may extend in the sole-topline direction 326 along a portion of the internal cavity 306. For example, the lattice structure 348 may extend from an end of the internal cavity 306 adjacent to the topline 328 to a location between the topline 328 and the sole 332 (see FIGS. 30 and 31). Alternatively, the lattice structure 348 may extend from an end of the internal cavity 306 adjacent to the sole 332 to a location between the sole 332 and the topline 328 (see FIGS. 28 and 29).

In some embodiments, the lattice structure 348 may extend laterally in the heel-toe direction 330 along substantially the entire internal cavity 306. For example, the lattice structure 348 may extend laterally in the heel-toe direction 330 from the toe region 320, through the medial region 322, and into at least a portion of the heel region 324. In some embodiments, the lattice structure 348 may extend laterally in the heel-toe direction 330 a distance defined by a lateral extension of the front face 327 (e.g., the lattice structure 348 may extend the same lateral distance as the front face 327).

In general, the incorporation of the lattice structure 348 into the internal cavity 306 defines a lower density relative to a solid material (e.g., solid metal) filling within the internal cavity 306 of the same volume. Since the lattice structure 348 defines a lower density compared to a solid material (e.g., solid metal) filling of the same volume, a CG volume ratio defined as a ratio between a volume $V_L$ that the lattice structure 348 occupies in the internal cavity 306 to a volume $V_S$ that a solid portion 349 occupies within the internal cavity 306 may be altered to move the CG location in the sole-topline direction 326. In other words, an orientation of the lattice structure 348 between the topline 328 and the sole 332 (e.g., a distance that the lattice structure 348 extends over the internal cavity 306 in the sole-topline direction 326) and the volume ratio may define a CG defined by the body 302. The orientation of the lattice structure 348 and the volume ratio may be altered to define a desired CG location for the iron-type golf club head 300.

With specific reference to FIGS. 28-31, the arrangement, dimensions, and volume of the lattice structure 348 within the internal cavity 306 may be customized to define a high CG (e.g., a CG arranged closer to the topline 328) or a low CG (e.g., a CG arranged closer to the sole 332). For example, the iron-type golf club head 300 illustrated in FIGS. 28 and 29 may define a CG point 350 that is higher (e.g., closer to the topline 328) when compared to a CG point 352 defined by the iron-type golf club head 300 illustrated in FIGS. 30 and 31. This is due to the differences in the arrangement, dimensions, and volume of the lattice structure 348 illustrated in FIGS. 28-31. For example, arranging the lattice structure 348 adjacent to the topline 328 (see FIGS. 28 and 29) and filling a reminder of the internal cavity 306 adjacent to the sole 332 with the solid portion 349 (e.g., solid metal material that is formed layer by layer) provides more high density material adjacent to the sole 332 and, thereby, lowers the CG of the iron-type golf club head 300. Conversely, arranging the lattice structure 348 adjacent to the sole 332 (see FIGS. 30 and 31) and filling a reminder of the internal cavity 306 adjacent to the topline 328 with the solid portion 349 provides more high density material adjacent to the topline 328 and, thereby, raises the CG of the iron-type golf club head 300.

The incorporation of the lattice structure 348 in the internal cavity 306 of the iron-type golf club head 300 enables the CG location to be manipulated to any location between a CG defined by a completely solid body (e.g., the internal cavity 306 is completely filled with solid material) and a CG define by a completely hollow body (e.g., the internal cavity 306 is completely hollow or devoid of material). It should be appreciated that the volumes defined by the lattice structure 348 ($V_L$) and the solid portion 349 ($V_S$) of the internal cavity 306 do not need to be discretely defined along the sole-topline direction 326. That is, in some embodiments, the lattice structure 348 may include one or more solid portions 349 arranged on vertically-opposing sides thereof. For example, the lattice structure 348 may not originate from an internal side of the external shell 304 adjacent to the top side 314 or an internal side of the external shell 304 adjacent to the bottom side 316. Rather, the internal cavity 306 may include solid portions 349 that extend from the top and bottom internal sides of the external shell 304 that form the internal cavity 306 and the lattice structure 348 may be arranged between the solid portions 349. Alternatively, the internal cavity 306 may include one or more lattice structure 348 that are separated in the sole-topline direction 326 with the solid portion 349 arranged therebetween.

In some embodiments, the variability and control over the CG location provided by the incorporation of the lattice structure 348 into the iron-type golf club head 300 may be leveraged when designing and manufacturing a set of iron-type golf club heads. For example, a set of irons may include long irons (e.g., 1-iron through 5-iron), mid irons (e.g., 6-iron through 9-iron), short irons (e.g., pitching wedge through lob wedge), and it may be desirable to define varying CG locations for each iron within a set. In some embodiments, the various types of irons within a set may define varying CG locations (e.g., long irons define a low CG, mid irons define a middle CG, and short irons define a high CG, or another configuration). In any case, a set of iron-type golf club heads according to the present disclosure may include at least two iron-type golf club heads manufactured via an additive manufacturing process with a lattice structure incorporated in both of the iron-type golf club heads at varying CG volume ratios to define different CG locations along the sole-topline direction 326 for each of the iron-type golf club heads produced.

In some embodiments, a set of iron-type golf club heads according to the present disclosure may include a first golf club head and a second golf club head. The first golf club head may define a first orientation of a first lattice structure between a sole and a topline and a first volume ratio between a first lattice volume and a first solid volume. The second golf club head may define a second orientation of a second lattice structure between a sole and a topline and a second volume ratio between a second lattice volume and a second solid volume. In some embodiments, the second orientation may be different than the first orientation to define a different CG between the first golf club head and the second golf club head. In some embodiments, the second volume ratio may be different than the first volume ratio to define a different CG between the first golf club head and the second golf club head. In some embodiments, the second orientation may be different than the first orientation and the second volume ratio may be different than the first volume ratio to define a different CG between the first golf club head and the second golf club head.

In addition to the ability of the lattice structure 348 to manipulate the CG location of the iron-type golf club head 300, a stiffness defined along the external shell 304 in the regions occupied by the lattice structure 348 may be maintained, for example, similar to the stiffness support provided by the solid portion 349. For example, in some embodiments, the front face 327 of the body 302 is supported by (e.g., in engagement with) one of the lattice structure 348 and the solid portion 349 along an entire surface area thereof, which prevents local areas of non-uniform or reduced stiffness. In this way, for example, the incorporation of the lattice structure 348 into the iron-type golf club head 300 enables the iron-type golf club head 300 to provide the advantages of various iron designs to a user. For example, the iron-type golf club head 300 may provide the consistent launch conditions and distance variability of a low volume (e.g., muscle back) iron design and the increased MOI of a mid or high volume iron design.

In some embodiments, the iron-type golf club head 300 may be designed to provide enhanced distance (e.g., a utility iron) and may include a lattice structure that is attached to the body but does not support the front face or a face insert coupled to the body. For example, with reference to FIGS. 32 and 33, the iron-type golf club head 300 may include a face insert 354 that is coupled to the front side 312 of the body 302 and attached (e.g., via welding) around a periphery of the front side 312. When the face insert 354 is coupled to the body 302, the internal cavity 306 may be enclosed by the external shell 304 and the face insert 354, and the lattice structure 348 may be enclosed within the internal cavity 306.

In the illustrated embodiment, the lattice structure 348 extends from the internal surfaces of the external shell 304. For example, the lattice structure 348 may be attached to or supported by the internal surfaces of the external shell 304 on the body 302 adjacent to the toe side 308, the heel side 310, the top side 314, the bottom side 316, and the rear side 318. The lattice structure 348 may be interrupted by the solid portion 349 that, in the illustrated embodiment, extends along the bottom side 316 from the toe region 320 to a location between the toe region 320 and the heel region 324 (see FIG. 32). When the face insert 354 is attached to the body 302, a gap 356 may be formed between a termination plane T defined by the lattice structure 348 (e.g., a plane generally parallel to the face insert 354 along which the lattice structure 348 terminates) and the face insert 354. In other words, the lattice structure 348 may be set back from the face insert 354 leaving the face insert 354 unsupported by the lattice structure 348.

Figure 32:
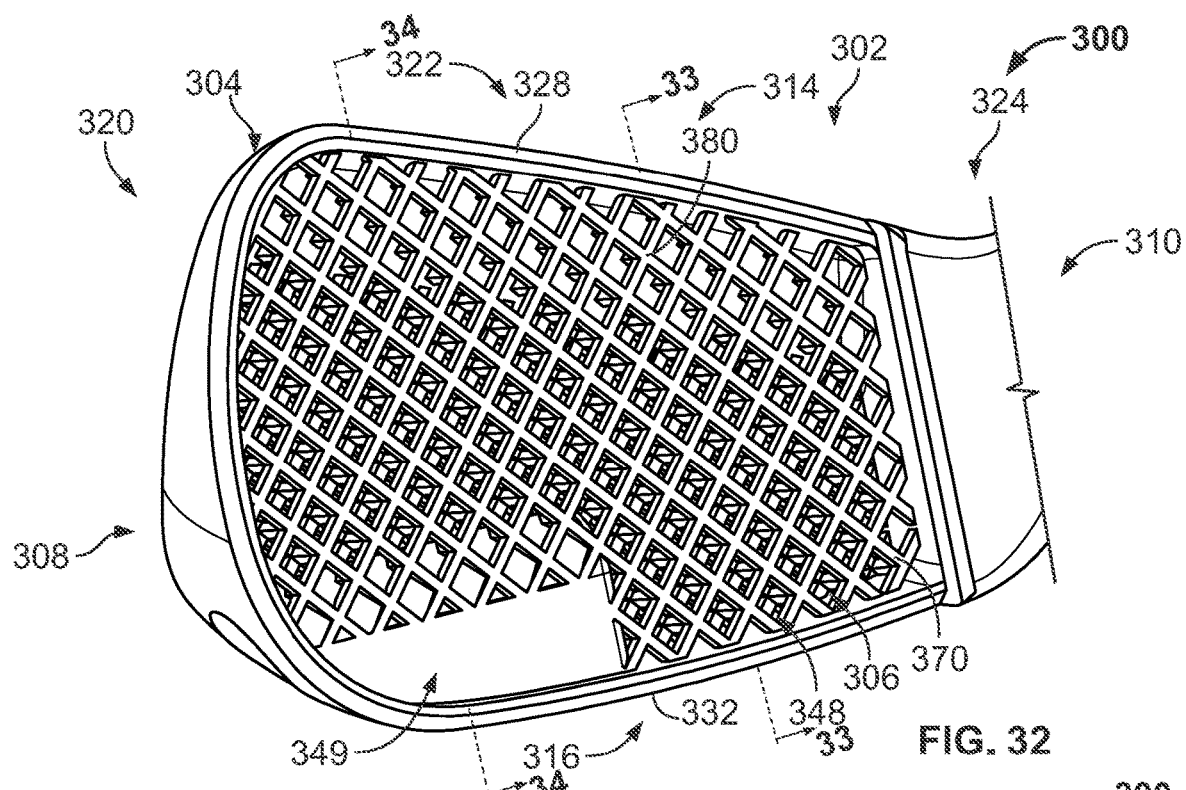
FIG. 32 is a top, front, right isometric view of an iron-type golf club head including a lattice structure with a gap formed between the lattice structure and a face insert with the face insert hidden.
Figure 33:
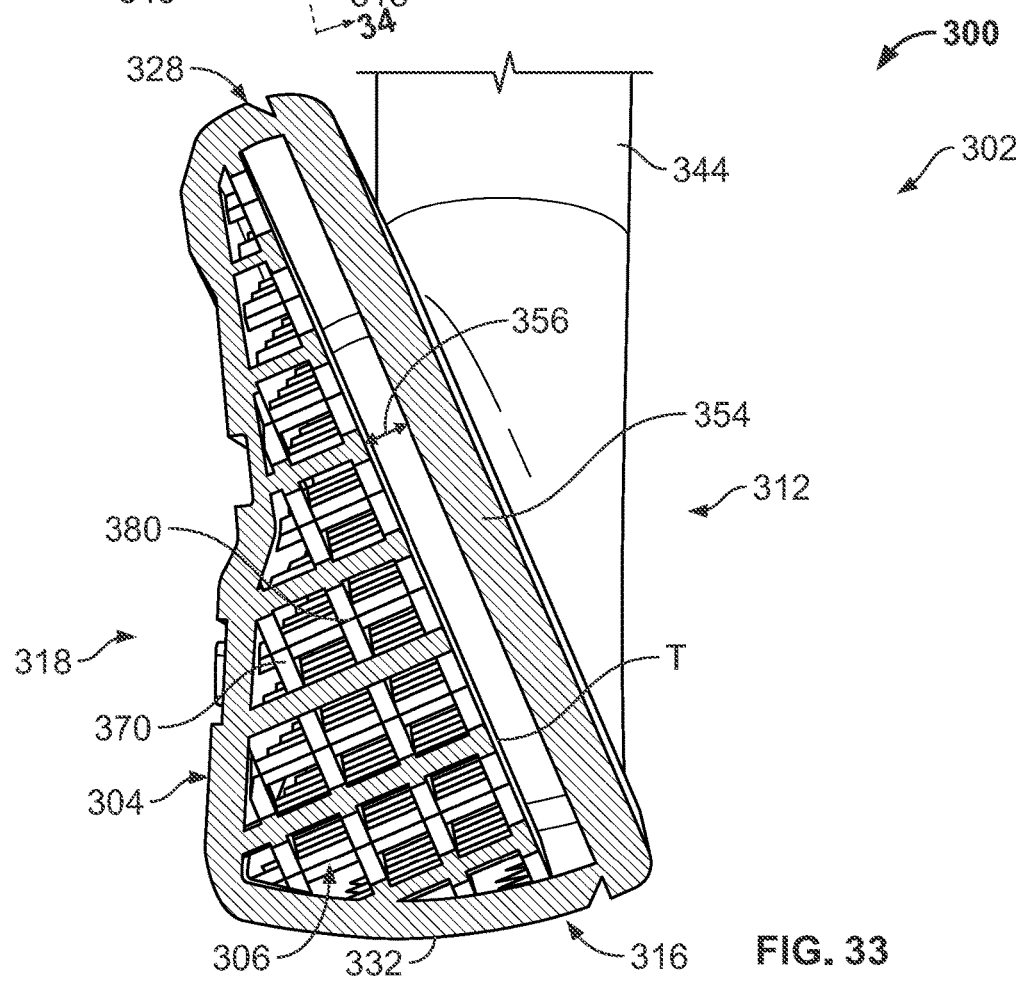
FIG. 33 is a cross-sectional view of the iron-type golf club head of FIG. 32 taken along line 33-33.

The design and construction of the iron-type golf club head 300 illustrated in FIGS. 32 and 33 provides support for the face insert 354 only around the periphery thereof and creates a stiffer body structure, which allows the face insert 354 to be thinner, thereby enhancing performance (e.g., increased distance). In some embodiments, the face insert 354 may be manufactured via an additive manufacturing process. As described herein, in some embodiments, an orientation of a golf club head relative to a build plane during an additive manufacturing process may improve the quality and performance of the green part of the final post-sintering product. In configurations where a face insert is not planar and includes, for example, a portion of a sole integrated with a striking surface (i.e., an L-cup face insert), it may be beneficial to orient the face insert such that the front face or striking surface is rotationally offset from the build plane. In this way, for example, the layer lines formed during the additive manufacturing process may not pass through the edge where the front face transitions to the sole (e.g., a leading edge). That is, if the face insert were manufactured with the front face oriented parallel to the build plane, a layer line may pass through the leading edge of the face insert, which may cause defects in the green part and/or the post-sintered part. This is avoided by printing the face insert with the front face rotationally offset relative to the build plane. In addition, the rotational orientation of the face insert relative to the build plane may be tailored to maximize efficiency of the additive manufacturing process (i.e., arrange as many face inserts within a given build area to manufacture as many face inserts as possible during a build).

Figure 34:
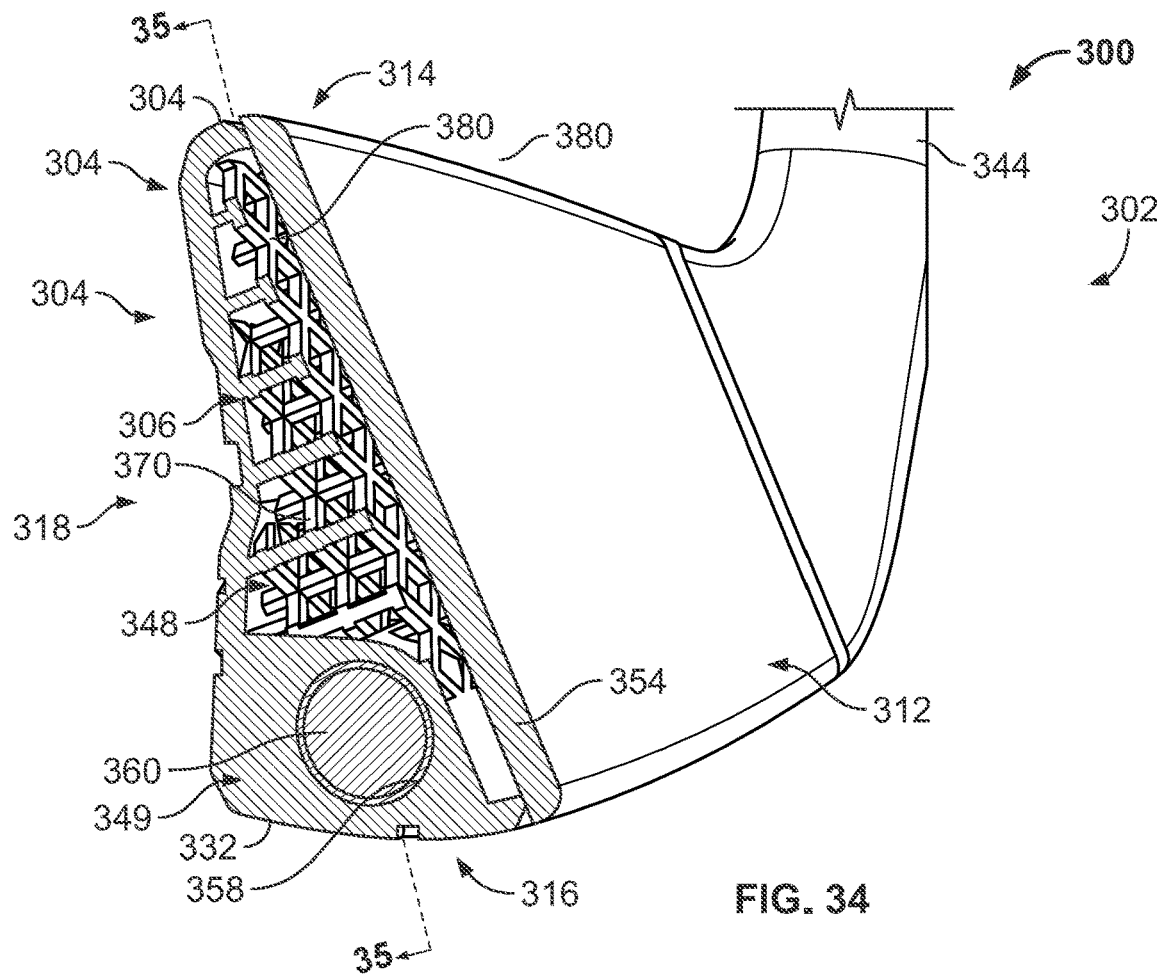
FIG. 34 is a cross-sectional view of the iron-type golf club head of FIG. 32 taken along line 34-34 illustrating with a weight bar.
Figure 35:
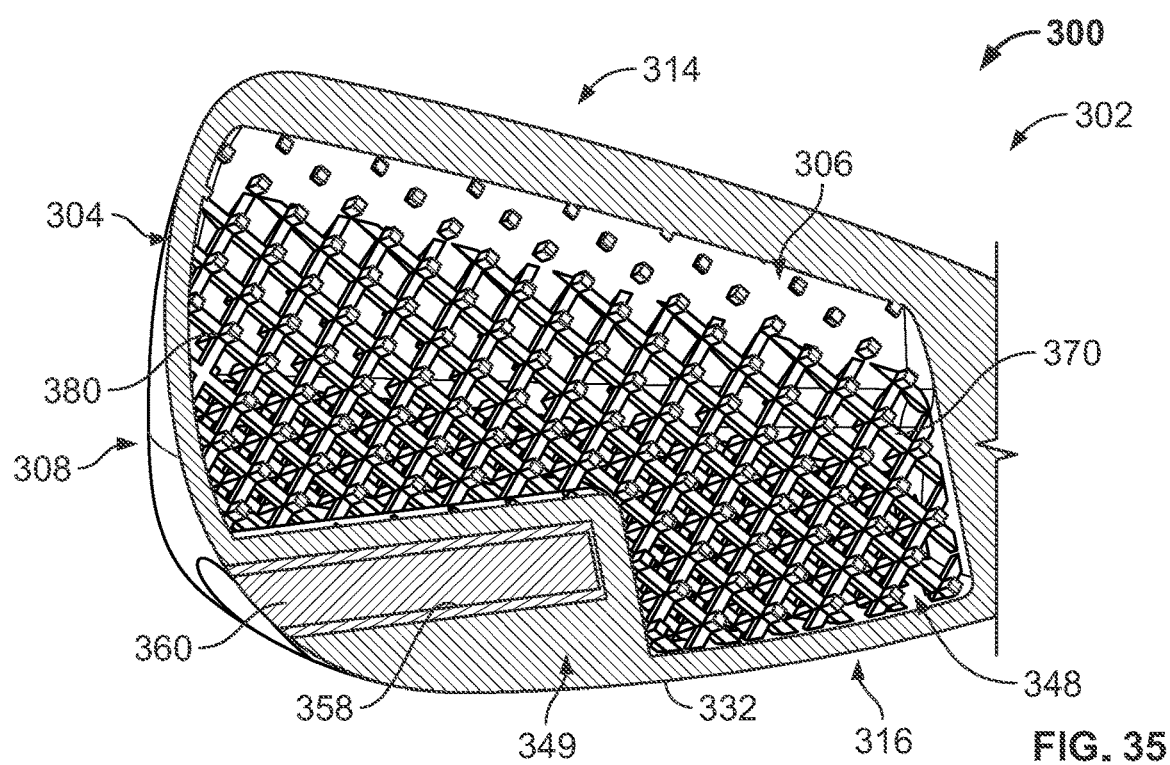
FIG. 35 is a cross-sectional view of the iron-type golf club head of FIG. 34 taken along line 35-35.

With reference to FIGS. 34 and 35, in some embodiments, an aperture 358 may be formed, for example, via additive manufacturing, that extends laterally into and through the solid portion 349. The aperture 358 may extend laterally from the toe side 308 of the solid portion 349 to a location between the toe side 308 and an end of the solid portion 349. In some embodiments, the aperture 358 may be filled with a weight bar 360 (e.g., tungsten). The incorporation of the weight bar 360 may aid in lowering the CG location of the iron-type golf club head 300 along the sole-topline direction 326.

In some embodiments, the iron-type golf club head 300 may be manufactured to enable the weight bar 360 to be attached or secured within the aperture 358 via a sintering process. For example, the weight bar 360 may be manufactured with dimensions that are a predetermined percentage larger than the factory finish dimensions. In some embodiments, the predetermined percentage may be about 10%, or about 15%, or about 20%, or about 25%, or about 30% larger than the factory finish dimensions of the iron-type golf club head. In some embodiments, the predetermined percentage may be between about 10% and about 30%, or between about 15% to about 25%, or between about 16% and about 20%. In some embodiments, the weight bar 360 may be manufactured via an additive manufacturing process. In some embodiments, the weight bar 360 may be formed by a metal injection molding process. In any case, once the weight bar 360 is initially manufactured with dimensions that are the predetermined percentage larger than the factory finish dimensions, the weight bar 360 may go through a sintering process. During the sintering process, the weight bar 360 may shrink to at least one of the factory finish dimensions. For example, the weight bar 360 may shrink to a factory finish diameter, but may still define a length that is longer than a factory finish length to enable the weight bar 360 to be cut to length and conform to the outer profile of the body 302 during post-processing.

Similar to the weight bar 360, the body 302 of the iron-type golf club head 300 may be manufactured with dimensions that are a predetermined body percentage larger than the factory finish dimensions. In some embodiments, the body 302 may be manufacturing via a binder jetting process and the predetermined body percentage may be about 10%, or about 15%, or about 20%, or about 25%, or about 30% larger than the factory finish dimensions of the iron-type golf club head. In some embodiments, the predetermined percentage may be between about 10% and about 30%, or between about 15% to about 25%, or between about 16% and about 20%. Once the body 302 is initially manufactured with dimensions that are larger than the factory finish dimensions, the body 302 may go through a sintering process. Prior to the sintering process, the post-sintered weight bar 360 may be inserted into the body 302 at the predefined location (e.g., the aperture 358). The sintering process may shrink the body 302 to the factor finish dimensions. During the sintering process, the body 302 may shrink around the weight bar 360 and form an interference fit between the body 302 and the weight bar 360, thereby securing the weight bar 360 within the body 302 without requiring any secondary adhesion techniques (e.g., welding, adhesive, etc.).

By first sintering the weight bar 360 and then sintering the body 302 with the post-sintered weight bar 360 installed within the body 302, the iron-type golf club head 300 may naturally form an interference fit between the body 302 and the weight bar 360, which secures the weight bar 360 within the body 302. For example, once the weight bar 360 is sintered, it may be substantially prevented from further shrinkage, which allows the secondary sintering of the iron-type golf club head 300 to shrink around the weight bar 360 and form a natural interference fit therebetween. In addition, this manufacturing process avoids issues that may arise due to sintering a golf club head that includes metals with different densities. For example, if the weight bar 360 and the body 302 were sintered for the first time together, the weight bar 360 would shrink more than the body 302 due to increased density relative to the body 302. As such, the weight bar 360 may not fit within the body 302 post-sintering and add inefficiencies to the manufacture of the iron-type golf club head 300. Further, the staged sintering process avoids issues that arise due to different metals requiring different sintering temperatures. In general, this staged sintering process may be used to couple a weight bar to a body of a golf club head as long as the weight bar and a cavity within which the weight bar is to be arranged define a similar or the same shape.

In some embodiments, rather than a weight insert, the density of a golf club head according to the present disclosure may be controlled by the additive manufacturing process. For example, in a DMLS process, a speed at which the laser translates over a component and creates a layer is proportional to a density of the metal formed. As such, a speed at which the laser translates over selective portions when manufacturing a golf club head layer by layer may be controlled to define a desired density profile over the entire volume of the golf club head. In the embodiment of FIGS. 34 and 35, the laser may be slowed down when traversing over portions of the iron-type golf club head 300 within the solid portion 349. In this way, for example, the solid portion 349 may include at least a portion thereof that defines a higher density and aids in lowering the CG of the iron-type golf club head 300, similar to the weight bar 360.

Figure 36:
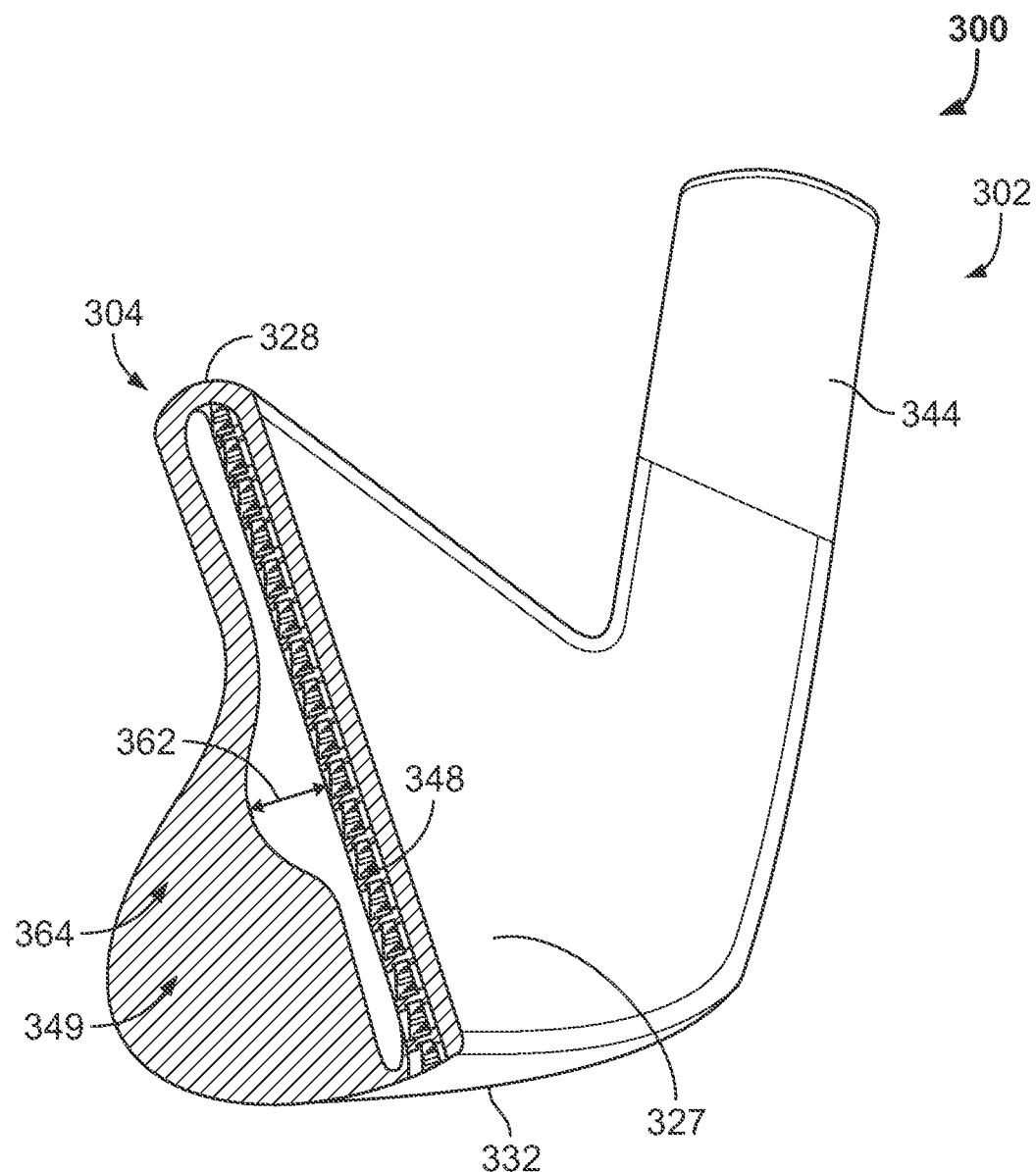
FIG. 36 is cross-sectional view of an iron-type golf club head including a lattice structure supporting a front face.

In some embodiments, the iron-type golf club head 300 may be designed to incorporate a lattice structure that is attached only behind the front face and does not support a remainder of the body. With reference to FIG. 36, the iron-type golf club head 300 may include the lattice structure 348 arranged on a rear surface of the front face 327. A thickness (e.g., a distance that the lattice structure 348 extends away from the front face 327 along a direction parallel to a normal defined by the front face 327) defined by the lattice structure 348 may be dimensioned such that lattice structure 348 only engages the front face 327 and the remainder of the body 302 may be unsupported by the lattice structure 348. In other words, a gap 362 may be arranged between the lattice structure 348 and a rear portion 364 of the body 302 (e.g., a portion of the body 302 arranged reward of the front face 327), which may be fabricated from solid material (e.g., solid metal that is formed layer by layer), along an entire area defined by the front face 327. In this way, for example, the stiffness of the front face 327 may be increased (e.g., when compared to a front face/face insert without a lattice structure connected thereto). In some embodiments, for example, the lattice structure 348 may be arranged over a portion of the rear surface of the front face 327, rather than an entirety of the rear surface.

The increased stiffness provided by the lattice structure 348 being attached to the front face 327 may provide more consistent launch conditions and improved distance variability similar to a low volume (e.g., muscle back) iron design. In addition, a shape, size, and mass distribution in the rear portion 364 may be easily tailored or customized via additive manufacturing to allow for variations in CG location, MOI, etc.

As described herein, the size, shape, volume, and arrangement of the lattice structure 348 within the body 302 of the iron-type golf club head 300 may be controlled or designed to provide stiffness to selective portions of the body 302, the front face 327, and/or the face insert 354. With the lattice structure 348 acting as a local stiffening structure, the location of the lattice structure 348 within the body 302 may directly impact performance of the iron-type golf club head 300 (e.g., sound, feel, ball speed, distance variability, launch conditions, etc.).

In some embodiments, the stiffness differences in the front face 327 provided by the support or lack thereof by the lattice structure 348 may be leveraged to produce a set of iron-type golf club heads with varying face stiffness. Similar to conventional iron-type golf club sets that transition from cavity back/hollow construction to muscle back design as they transition from long irons to short irons, the design of the iron-type golf club head 300 may be varied using additive manufacturing to provide varying performance characteristics as the iron-type golf club heads transition from long irons to short irons. For example, a set of iron-type golf club heads according to the present disclosure may include at least two iron-type golf club heads that transition from a front face or face insert that is not supported by a lattice structure to a front face or face insert that is at least partially supported by a lattice structure to leverage the performance benefits of these different designs described herein in a single set of iron-type golf club heads.

As described herein, there are several performance and design advantages to incorporating a lattice structure into an iron-type golf club head, or another type of golf club head, via additive manufacturing. In order to effectively manufacture the iron-type golf club head according to the present disclosure certain design aspects should be considered. For example, many additive manufacturing processes utilize a metal powder bed to produce components layer by layer, as described herein. Similar to the putter-type golf club head 40, iron-type golf club heads may be required to be de-caked of residual metal powder that remains after the initial scavenging of the printed component from the powder bed.

Figure 37:
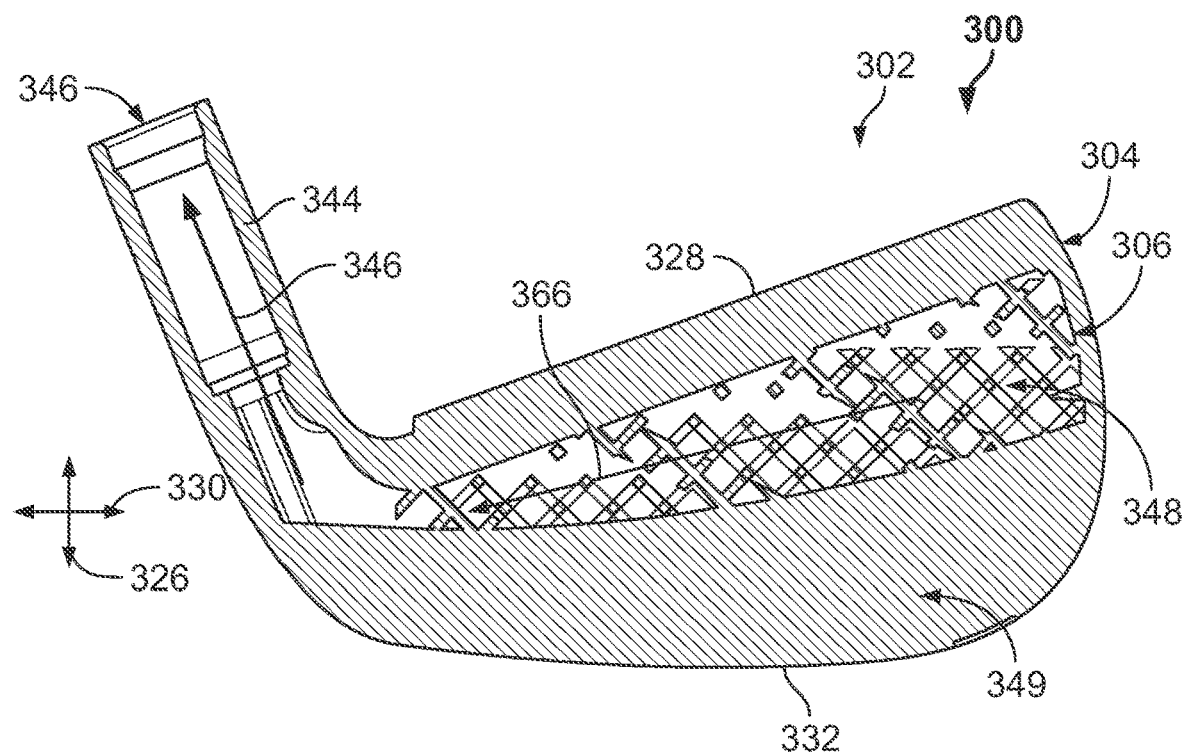
FIG. 37 is a cross-sectional view of the iron-type golf club head of FIG. 31 taken along line 37-37.
Figure 38:
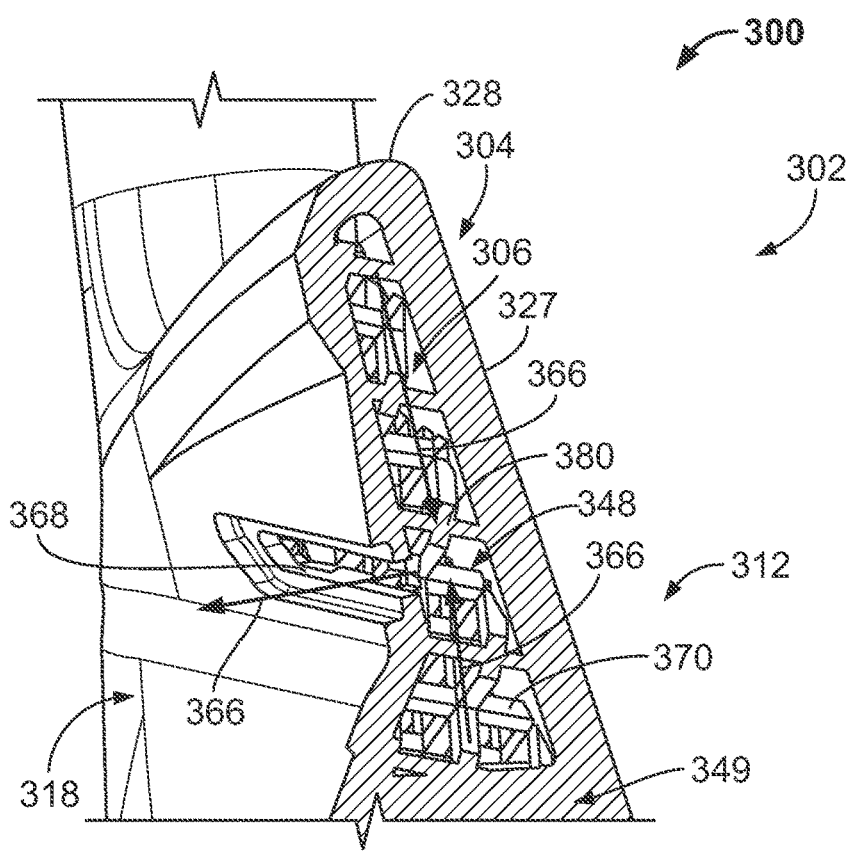
FIG. 38 is a cross-sectional view of the iron-type golf club head of FIG. 31 illustrating a slot formed in a rear side.

In general, an iron-type golf club head according to the present disclosure may define a flow path that extends through the body to allow a fluid (e.g., gas) to be forced through or sucked out of the body. In some embodiments, the flow path may be formed via apertures or slots formed in the body and may extend through a lattice structure. Referring to FIGS. 37 and 38, in some embodiments, the body 302 may define a flow path 366 that extends along the internal cavity 306 and the hosel cavity 346. Specifically, the lattice structure 348 may be formed by a plurality of segments that form a plurality of cutouts, or absences of material, between the plurality of segments. In this way, for example, fluid flow may occur through the lattice structure 348. In some embodiments, the lattice structure 348 may include shapes or surfaces that define one or more cutouts, or absences of material, to enable fluid flow therethrough.

The internal cavity 306, including the lattice structure 348 formed therein, may be in fluid communication with the hosel cavity 346 and at least one other aperture or slot formed in the body 302. For example, with specific reference to FIG. 38, a slot 368 may be formed in the rear side 318 of the body 302 that extends laterally across the body 302. In this embodiment, the flow path 366 may extend from the hosel cavity 346, along the lattice structure 348, and through the slot 368 to define a flow path that extends through the body 302. In this way, for example, pressurized fluid (e.g., gas), a vacuum, a brush, a tool, or gravity may be applied to the flow path 366 to aid in removing powdered metal and excess material from the additive manufacturing process (i.e., de-caking).

In some embodiments, the iron-type golf club head 300 may not include the slot 368 and, rather, may include an aperture (not shown) formed, for example, in the toe portion 334. The aperture (not shown) formed in the toe portion 334 may extend into the internal cavity 306 to provide fluid communication with the lattice structure 348. The aperture (not shown) may be utilized after manufacturing the body 302 via an additive manufacturing process to provide compressed fluid (e.g., gas) or a vacuum to the flow path 366 to aid in removing powdered metal and excess material. After the leveraging the flow path 366 for the de-caking process, the aperture may be plugged, for example, by a screw or a plug to prevent debris from entering the internal cavity 306 during use.

In some applications, the arrangement and number of openings that form a flow path may be varied dependent on the type additive manufacturing process being used to form a golf club head. For example, in an additive manufacturing process where the manufactured part defines a density that is close to a solid metal part (e.g., SLM, DMLS, etc.), the number of openings in a flow path may be reduced when compared to an additive manufacturing process where the manufactured part defines a lower density and higher porosity (e.g., binder jetting). The lower density and high porosity defined by the green part after a binder jetting process may be susceptible to damage if high pressure fluid is used to remove excess metal powder from the part. For example, blowing the metal powder over the green part after a binder jetting process may act like a sand blaster and affect the quality of the green part. For these reasons, it may be beneficial to include at least two openings in a flow path for a golf club head manufactured using, for example, a binder jetting process. In any case, a golf club head manufactured using an additive manufacturing process may be designed to include at least one opening into a flow path from with excess material may be removed from the manufactured part.

As described herein, an iron-type golf club head according to the present disclosure may be manufactured using a binder jetting process, an SLM, a DMLS additive manufacturing process, or another direct laser metal melting process. In DMLS, for example, support structures are leveraged to attach the component being manufactured to a build plate and to protect against warping/distortion that may occur due to the high temperatures utilized during the additive manufacturing process. In some instances, when a lattice structure is created by an additive manufacturing process (e.g., DMLS), it may need support structures during printing. It is advantageous to avoid creating support structures because they are difficult to remove, especially from internal cavities and overhangs. The necessity for support structures is dependent on the additive manufacturing process, orientation of the lattice structure, and design of the lattice within the club head.

In some embodiments, a golf club head manufactured using an additive manufacturing process according to the present disclosure may include a lattice structure that is self-supporting and does not require internal supports to be created. In general, print orientation (i.e., the orientation of a build plane along which the golf club head is formed layer by layer) relative to lattice structure design can ensure that the lattice structure is self-supporting.

Figure 39:
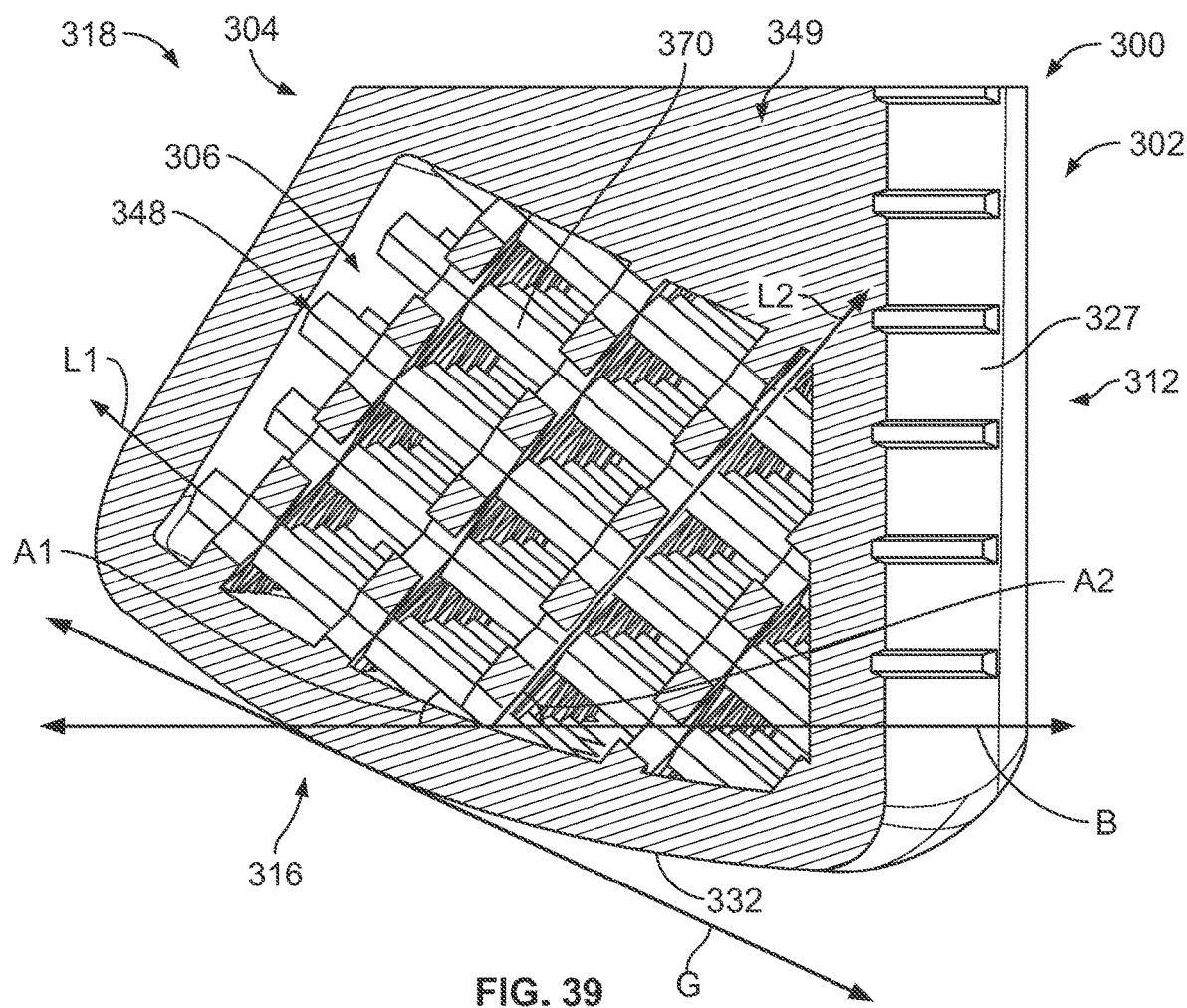
FIG. 39 is an enlarged view of a portion of the cross-sectional view of the iron-type golf club head of FIG. 29.
Figure 40:
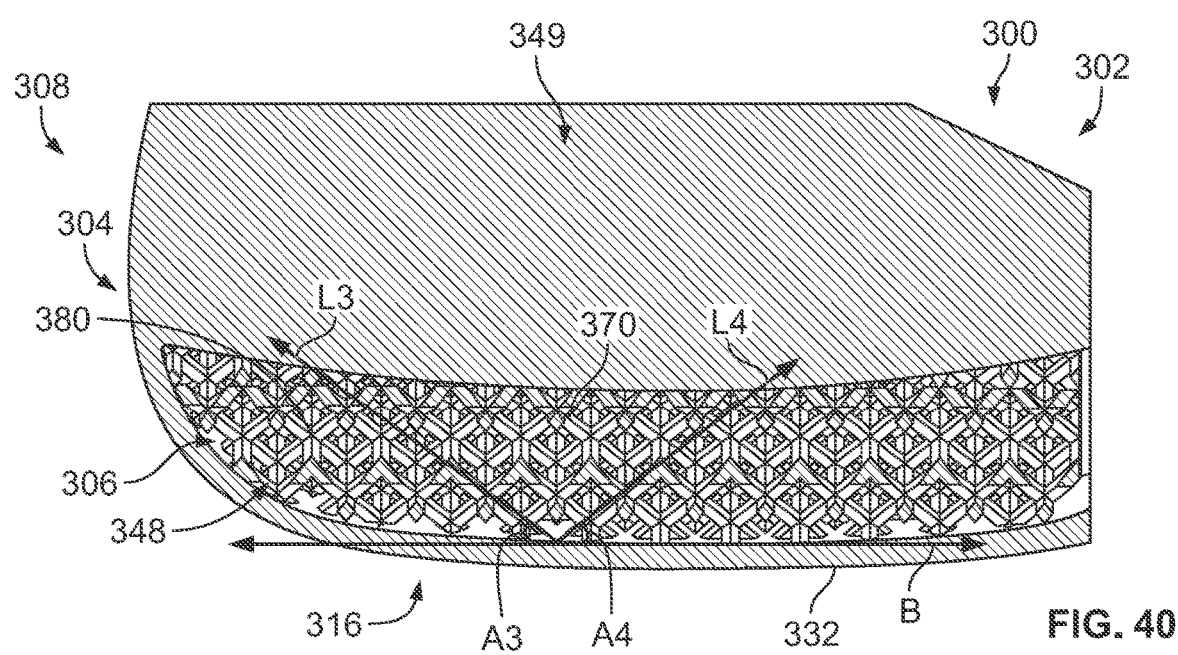
FIG. 40 is a cross-sectional view of the iron-type golf club head of FIG. 29 taken along line 40-40.

Referring to FIGS. 39 and 40, a second plane or build plane B may be defined as a plane along which the iron-type golf club head 300 is printed layer by layer during the additive manufacturing process. In the illustrated embodiment, the build plane B is rotationally offset from a first plane or ground plane G defined by the body 302 and that is arranged parallel to the ground on which the iron-type golf club head 300 may be placed at address. As described herein, when manufacturing a golf club head via an additive manufacturing process, it is beneficial to ensure that the layer lines created during the additive manufacturing process avoid sharp surface interfaces (e.g., corners, edges, etc.) that fall along layer line edges. To leverage the benefits of avoiding sharp surface interfaces that fall along layer line edges, the build plane B may be rotationally offset from the ground plane G, when viewed from the toe side 308 (see FIG. 39) or the heel side 310, which results in the iron-type golf club head 300 being be printed layer by layer at an angle that is offset by about 30 degrees with respect to the ground plane G (e.g., 30 degrees clockwise from the perspective of FIG. 39). In some embodiments, the iron-type golf club head 300 may be printed along a build plane B that is offset at an angle of between about 0 degrees and about 175 degrees, or between about 5 degrees and 160 degrees, or between about 5 and about 140 degrees, or between about 5 degrees and 120 degrees, or between about 5 degrees and 90 degrees, or 5 degrees and about 60 degrees, or between about 10 degrees and about 50 degrees, or between about 20 degrees and about 40 degrees with respect to the ground plane G.

The lattice structure 348 may define one or more lattice build angles relative to the build plane B. Each of the lattice build angles is defined along a common plane defined by the lattice structure 348. For example, the lattice structure 348 may be formed by a plurality of segments 370 that extend from an internal boundary of the internal cavity 306 to either another internal boundary or the solid portion 349. In the illustrated embodiment, the internal cavity 306 may be formed by an internal sole surface 372, an internal rear surface 374, an internal front surface 376, and an internal top surface 378. The internal top surface 378 is formed by the interface between the solid portion 349 and the lattice structure 348.

In the illustrated embodiment, the lattice structure 348 defines a plurality of planes along which the plurality of segments 370 extend. With specific reference to FIG. 39, the lattice structure 348 defines a lattice plane L1 that forms a lattice build angle A1 with respect to the build plane B, and a lattice plane L2 that forms a lattice build angle A2 with respect to the build plane B. Each of the lattice planes L1, L2 is formed by a portion of the plurality of segments 370 that are aligned and oriented at the respective lattice build angle A1, A2 relative to the build plane B. The lattice structure 348 includes a plurality of portions that align with the lattice planes L1, L2, which are spaced from one another a distance that is governed by the length and orientation of the plurality of segments 370 within the lattice structure 348.

With specific reference to FIG. 40, the lattice structure 348 defines a lattice plane L3 that forms a lattice build angle A3 with respect to the build plane B, and a lattice plane L4 that forms a lattice build angle A4 with respect to the build plane B. Each of the lattice planes L2, L3 is formed by a portion of the plurality of segments 370 that are aligned and oriented at the respective lattice build angle A3, A4 relative to the build plane B. The lattice structure 348 includes a plurality of portions that align with the lattice planes L3, L4, which are spaced from one another a distance that is governed by the length and orientation of the plurality of segments 370 within the lattice structure 348. In general, the sequential spacing and intersection between each of the lattice planes L1, L2, L3, L4 forms the geometry of the lattice structure 348.

Through testing, it has been determined that when the build plane B is oriented parallel to a normal extending from the front face 327, the lattice structure 348 is self-supporting with lattice build angles A1, A2, A3, A4 that are each greater than or equal to 30 degrees. That is, if each of the lattice build angles A1, A2, A3, A4 is greater than or equal to 30 degrees, the lattice structure 348 may be additively manufactured without any additional support structures, for example, during DMLS. In this way, for example, the need to remove support structures on the lattice structure 348 during the post-processing stages may not be required, which significantly improves manufacturing efficiency, costs, and time.

In the illustrated embodiment, each of the lattice planes L1, L2, L3, L4 extend in varying directions and form a plurality of intersection points 380 where one or more of the plurality of segments 370 that form the lattice planes L1, L2, L3, L4 intersect. In the illustrated embodiment, each of the intersection points 380 may be formed by the intersection of six of the segments 370 extending from the intersection point 380 in a different direction (see FIG. 41), except at locations where the intersection point 380 is interrupted by one or more of the internal sole surface 372, the internal rear surface 374, the internal front surface 376, and the internal top surface 378 (or another surface in engagement with the lattice structure 348), or a termination plane along which the lattice structure 348 terminates prior to engaging a surface (see FIG. 33).

Figure 41:
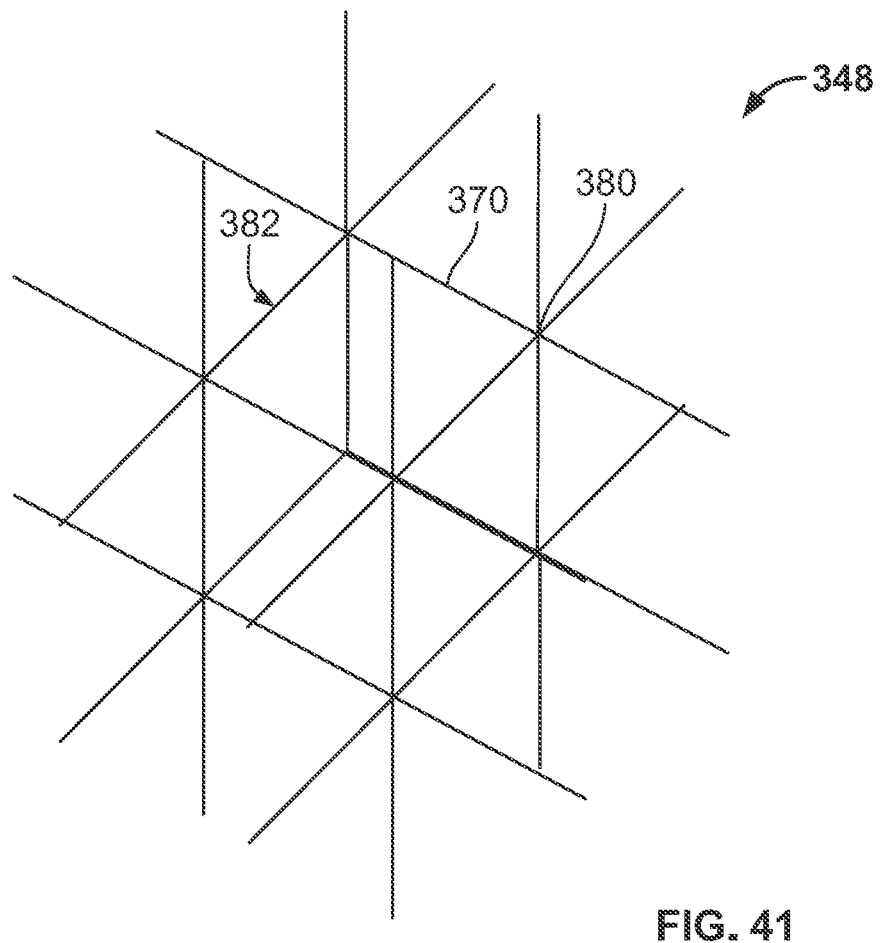
FIG. 41 is a schematic illustration of a portion of a lattice structure according to the present disclosure.

With specific reference to FIG. 41, in one embodiment, the lattice structure 348 may define a unit cell 382 that is formed by a cutout, air space, or absence of material defined between interconnected intersection points 380 that occur along a common plane. For example, in the illustrated embodiment, the lattice structure 348 may define square-, rectangular-, or diamond-shaped unit cells 382. This geometry defined by the unit cells 382 may be similar to the lattice structure 348 illustrated in FIGS. 26-40. However, a lattice structure according to the present disclosure is not limited to this shape of unit cell and alternative geometries may be utilized. For example, as described herein, the segments 172, 174, 176 of the lattice structure 136 define generally triangular-shaped cutouts or air spaces. Alternatively or additionally, in some embodiments, at least a portion of the unit cells in a lattice structure according to the present disclosure may define a pentagonal shape, a hexagonal shape, or any other polygonal shape.

In some embodiments, a unit cell defined by a lattice structure according to the present disclosure can be formed by interconnected shapes (e.g., ovals, circles, or another geometric shape) with varying orientation to form a repeated pattern, or unit cell. In some embodiments, a lattice structure according to the present disclosure may be formed by a differential geometry structure. For example, a lattice structure according to the present disclosure may be formed by a gyroid structure that includes a plurality of interconnected, periodic minimal surfaces. The gyroid structure may define a unit cell that is repeated in a pattern over a desired volume to form a lattice structure according to the present disclosure. In general, the use of a differential geometry structure (e.g., a gyroid) may reduce stress concentrations formed along the lattice structure due to the reduction in sharp edges formed on the lattice structure, which may provide similar advantages as adding curvature, described herein with reference to the lattice structure 136. In some embodiments, a lattice structure according to the present disclosure may define a tublane structure or a plate-lattice structure.

Regardless of the design and properties of the lattice structure, a golf club head according to the present disclosure may be manufactured via additive manufacturing to include a lattice structure formed integrally with at least a portion of a body, a front face, and/or a face insert of the golf club head. During manufacture, when the build plane is oriented parallel to the front face normal, each portion of the lattice structure may be printed at an angle greater than or equal 30 degrees relative to the build plane to ensure that the lattice structure is self-supporting and does not require support structures.

In some embodiments, a lattice structure according to the present disclosure may define a hybrid or variable structure that varies in one or more of unit cell type, unit cell geometry, unit cell size, segment length, segment, thickness, segment volume, and unit cell density at one or more locations along the lattice structure. For example, in embodiments of the iron-type golf club head 300 where the lattice structure 348 is connected to the front face 327, the lattice structure 348 may be varied behind the front face 327 to improve or maximize ball speed over the front face 327, more specific to where players actually impact the golf ball (e.g., lower (closer to the sole) than a face center point). For example, the lattice structure 348 may vary in a thickness, size, and/or shape of the segments 370, a density of the unit cells 382, and/or a shape or type of the unit cells 382 at various locations behind the front face 327.

Figure 42:
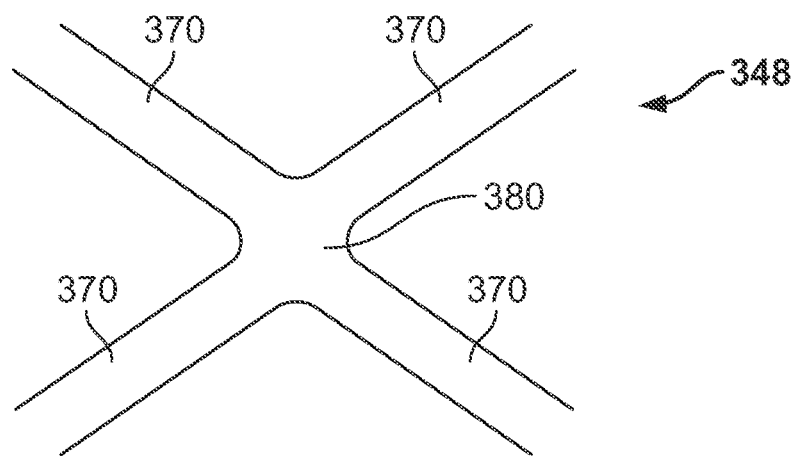
FIG. 42 is a schematic illustration of an intersection point of a lattice structure according to the present disclosure.

As described herein, adding curvature or removing sharp edges within geometry that is formed through additive manufacturing solves several issues, including: helping with de-caking (e.g., helps against green part destruction when blowing air against a lattice structure), reducing sintering drag, and avoiding stress concentrations in a lattice structure. In the embodiments where a lattice structure according to the present disclosure is formed via a plurality of segments, the intersection points may be curved at each intersection between the segments at the intersection point. For example, FIG. 42 illustrates an embodiment of an intersection point 380 taken along a cross-sectional plane. As illustrated in FIG. 42, the lattice structure 348 may define rounded edges at each intersection between the segments 370 forming the intersection point 380. That is, the intersecting edge formed between each of the intersecting segments 370 may be rounded to define a curvature or a radius of curvature, rather than culminating at a point. In addition to the intersection points 380, each edge of the segments 370 formed in the lattice structure 348 may define a rounded or curved edge.

In general, a lattice structure according to the present disclosure may define rounded or curved edges along, for example, edges of intersection points, edges of segments forming the lattice structure, and any other edges formed along the lattice structure to provide the manufacturing and performance benefits described herein.

In the embodiments of FIGS. 26-40, the lattice structure 348 is arranged internally with respect to the body 302 (e.g., at least partially within the internal cavity 306). In some embodiments, a golf club head may be designed to include an externally accessible/visible lattice structure. For example, a golf club head according to the present disclosure may include at least one external face that is formed at least partially by a lattice structure. As described herein, removing residual metal powder may be required following the manufacture of a golf club head via an additive manufacturing process. In some embodiments, a golf club head according to the present disclosure may include apertures and/or define a flow path to enable the removal of excess metal powder. Another solution to aiding in removal of metal powder from a 3D printed golf club head may be to arrange the lattice structure such that it is externally accessible/visible. In some embodiments, a depth that an externally-facing lattice structure extends into a body of the golf club head and/or a unit cell size (e.g., volume or surface area) of the lattice structure may be limited to ensure efficient de-caking of residual metal powder present after manufacturing the golf club head via an additive manufacturing process.

Figure 43:
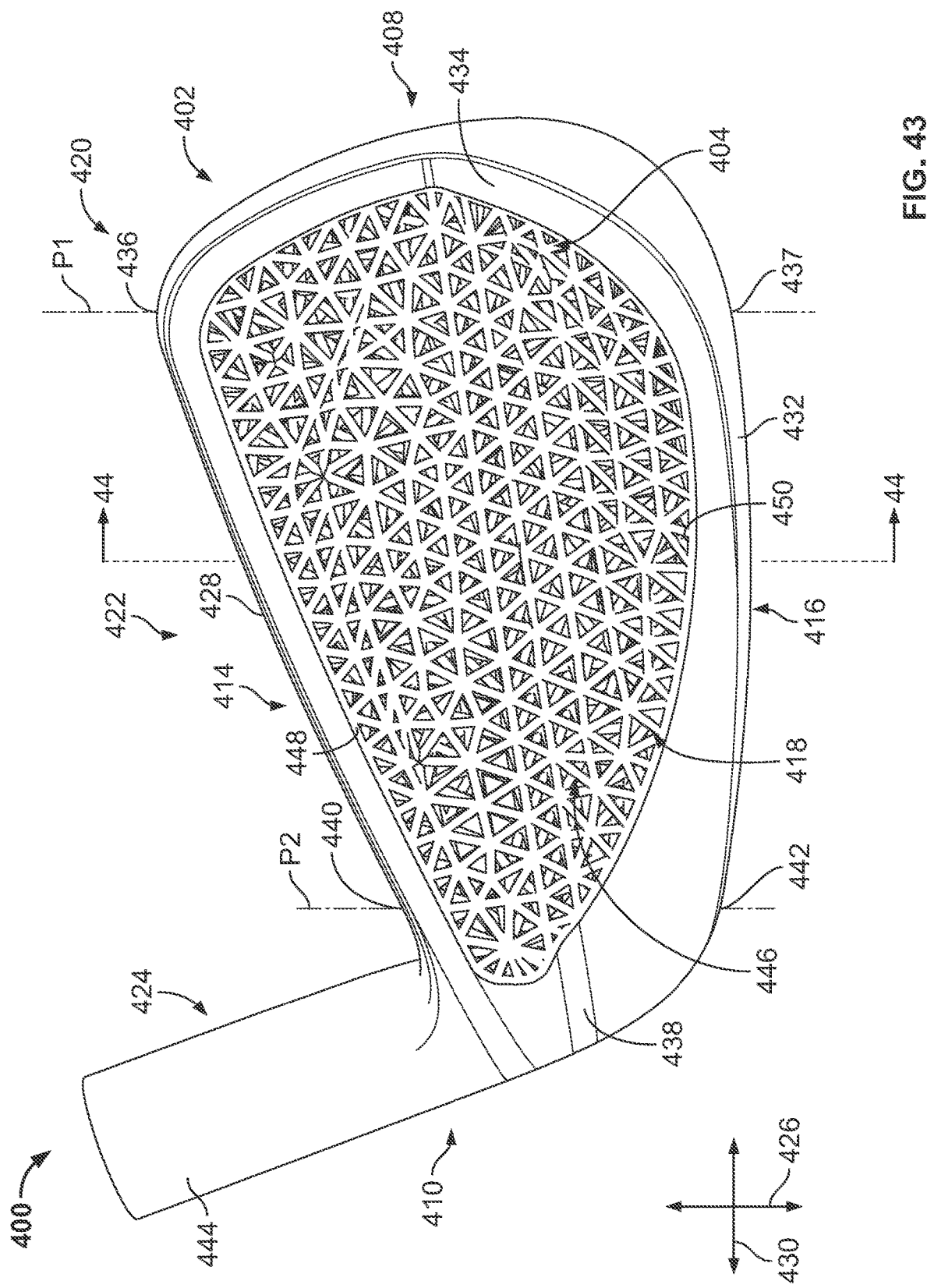
FIG. 43 is a rear view of an iron-type golf club head having an external lattice structure according to the present disclosure.
Figure 44:
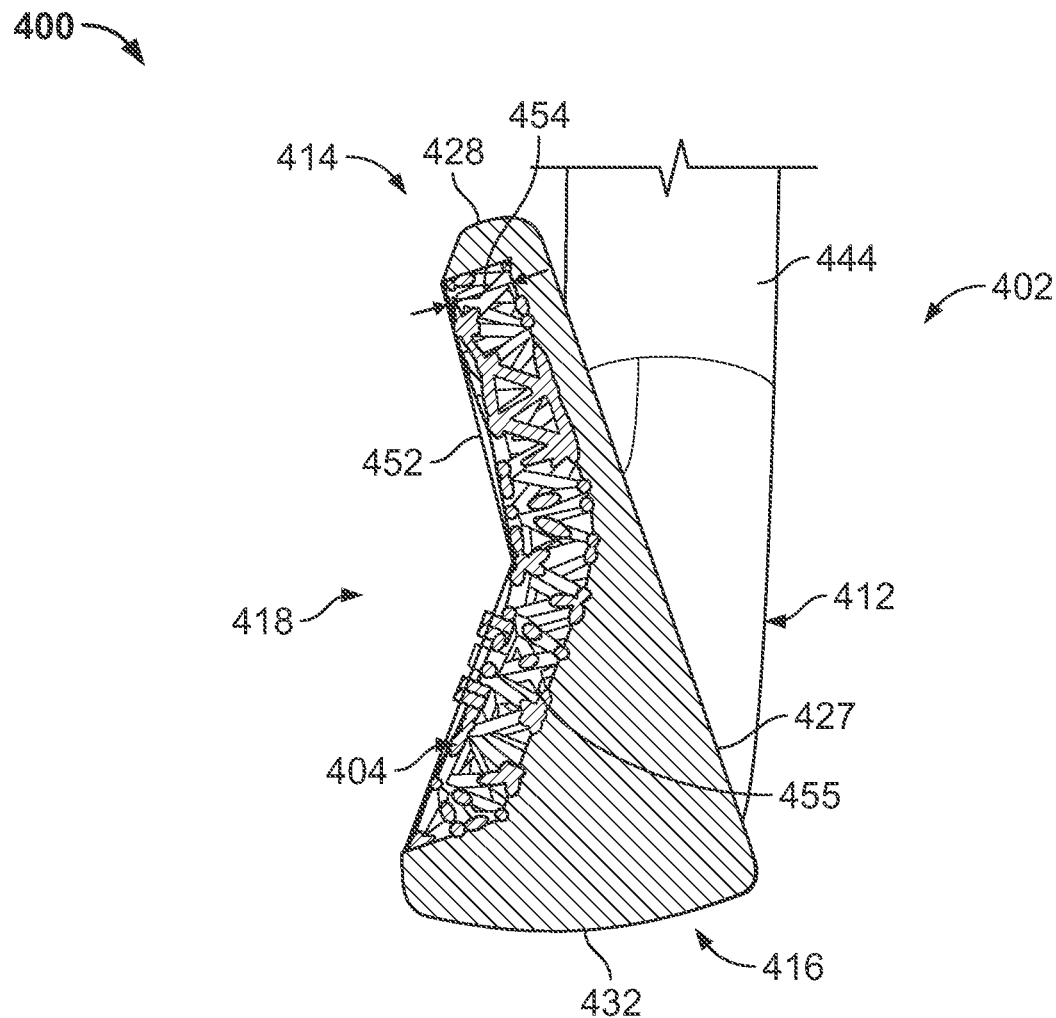
FIG. 44 is a cross-sectional view of the iron-type golf club head of FIG. 43 taken along ling 44-44.

Referring to FIGS. 43 and 44, an iron-type golf club head 400 is shown in accordance with the present disclosure that may be formed through an additive manufacturing process. The iron-type golf club head 400 includes a body 402 and an externally-facing lattice structure 404 formed on the body 402. In general, the lattice structure 404 may be formed along a portion of an externally-facing face or surface of the body 402 in place of solid material, which reduces a weight of the iron-type golf club head 400 and maintains stiffness (e.g., similar to the stiffness provided by solid material).

The iron-type golf club head 400 defines a toe side 408, a heel side 410, a front side 412, a top side 414, a bottom side 416, and a rear side 418. The body 402 includes a toe region 420, a medial region 422, and a heel region 424. The toe region 420, the medial region 422, and the heel region 424 are defined by lines or planes P1 and P2 that extend through the iron-type golf club head 400 in a sole-topline direction 426 (e.g., a vertical direction from the perspective of FIG. 43). The toe region 420 and the heel region 424 are arranged at laterally-opposing ends of the body 402, and the medial region 422 is arranged laterally between the toe region 420 and the heel region 424.

The front side 412 of the body 402 may define a front face 427 that extends along the front side 412 of the body 402 from the toe region 420, through the medial region 422, and into to at least a portion of the heel region 424. In some embodiments, the front face 427 may define an entire front surface of the body 402 that extends laterally from the toe region 420, through the medial region 422, and into the heel region 424 to a junction between the front surface and a hosel 444 extending from the heel region 424. In some embodiments, a portion of the front face 427 defined along the medial region 422 defines a striking face, which may include a plurality of laterally-extending grooves (not shown) that are spaced from one another in the sole-topline direction 426.

The iron-type golf club head 400 defines a topline 428 extending laterally in a heel-toe direction 430 (e.g., a horizontal direction from the perspective of FIG. 43) along the top side 414, and a sole 432 extending laterally in the heel-toe direction 430 along the bottom side 416. The toe region 420 includes a toe portion 434 of the body 402 that is defined by a portion of the body 402 between a distal end of the toe side 408 and the plane P1. In some embodiments, the plane P1 may be defined along a lateral edge of the grooves (not shown) formed in the front side 412 that is adjacent to the toe side 408. In some embodiments, the plane P1 may intersect the top side 414 of the toe portion 434 at a toe-topline intersection point 436 along the topline 428 where the slope of a line tangent to the topline 428 is approximately zero (e.g., a point where a line tangent to the periphery of the top side 414 is approximately parallel to the ground at address). In these embodiments, the plane P1 may extend through the toe portion 434 in the sole-topline direction 426 to a toe-sole intersection point 437.

The heel region 424 includes a heel portion 438 of the body 402 that is defined by a portion of the body 402 between a distal end of the heel side 410 and the plane P2. In some embodiments, the plane P2 may be defined along a lateral edge of the grooves (not shown) formed in the front side 412 that is adjacent to the heel side 410. In some embodiments, the plane P2 may intersect the top side 414 at a heel-topline inflection point 440 (e.g., a point where the periphery of the top side 414 transitions from concave down to concave up). In these embodiments, the plane P2 may extend through the heel portion 438 in the sole-topline direction 426 to a heel-sole intersection point 442.

The heel portion 438 includes the hosel 444 that extends from the heel portion 438 at an angle (e.g., a lie angle formed between a plane parallel to the ground on which the club head rests at address and a center axis defined through the hosel 444) in a direction away from the toe portion 434. The hosel 444 defines a hosel cavity (not shown) within which a shaft (not shown) may be inserted for coupling to the iron-type golf club head 400. In some embodiments, a ferrule (not shown) may abut or be at least partially inserted into the hosel 444.

The topline 428 may extend along an outer periphery of the top side 414 from the heel-topline inflection point 440, along the medial region 422, to the toe-topline intersection point 436. The sole 432 may extend along a periphery of the bottom side 416 from the toe-sole intersection point 437, along the medial region 422, to the heel-sole intersection point 442.

The lattice structure 404 of the iron-type golf club head 400 may be designed and manufactured with similar properties and characteristics as the lattice structures disclosed herein. In the illustrated embodiment, the lattice structure 404 may define at least a portion of a rear face 446 of the body 402. The rear face 446 may extend over at least a portion of the rear side 418 of the iron-type golf club head 400. For example, the lattice structure 404 may extend laterally (e.g., in the heel-toe direction 430) over the medial region 422 and at least a portion of each of the toe region 420 and the heel region 424. The lattice structure 404 may extend along the sole-topline direction 426 between a rear-topline edge 448 and a rear-sole edge 450.

Referring specifically to FIG. 44, the lattice structure 404 may define an external border 452 of the body 402 along the rear face 446. In some embodiments, the external border 452 may define an externally-facing border of the lattice structure 404 (e.g., a border of the lattice structure 404 that is externally visible/accessible). The lattice structure 404 may define a thickness 454 that the lattice structure 404 extends into the body 402, for example, in a direction arranged generally normal to a rear surface 455 defined by the body 402. In some embodiments, the thickness 454 may be about 5 millimeters. In some embodiments, the thickness 454 may be between about 4 millimeters and about 6 millimeters, or between about 3 millimeters and about 7 millimeters. In some embodiments, the thickness 454 may be less than or equal to about 5 millimeters.

In some embodiments, the thickness 454 defined by the lattice structure 404, in combination with the lattice structure 404 defining the external border 452 of the body 402, may enable the lattice structure 404 to be easily de-caked after printing of the iron-type golf club head 400. In the illustrated embodiment, the lattice structure 404 may include unit cells that define a generally triangular shape. In some embodiments, the lattice structure 404 may define unit cells of any shape or design according to the present disclosure. In some embodiments, a size and shape of the unit cells defined by the lattice structure 404 also be customized to ensure that the de-caking process occurs efficiently.

Figure 45:
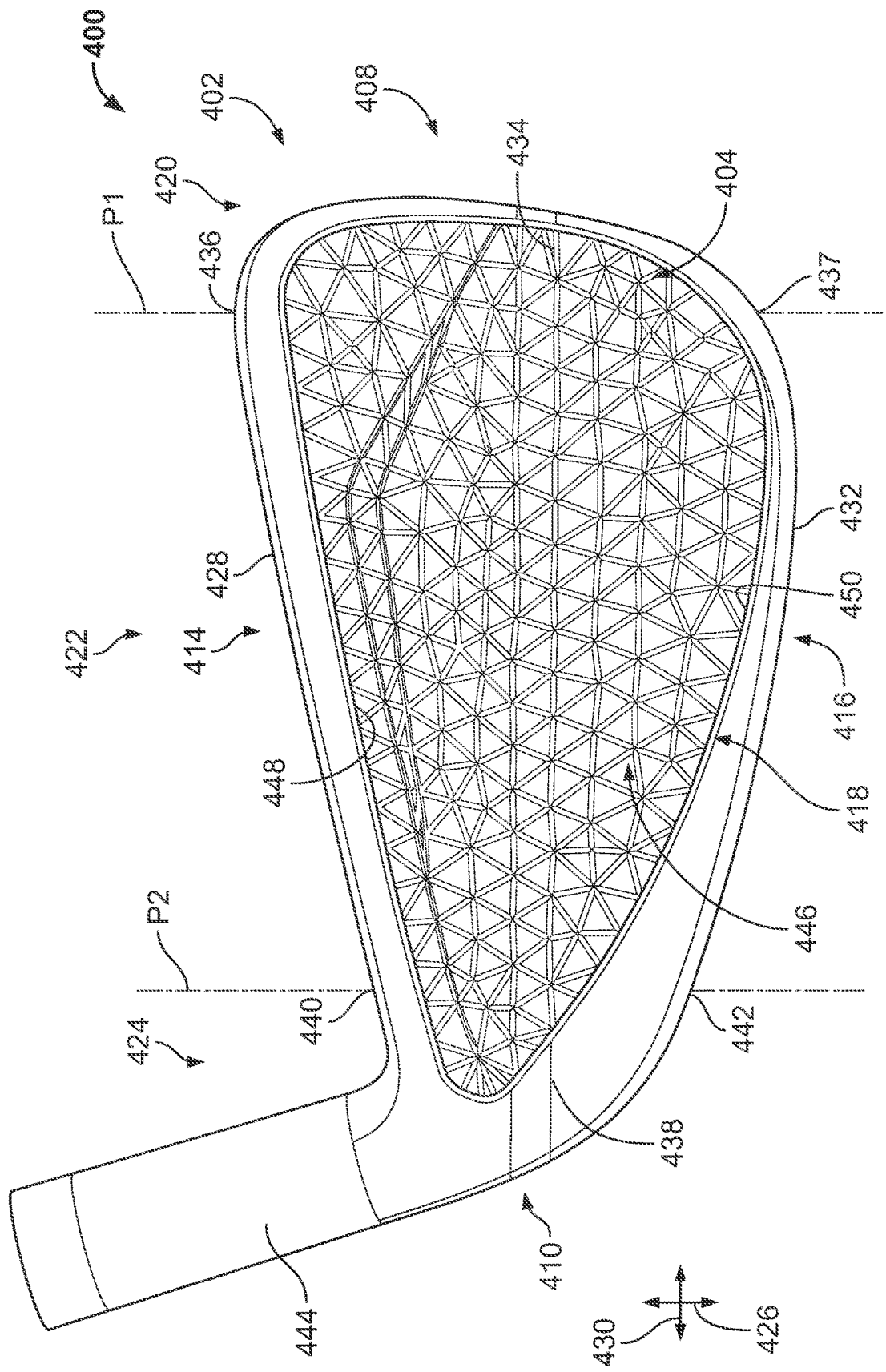
FIG. 45 is a rear view of the iron-type golf club head of FIG. 43 with a filler material in the external lattice structure.

Referring to FIG. 45, after the iron-type golf club head 400 is manufactured via an additive manufacturing process, the excess metal powder may be easily removed from the externally-accessible lattice structure 404, and the lattice structure 404 may be filled with a filler material 456. In some embodiments, the filler material 456 may be a light weight (e.g., low density) epoxy or resin. In some embodiments, the filler material 456 may by substantially transparent or translucent. Filling the lattice structure 404 with the filler material 456 efficiently prevents debris from collecting in the lattice structure 404 and, in some embodiments, may maintain the external visibility of at least the external border 452 of the lattice structure 404.

As described herein, incorporating a lattice structure into a golf club head provides several manufacturing, performance, and customizable advantages. In some embodiments, a lattice structure may be utilized to efficiently distribute the mass throughout a golf club head. For example, in conventional golf club heads, solid material present above a horizontal plane (e.g., a plane that extends in the heel-toe direction) defined by the CG is inefficient, since it limits movement of the CG. In some embodiments, a golf club head according to the present disclosure may replace the solid material rearward of the front face and above a CG plane defined by the golf club head with a lattice structure. In this way, the stiffness provided by the solid material may be maintained by the lattice structure, and the replacement of the solid material with the lattice structure reduces a density in the replaced areas, which allows the saved mass to be used elsewhere on the golf club head to improve performance.

Figure 46:
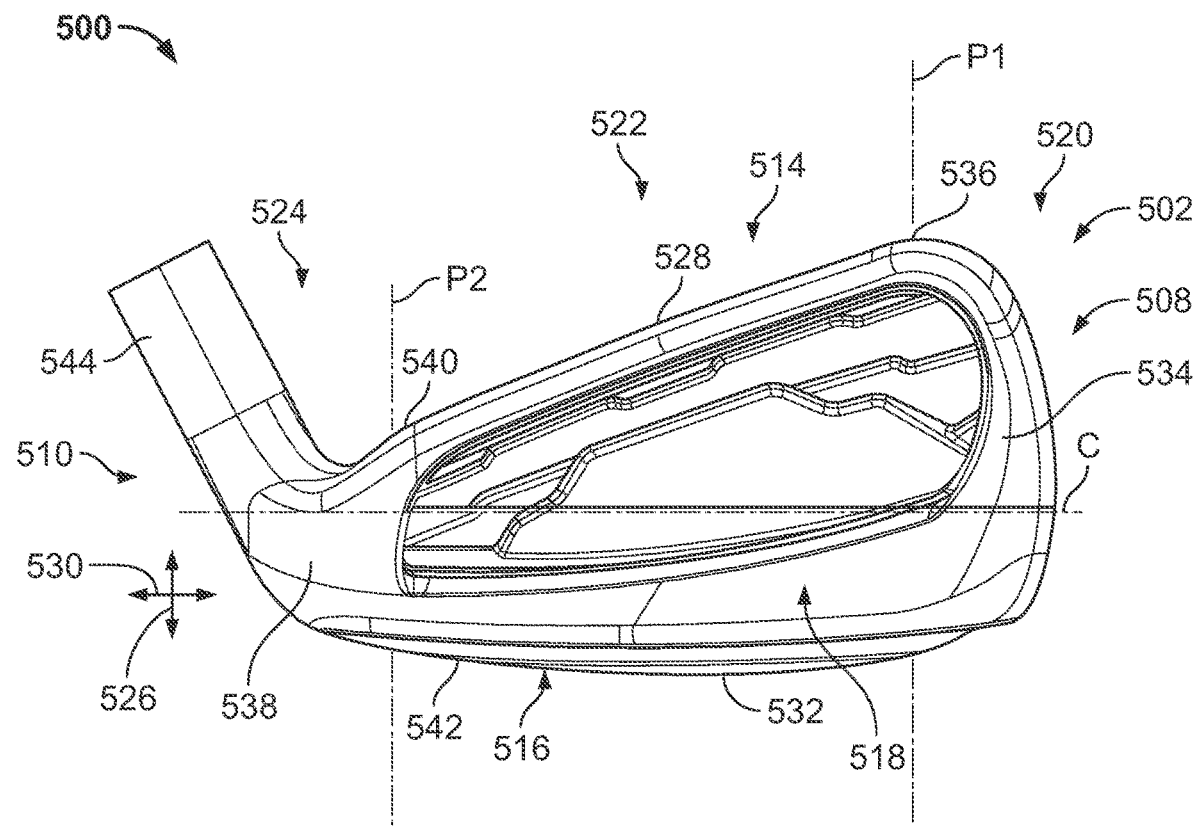
FIG. 46 is a rear view of an iron-type golf club head illustrating a solid center of gravity plane according to the present disclosure.

Referring to FIG. 46, an iron-type golf club head 500 is shown in accordance with the present disclosure. The iron-type golf club head 500 may define a cavity back design and may be fabricated from solid material (e.g., solid metal). The iron-type golf club head 500 defines a solid CG plane C (i.e., a plane that extends in a heel-toe direction that aligns with a CG defined by a solid configuration of the iron-type golf club head 500) that extends laterally across a body 502 of the iron-type golf club head 500. According to embodiments of the present invention, the solid material arranged rearward of a front face (e.g., a striking face) and above (e.g., upward from the perspective of FIG. 46) the solid CG plane C on the body 502 of the iron-type golf club head 500 may be replaced by a lattice structure (see FIG. 47). In some embodiments, the solid CG plane C may be defined as a plane extending parallel to the ground plane G at a location defined by the CG of the body 502 when the body 502 is fabricated from solid material.

Referring now to FIGS. 47-50, the iron-type golf club head 500 may include an externally accessible/visible lattice structure 504. The iron-type golf club head 500 defines a toe side 508, a heel side 510, a front side 512, a top side 514, a bottom side 516, and a rear side 518. The body 502 includes a toe region 520, a medial region 522, and a heel region 524. The toe region 520, the medial region 522, and the heel region 524 are defined by lines or planes P1 and P2 that extend through the iron-type golf club head 500 in a sole-topline direction 526 (e.g., a vertical direction from the perspective of FIG. 47). The toe region 520 and the heel region 524 are arranged at laterally-opposing ends of the body 502, and the medial region 522 is arranged laterally between the toe region 520 and the heel region 524.

The front side 512 of the body may define a front face 527 that extends along the front side 512 of the body 502 from the toe region 520, through the medial region 522, and into to at least a portion of the heel region 524. In some embodiments, the front face 527 may define an entire front surface of the body 502 that extends laterally from the toe region 520, through the medial region 522, and into the heel region 524 to a junction between the front surface and a hosel 544 extending from the heel region 524. In some embodiments, a portion of the front face 527 defined along the medial region 522 defines a striking face, which may include a plurality of laterally-extending grooves (not shown) that are spaced from one another in the sole-topline direction 526 (see FIG. 50).

The iron-type golf club head 500 defines a topline 528 extending laterally in a heel-toe direction 530 (e.g., a horizontal direction from the perspective of FIG. 47) along the top side 514, and a sole 532 extending laterally in the heel-toe direction 530 along the bottom side 516. The toe region 520 includes a toe portion 534 of the body 502 that is defined by a portion of the body 502 between a distal end of the toe side 508 and the plane P1. In some embodiments, the plane P1 may be defined along a lateral edge of the grooves (not shown) formed in the front side 512 that is adjacent to the toe side 508. In some embodiments, the plane P1 may intersect the top side 514 of the toe portion 534 at a toe-topline intersection point 536 along the topline 528 where the slope of a line tangent to the topline 528 is approximately zero (e.g., a point where a line tangent to the periphery of the top side 514 is approximately parallel to the ground at address). In these embodiments, the plane P1 may extend through the toe portion 534 in the sole-topline direction 526 to a toe-sole intersection point 537.

The heel region 524 includes a heel portion 538 of the body 502 that is defined by a portion of the body 502 between a distal end of the heel side 510 and the plane P2. In some embodiments, the plane P2 may be defined along a lateral edge of the grooves (not shown) formed in the front side 512 that is adjacent to the heel side 510. In some embodiments, the plane P2 may intersect the top side 514 at a heel-topline inflection point 540 (e.g., a point where the periphery of the top side 514 transitions from concave down to concave up). In these embodiments, the plane P2 may extend through the heel portion 538 in the sole-topline direction 526 to a heel-sole intersection point 542.

The heel portion 538 includes the hosel 544 that extends from the heel portion 538 at an angle (e.g., a lie angle formed between a plane parallel to the ground on which the club head rests at address and a center axis defined through the hosel 544) in a direction away from the toe portion 534. The hosel 544 defines a hosel cavity (not shown) within which a shaft (not shown) may be inserted for coupling to the iron-type golf club head 500. In some embodiments, a ferrule (not shown) may abut or be at least partially inserted into the hosel 544.

The topline 528 may extend along an outer periphery of the top side 514 from the heel-topline inflection point 540, along the medial region 522, to the toe-topline intersection point 536. The sole 532 may extend along a periphery of the bottom side 516 from the toe-sole intersection point 537, along the medial region 522, to the heel-sole intersection point 542.

Figure 47:
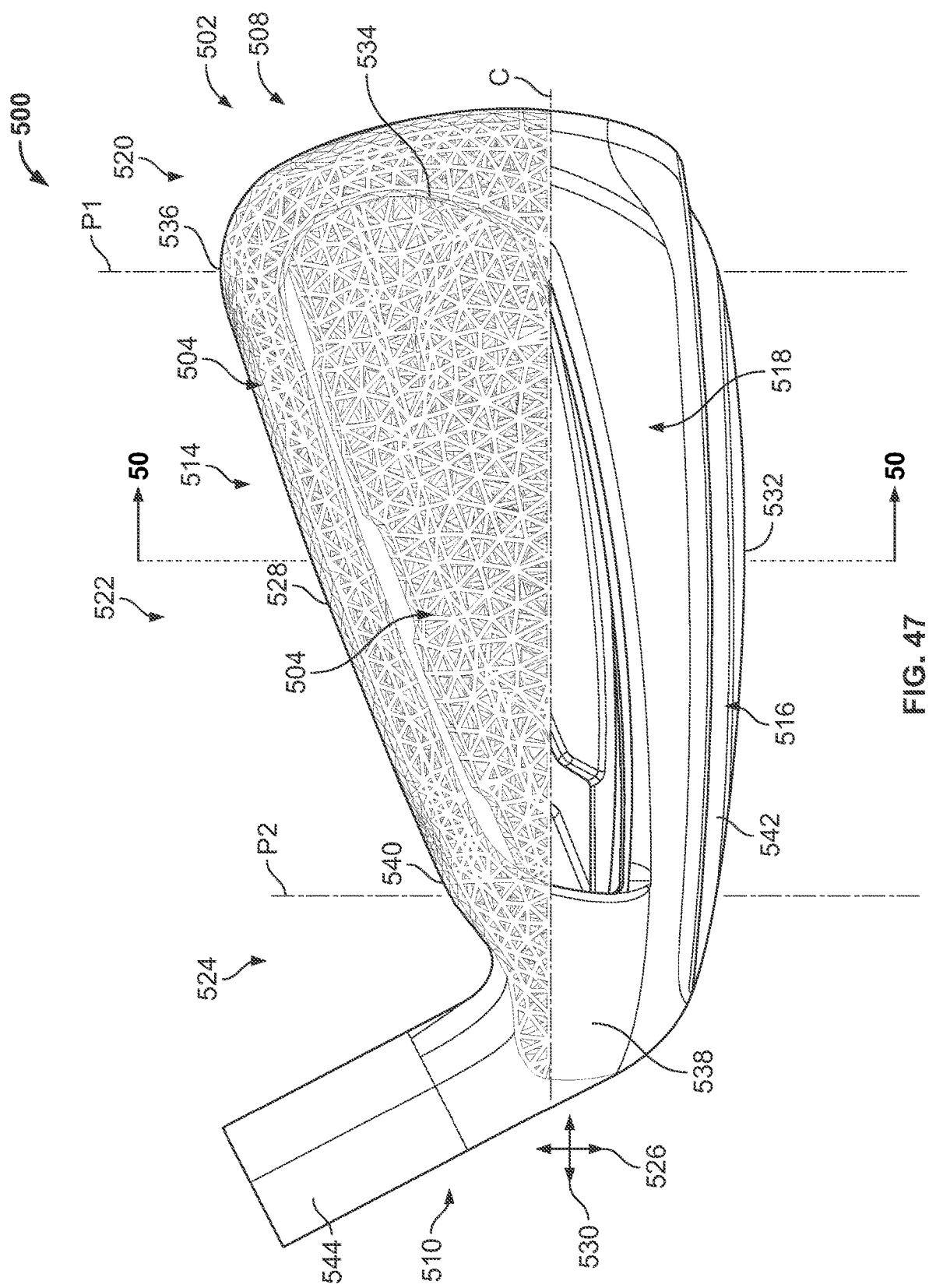
FIG. 47 is a rear view of the iron-type golf club head of FIG. 46 including a lattice structure.
Figure 48:
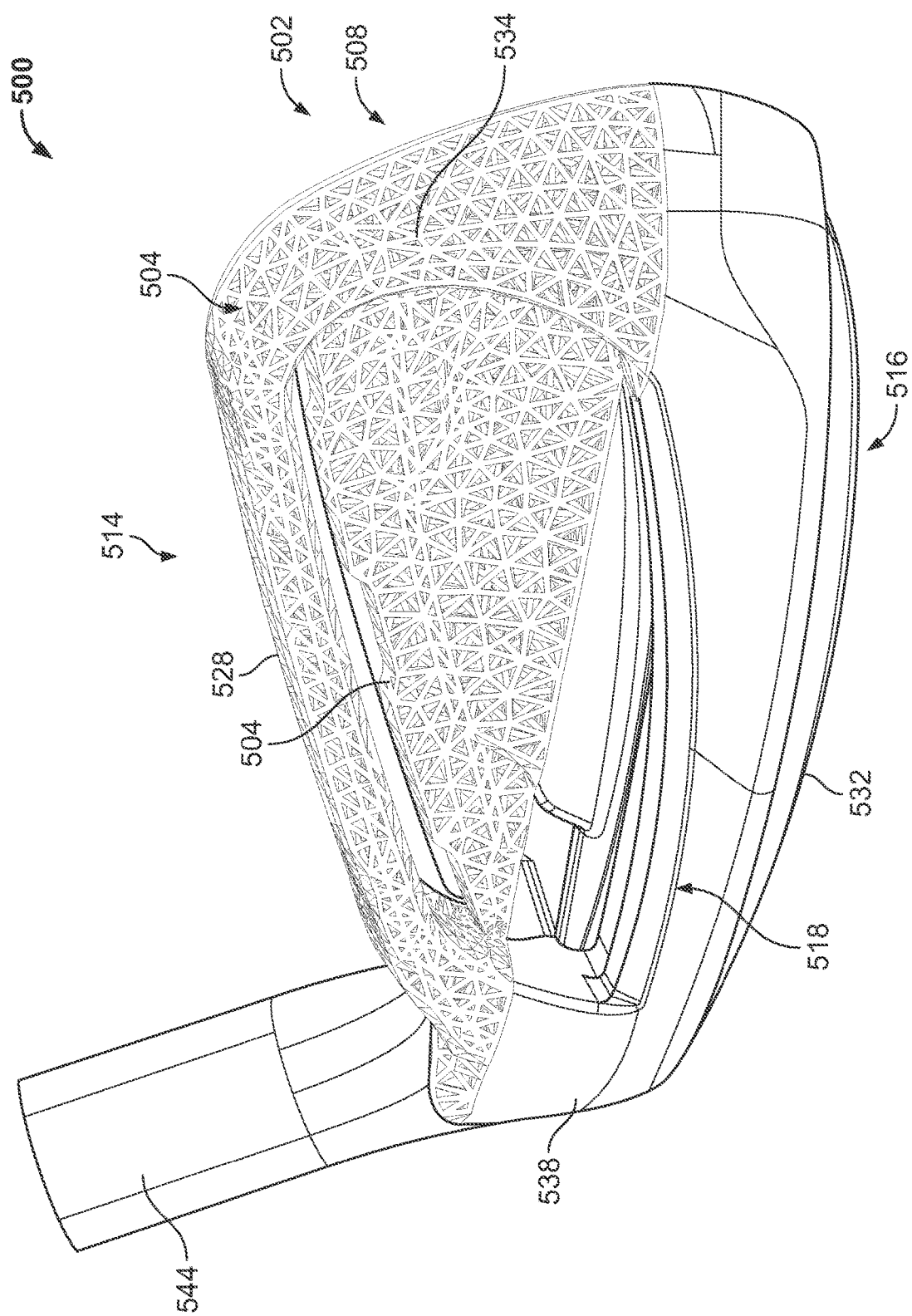
FIG. 48 is a top, back, right isometric view of the iron-type golf club head of FIG. 47.
Figure 49:
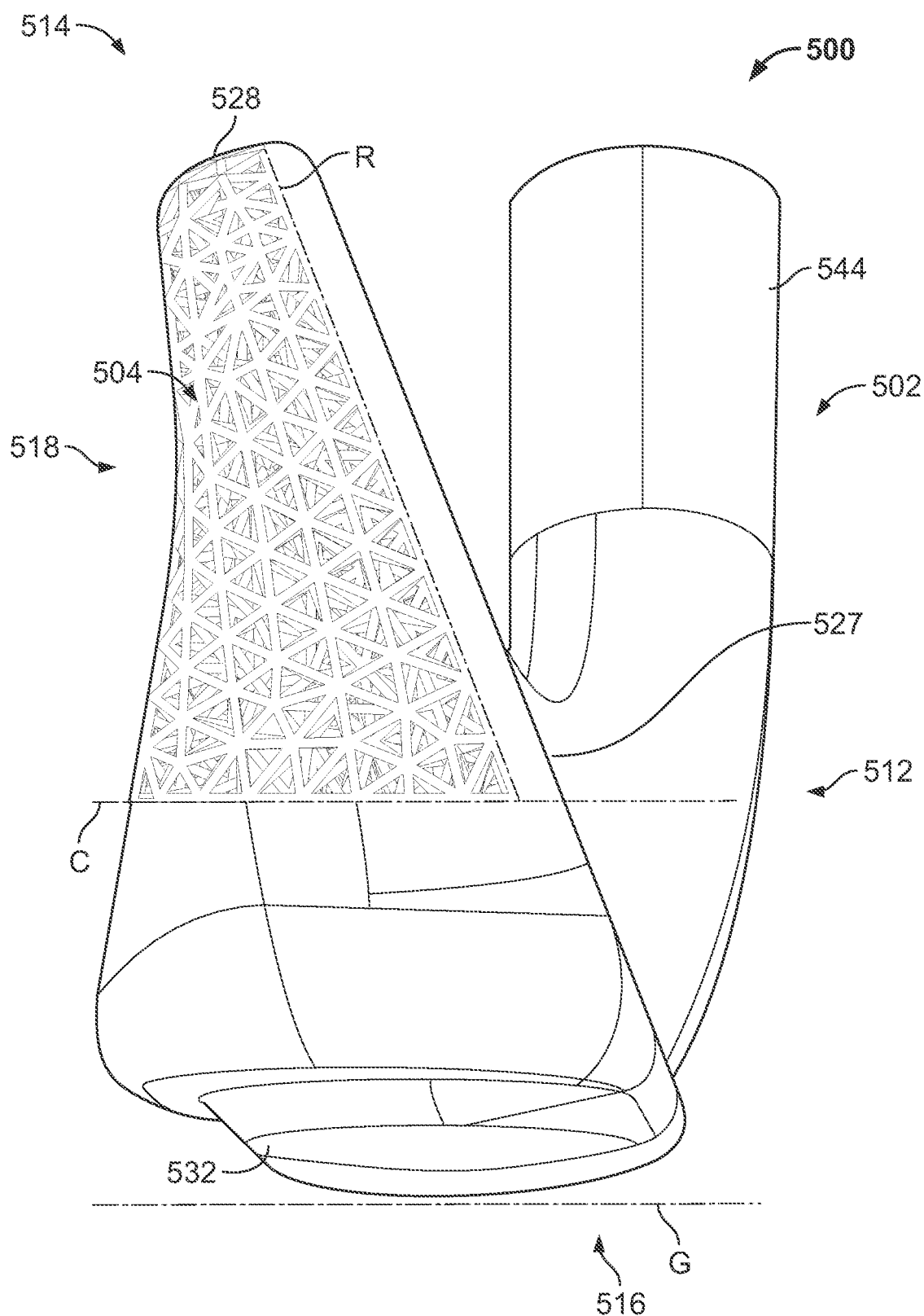
FIG. 49 is a right side view of the iron-type golf club head of FIG. 47.
Figure 50:
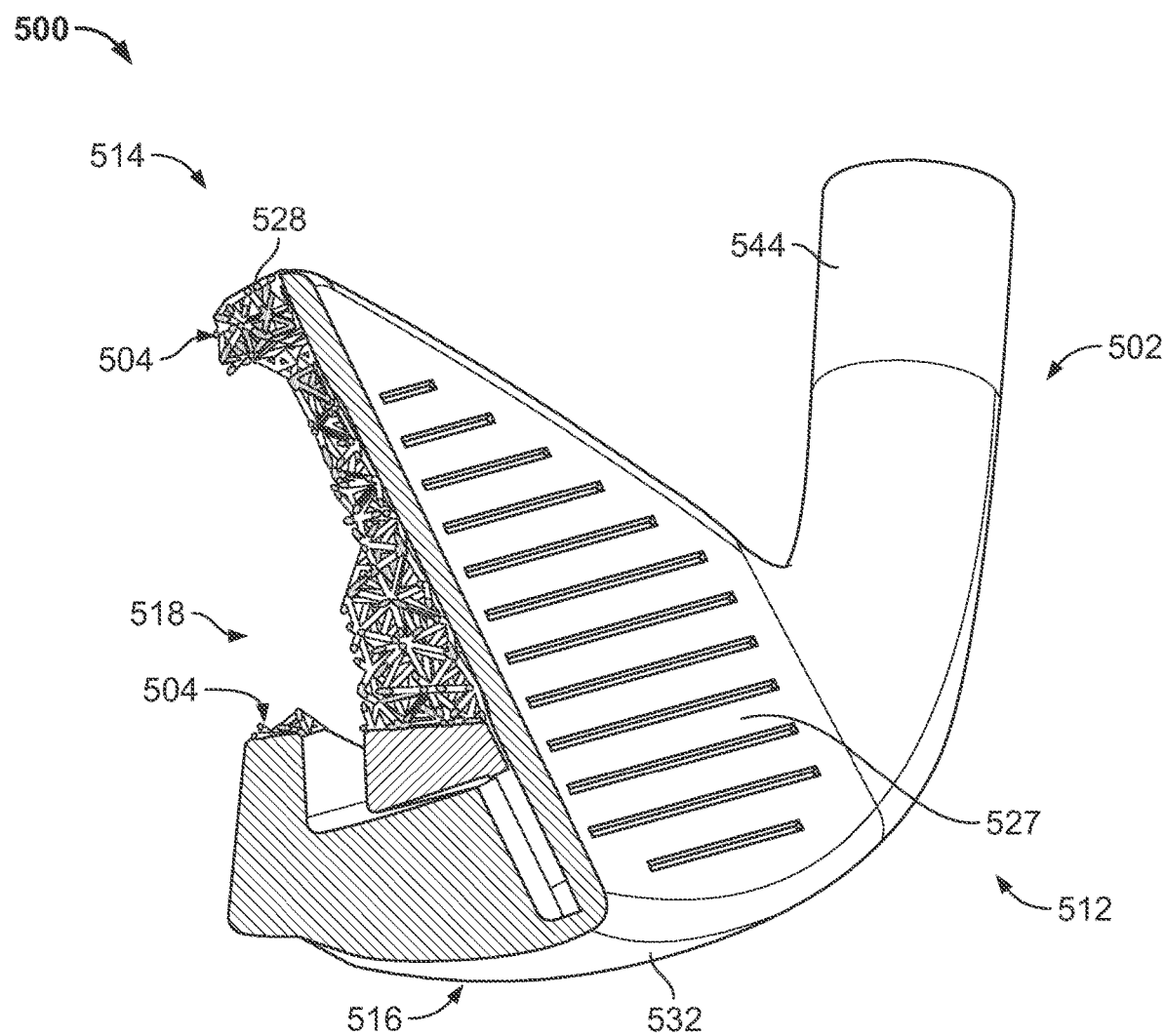
FIG. 50 is a cross-sectional view of the iron-type golf club head of FIG. 47 taken along line 50-50.

With specific reference to FIGS. 47-49, the lattice structure 504 of the iron-type golf club head 500 may be designed and manufactured with similar properties and characteristics as the lattice structures disclosed herein. In the illustrated embodiment, the lattice structure 504 may include unit cells that define a generally triangular shape. In some embodiments, the lattice structure 504 may define unit cells of any shape or design according to the present disclosure.

The lattice structure 504 extends over a portion of the body 502 that is arranged above the solid CG plane C (e.g., in a direction from the sole 532 toward the topline 528) and rearward (e.g., in a direction from the front side 512 toward the rear side 518, or to the left from the perspective of FIG. 49) of the front face 527. For example, the rear surface 546 of the front face 527 may extend along a plane R at an angle relative to the sole-topline direction 526, which is defined by the loft of the iron-type golf club head 500. The plane R along which the rear surface 546 extends may intersect with the solid CG plane C and the plane R and the solid CG plane C may define the boundaries of the lattice structure 504.

By replacing solid material with the lattice structure 504, the density defined by the body 502 in these regions may be locally reduced and the stiffness previously provided by the solid material may be maintained. In this way, for example, the CG of the iron-type golf club head 500 may be lowered (e.g., moved in a direction toward the sole 532) compared to a golf club head made from solid material (i.e., relative to the solid CG plane C). For example, a CG volume ratio defined as a ratio between a volume $V_L$ that the lattice structure 504 occupies to a volume $V_S$ that solid material occupies may be a factor in defining a CG location in the sole-topline direction 526.

In addition, the mass removed by the lattice structure 504 may be redistributed to other locations on the body 502 to improve performance, as desired. For example, if a mass of a golf club head is maintained and the solid material above a solid CG plane and rearward of the front face is replaced by a lattice structure, the reduced density provided by the lattice structure may enable mass to be redistributed to other regions of the golf club. In some embodiments, it may be desirable to lower a CG defined by a factory finished golf club head, when compared to a solid-material golf club head. In this embodiment, the mass saved by incorporating the lattice structure may be redistributed toward the sole of the golf club head. Redistributing this weight may further lower the CG of the golf club head and this process may repeat until the CG and the redistribution of the saved mass replaced by a lattice structure converge. That is, the golf club head may continue to be replaced with lattice structure in design, until the amount of volume replaced by a lattice structure and the redistributed mass converge on a CG location. Thus, the replacement of the solid material in a golf club head may be an iterative process in design and the final finish product may be produced with a CG that balances volume replaced by lattice structure and redistributed mass.

Figure 51:
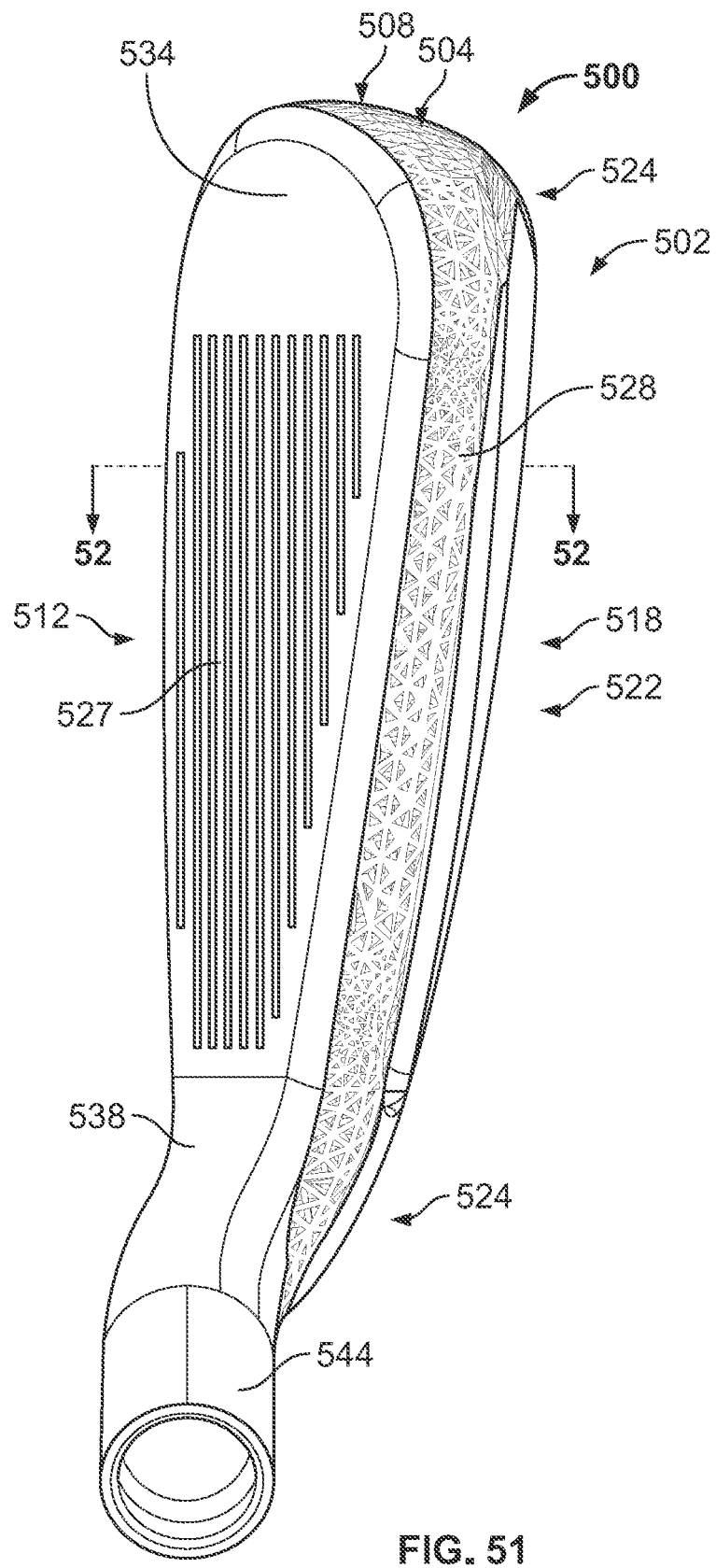
FIG. 51 is a top view of the iron-type golf club head of FIG. 47.
Figure 52:
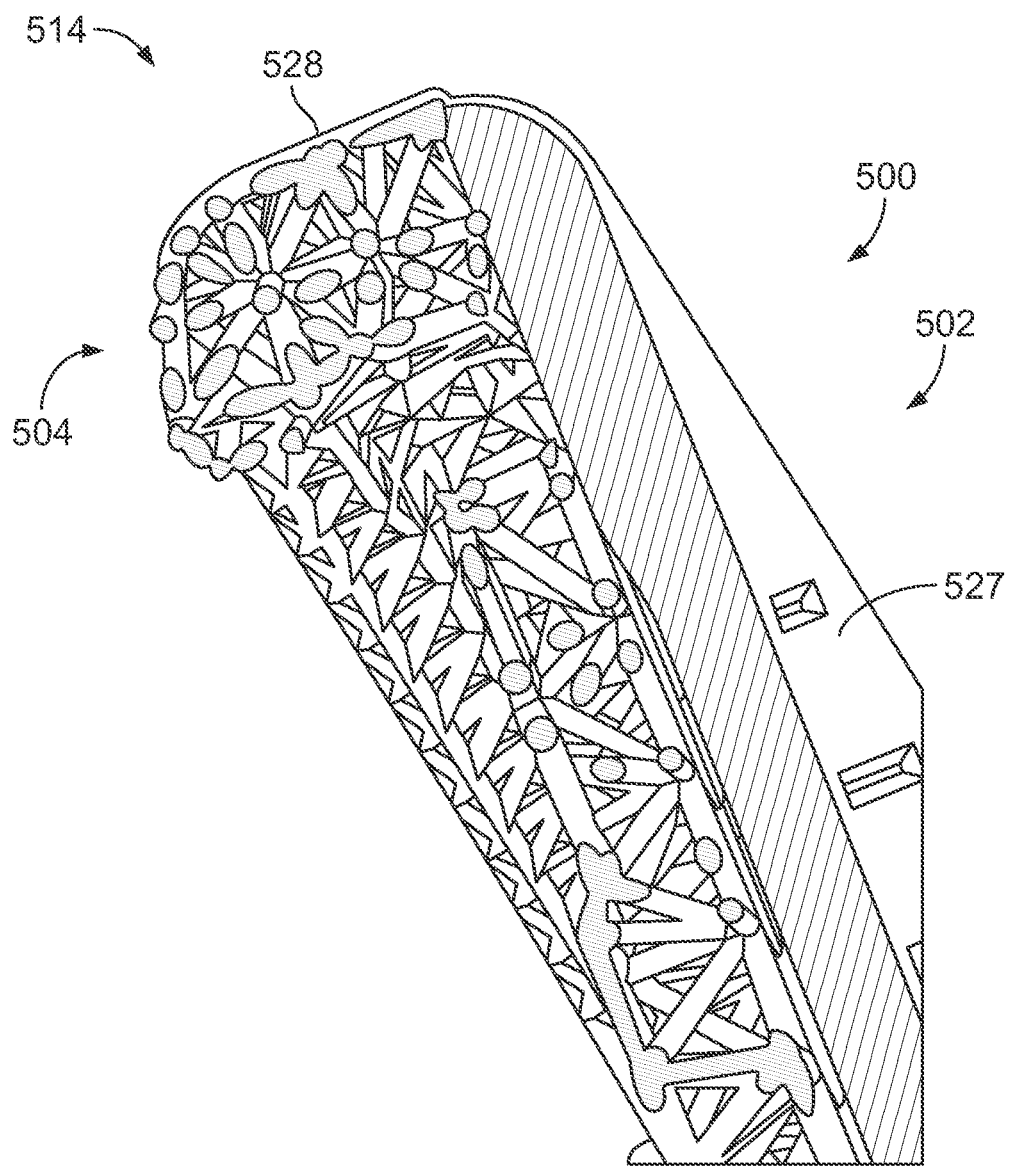
FIG. 52 is a partial cross-sectional view of the iron-type golf club head of FIG. 51 taken along line 52-52.
Figure 54:
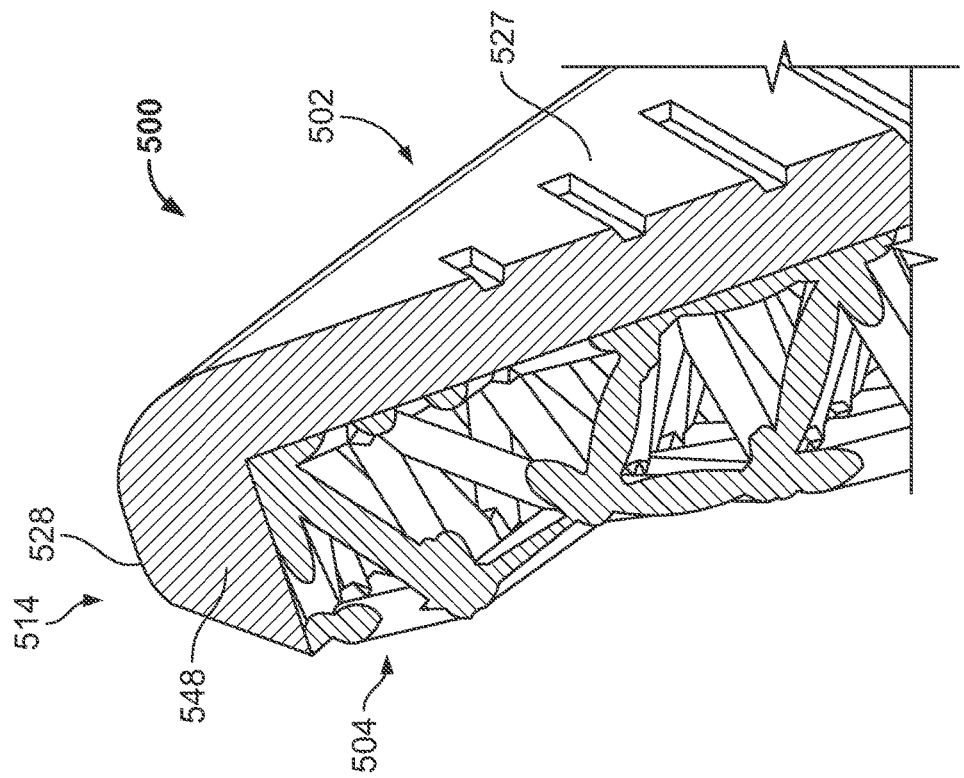
FIG. 54 is a partial cross-sectional view of the iron-type golf club head of FIG. 53 taken along line 54-54.
Figure 53:
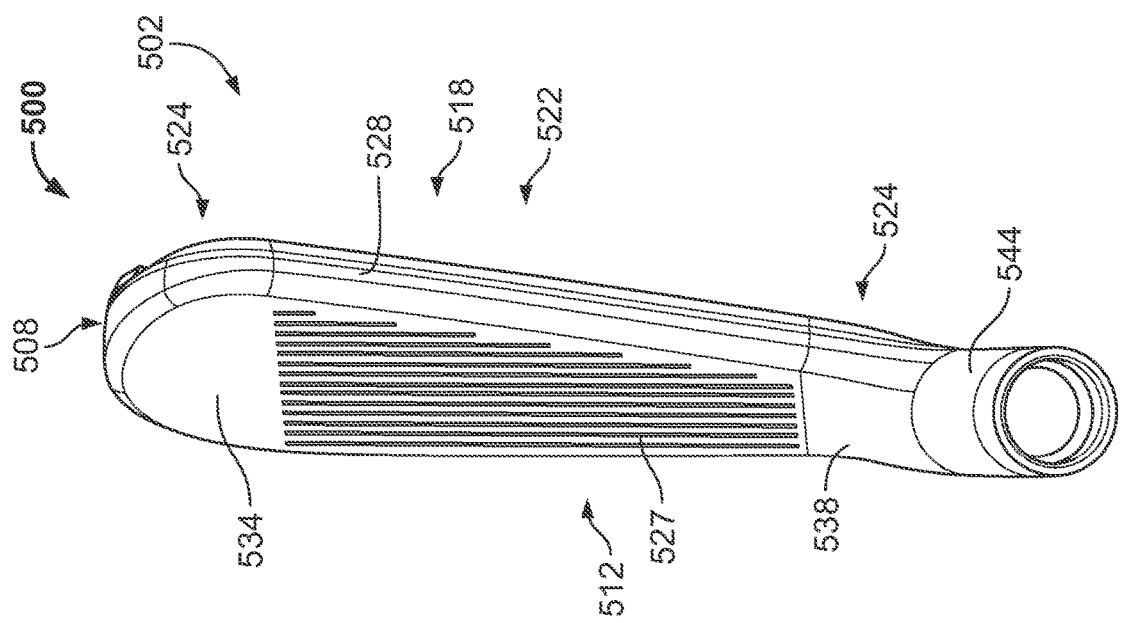
FIG. 53 is a top view of the iron-type golf club head of FIG. 47 having a topline protrusion that covers the lattice structure along the topline.

Referring to FIGS. 51 and 52, in some embodiments, the lattice structure 504 may be externally visible and form at least a portion of the topline 528. In some instances, a golfer may not wish to view the lattice structure 504 at address (i.e., along the topline 528). Referring to FIGS. 53 and 54, in some embodiments, the topline 528 may be formed by solid material, for example, by a topline protrusion 548 that extends laterally along the topline 528.

As described herein, weight distribution (e.g., CG manipulation) in a golf club head may be manipulated via additive manufacturing processes. In some embodiments according to the present disclosure, a golf club head may be manufactured layer by layer to include a cavity within a generally solid portion of a golf club head. During manufacture, the cavity may be filled with a plug or weight that is not permanently bound or attached to the internal surfaces of the cavity. As such, the plug or weight may be held in place by the surrounding metal powder in the cavity but not attached to the surfaces that form the cavity. That is, the plug or weight may be arranged free-floatingly within the cavity. In this way, for example, once the metal powder is removed from the cavity, a position of the plug or weight within the cavity may be manipulated to distribute the weight of the plug at a desired location within the cavity. For example, an orientation of the golf club head may be manipulated and gravity may be used to alter a position of the plug or weight within the cavity. The position of the plug or weight within the cavity may be secured, for example, by filling the cavity with a filler material (e.g., a plastic resin, a foam material, etc.). In general, the plug or weight arranged within the cavity may generally define any shape or structure that defines a weight that may be manipulated to alter a weight distribution within the golf club head. In some embodiments, the plug or weight may be fabricated from the same material as the surrounding solid portion of the golf club head. In some embodiments, the plug or weight may be fabricated from a material that is different than a material that is used to fabricate the surrounding solid portion of the golf club head. In some embodiments, the plug or weight may be fabricated from a material with a higher density than a material that is used to fabricate the surrounding solid portion of the golf club head. In some embodiments, the plug or weight may be fabricated from a material with a lower density than a material that is used to fabricate the surrounding solid portion of the golf club head.

Figure 55:
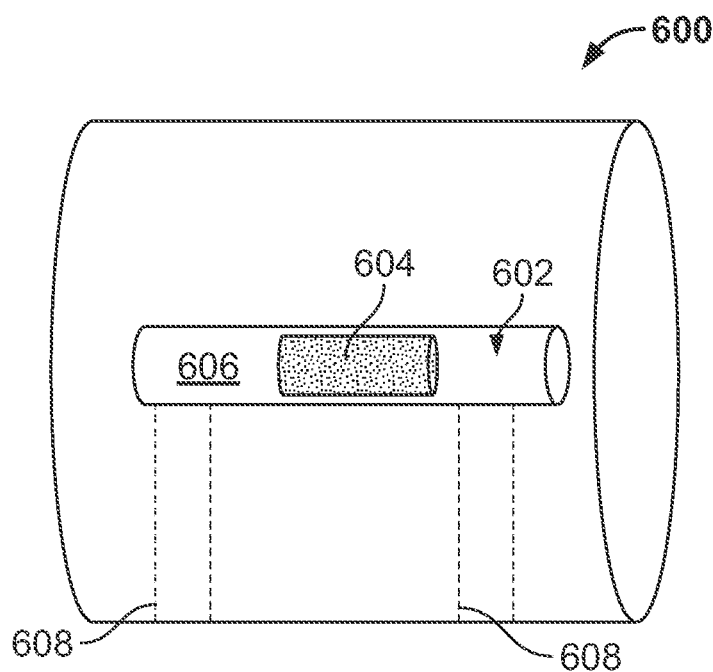
FIG. 55 is a schematic illustration of a portion of a golf club head including a plug manufactured within a cavity.

FIG. 55 illustrates one embodiment of a portion of a golf club head 600 that includes a cavity 602 within which a plug or weight 604 is formed during an additive manufacturing process. In some embodiments, the portion of the golf club head 600 is a portion of a body that is desired to be formed of solid material. During additive manufacture of the portion of the golf club head 600, the layer by layer forming of the portion of the golf club head 600 enables the formation of the cavity 602 and the plug 604 within the cavity 602. The plug 604 may be manufactured such that the plug 604 is spaced from the internal surfaces that form the cavity 602. In the illustrated embodiment, the plug 604 is surrounded by residual metal powder 606. The metal powder 606 may hold the plug 604 in place within the cavity 602, while maintaining the detachment between the plug 604 and the internal surfaces of the cavity 602.

One or more ports 608 may be in communication with the cavity 602 to enable the removal of the metal powder 606 after the portion of the golf club head 600 is manufactured. In the illustrated embodiment, the portion of the golf club head 600 includes two ports 608 arranged at opposing sides of the cavity 602. In some embodiments, the portion of the golf club head 600 may include more or less than two ports 608 arranged in any orientation that connects to the cavity 602.

Figure 56:
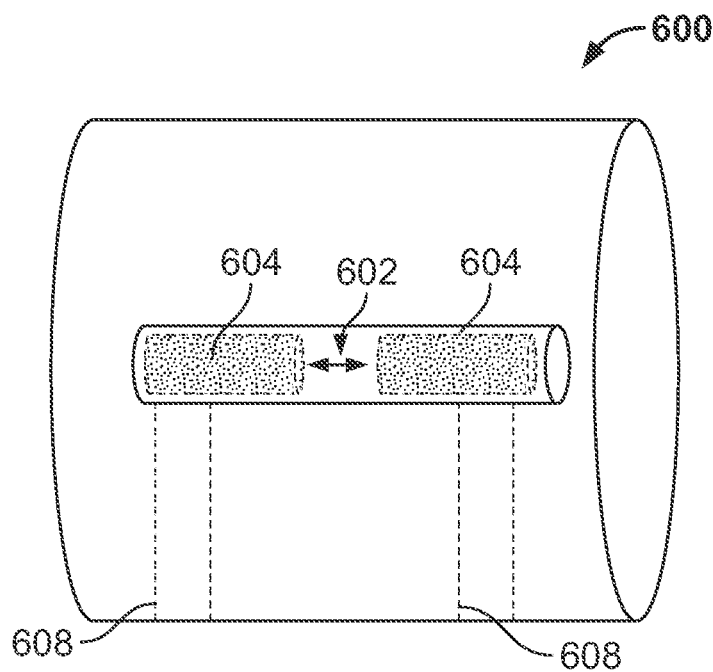
FIG. 56 is a schematic illustration of the portion of the golf club head of FIG. 55 showing the movability of the plug.

After the portion of the golf club head 600 is manufactured, pressurized fluid (e.g., gas), a vacuum, a brush, a tool, or gravity may be applied to the one or more ports 608 to remove the excess metal powder 606 surrounding the plug 604. As illustrated in FIG. 56, once the metal powder 606 is removed, the plug 604 may be free to move within the cavity 602. In this way, for example, a position of the plug 604 may be manipulated to alter a weight distribution within the portion of the golf club head 600. In the illustrated embodiment, the cavity 602 and the weight or plug 604 defines a generally cylindrical shape. In some embodiments, the cavity 602 and the weight or plug 604 may define any shape (e.g., rectangular, polygonal, or any other 3-D shape) as required by the shape and structure defined by the portion of the golf club head 600 within which the cavity 602 is arranged. For example, in some embodiments, the cavity 602 and the plug or weight 604 may define similar shapes. In some embodiments, the weight or plug 604 may define a different shape than the cavity 602 as long as the weight or plug 604 is capable of displacing with in the cavity 602, once the excess material is removed from the cavity 602.

In the illustrated embodiment, the design and shape of the cavity 602 and the plug 604 enable the weight distribution to be moved in a lateral direction (e.g., left and right from the perspective of FIG. 56). In some embodiments, the design and shape of the cavity 602 and the plug 604 may be altered to enable the weight distribution within the portion of the golf club head 600 to be moved in any direction, as desired. For example, the cavity 602 and the plug 604 may be designed to allow for the weight distribution to me moved in a heel-toe direction, a sole-topline direction, an oblique direction, and/or between a front face and a rear face within the portion of the golf club head 600. Moving the weight distribution, via movement of the plug 604 to a desired location may alter the performance characteristics of a golf club head, for example, by moving the CG and/or placing more weight in a heel or a toe of the golf club head.

Once the plug 604 is positioned in a location within the cavity 602 according to a desired weight distribution, the cavity 602 may be filled with a low-density filler material to secure the position of the plug 604 within the cavity 602. For example, the low-density filler material may be a plastic material, a resin material, and/or a foam material.

In some embodiments, binder material may be selectively added around solid portions of a golf club head to form a border or shell surrounded by metal powder. Then, during the sintering post-processing stage the metal powder enclosed within the border may solidify forming the appropriate solid portion of a golf club head. In this way, for example, use of a binder during a binder jetting process may be reduced while printing golf club heads, thereby improving manufacturing costs and efficiency.

As described herein, at least a portion of a golf club head that is manufactured using an additive manufacturing process may include a solid portion (e.g., a volume region that is intended to be solid metal in the factory finish part). In some embodiments, an additive manufacturing process according to the present disclosure may improve efficiency and quality of the manufactured part by forming a boundary that includes at least one layer around a portion of a golf club head and post-processing the portion of the golf club head form the portion of the golf club head within the boundary as a solid portion.

For example, as described herein, the material deposit 208 formed on the post-printed component 204 and the solid portion 349 on the iron-type golf club head 300 may be formed from solid material (e.g., solid metal). In some embodiments, these solid material portions on a golf club head may be formed using an additive manufacturing process by printing a boundary that includes at least one layer of printed material and surrounds a volume of unprinted material (e.g., metal powder). For example, the material deposit 208 or the solid portion 349 may be formed by printing a boundary that encloses a volume and is formed by at least one layer during an additive manufacturing process. The volume enclose by the boundary may be filled with powdered metal and, thereby, may be constrained (i.e., cannot move) within the volume. The manufactured golf club head may then by sintered, which transitions the powdered metal enclosed within the volume to solid material (e.g., solid metal). By only requiring at least one layer of material to form a solid volume on a golf club head, the amount of time, binder material (e.g., for a binder jetting process), and/or power (e.g., for a SLM or a DMLS process) may be reduced, which may provide reduced costs and increase efficiency during the additive manufacturing process.

Figure 57:
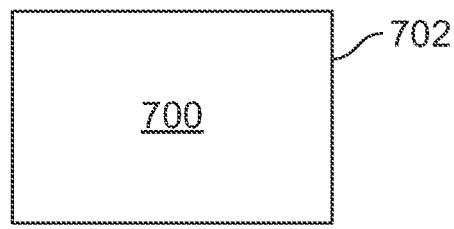
FIG. 57 is a schematic illustration of a generally rectangular boundary manufactured around a powdered metal filler.
Figure 58:
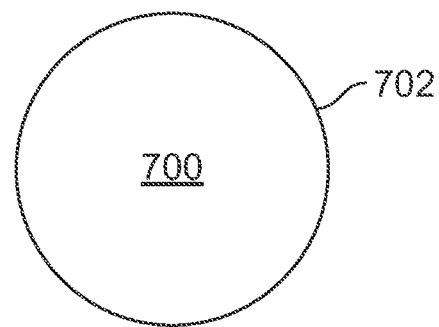
FIG. 58 is a schematic illustration of a generally round boundary manufactured around a powdered metal filler.
Figure 59:
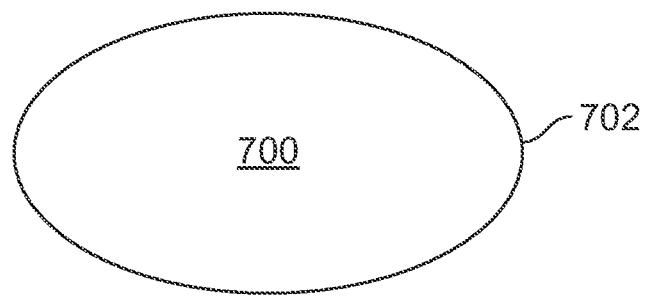
FIG. 59 is a schematic illustration of a generally oval or elliptical boundary manufactured around a powdered metal filler.

FIGS. 57-59 illustrate embodiments of a cross-section of a solid volume of a golf club head that is manufactured during an additive manufacturing process. In the illustrated embodiments, a solid volume 700 includes a boundary 702. In some embodiments, the boundary 702 may be formed by at least one layer that is created during an additive manufacturing process. In some embodiments, the boundary 702 may be formed by at least two, at least three, at least four, or five or more layers during an additive manufacturing process. The boundary 702 may enclose the solid volume 700 and the powdered metal arranged within the solid volume 700. The powdered metal enclosed by the boundary 702 may be maintained or supported by the boundary 702 (i.e., prevented from displacing after the additive manufacturing process), once the boundary 702 is fully formed. With the boundary 702 fully formed, the powdered metal enclosed therein may be formed into solid metal via a sintering process. In some embodiments, forming solid metal portions in a golf club head via sintering powdered metal enclosed by a boundary may produce higher densities when compared to solid metal portions that are formed completely layer by layer. In this way, for example, the cost and efficiency of the additive manufacturing process may be improved for creating a golf club head and the quality of the manufactured part may be improved.

As illustrated in FIGS. 57-59, the cross-sectional shapes of the solid volumes 700 may take various shapes and sizes. In the illustrated embodiments, the boundary 702 formed around the solid volume 700 may be a rectangular, a round, or an oval shape. In some embodiments, the boundary 702 and/or the solid volume 700 may take any shape or size that is required by the desired factory finish golf club head. For example, any solid portion of a golf club head may be enclosed with a boundary that takes any shape, and the golf club head may be sintered to transition the volume enclosed by the boundary into solid material.

As described herein, additive manufacturing provides several design, manufacturing, and performance benefits for golf club heads. Additive manufacturing also provides several advantages to the development or prototyping of golf club heads. For example, an entire set of iron-type golf club heads may be printed within a single build platform (e.g., a powdered metal bed used in binder jetting, DMLS, SLM, etc.). As such, an entire set of iron-type golf club heads may be printed and tested in a single build job, which differs, for example, from a forging process where the golf club heads are formed one at a time. Alternatively or additionally, multiple iterations of a golf club head design may be printed and tested during a single build job.

As described herein, in some embodiments according to the present disclosure, at least a portion of a golf club head may be manufactured via an additive manufacturing process. In some embodiments, a golf club head may be at least partially manufactured, or at least partially formed via a mold that is manufactured, via an additive manufacturing process. For example, a face insert that defines a striking face or a front face of a golf club head may be designed to include a 3-D structure that improves performance. In some embodiments, a rear side of a front face on a golf club head may include a lattice structure or a ribbed structure.

Figure 60:
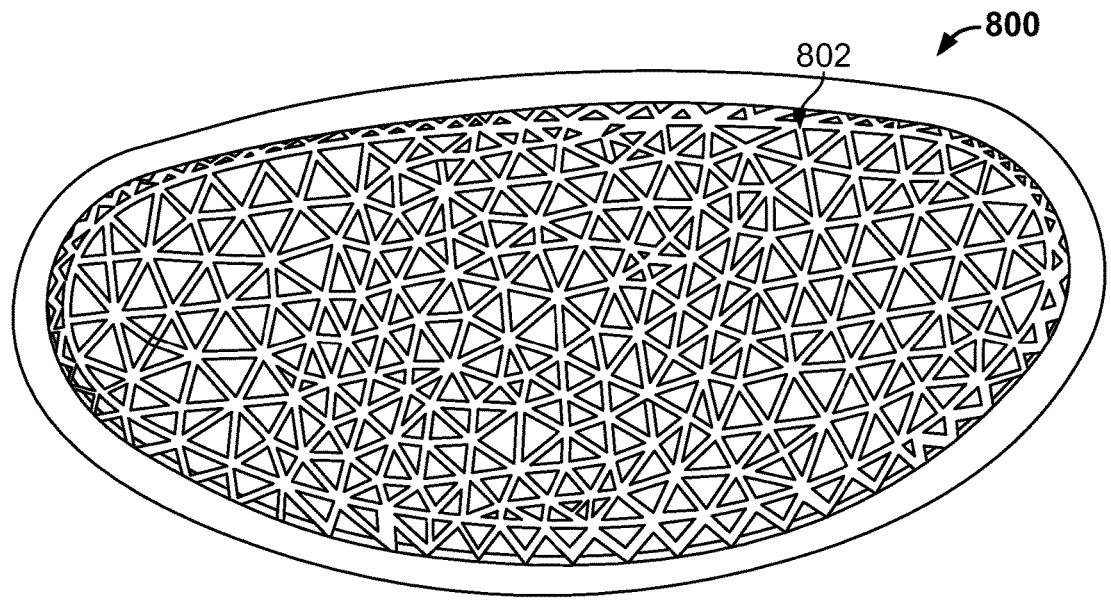
FIG. 60 is a rear view of a front face or striking face of a wood-type golf club head including a lattice structure.

For example, as illustrated in FIG. 60, a face insert 800 defines a front face or striking face of a wood-type golf club head and may include a lattice structure 802 arranged on a rear side of the front face or striking face. In the illustrated embodiment, the lattice structure 802 includes generally triangularly-shaped unit cells that vary in density, surface area, or volume along the rear side of the face insert 800. In some embodiments, the lattice structure 802 may define any size or shape according to the lattice structures described herein. In any case, the lattice structure 802 may vary in one or more of unit cell type, unit cell geometry, unit cell size, segment length, segment, thickness, segment volume, and unit cell density at one or more locations along the rear side of the face insert 800. In some embodiments, the variability in the lattice structure 802 along the rear side of the face insert 800 may provide improved performance, when compared to a lattice structure with constant properties.

In some embodiments, the incorporation of a lattice structure into a striking face on a wood-type golf club head may enable the striking face to define a reduced thickness, for example, when compared to a striking face fabricated solely from a solid material, due to the stiffness provided by the lattice structure. That is, the incorporation of a lattice structure, or a ribbed structure (see FIG. 61), on a striking face of a wood-type golf club head may provide added stiffness, which enables a thickness of the solid portion (i.e., a thickness defined by the portion of the striking face that does not include an added 3-D structure) to define a reduced thickness when compared to a striking face fabricated solely from solid material.

Figure 61:
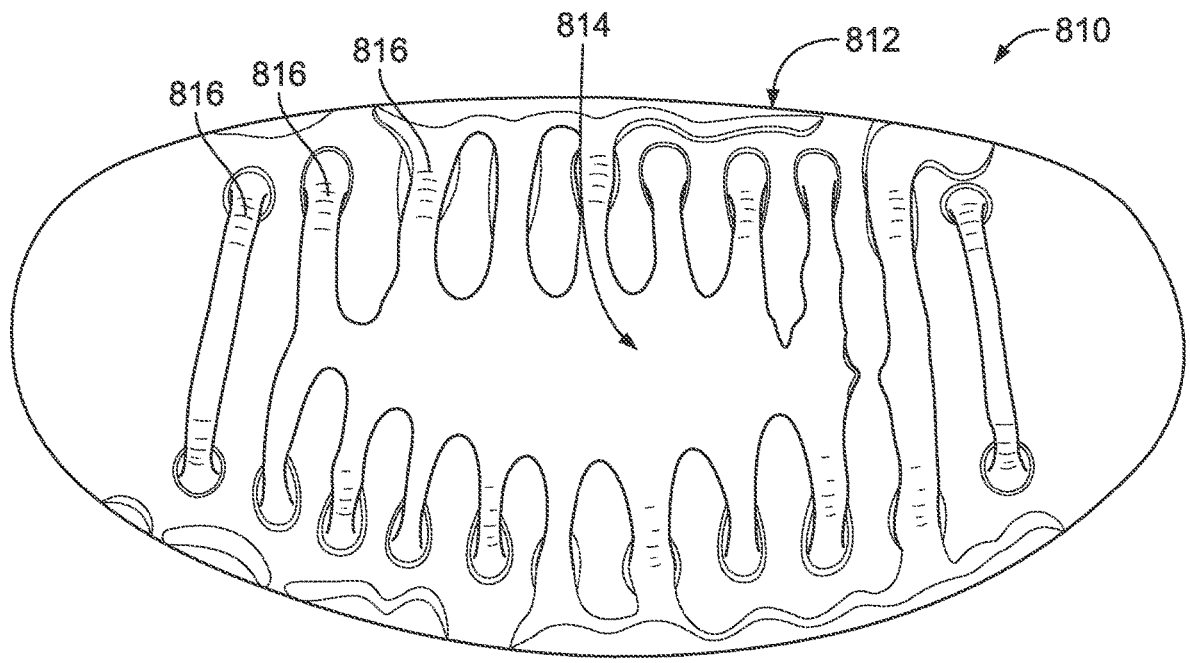
FIG. 61 is a rear view of a front face or striking face of a wood-type golf club head including a ribbed structure.

Turning to FIG. 61, in some embodiments, a face insert 810 may include of a wood-type golf club head may include a ribbed structure 812 arranged on a rear side of a striking face. In the illustrated embodiment, the ribbed structure 812 may include a solid portion 814 that defines a generally solid protrusion that protrudes from the rear side of the face insert 810 and a plurality of ribbed segments 816 that extend along the rear side of the striking face (e.g., generally in a sole-topline direction or a vertical direction from the perspective of FIG. 61). The plurality of ribbed segments 816 may be spaced laterally (e.g., in a left-right direction from the perspective of FIG. 61) along the rear side of the face insert 810.

Figure 62:
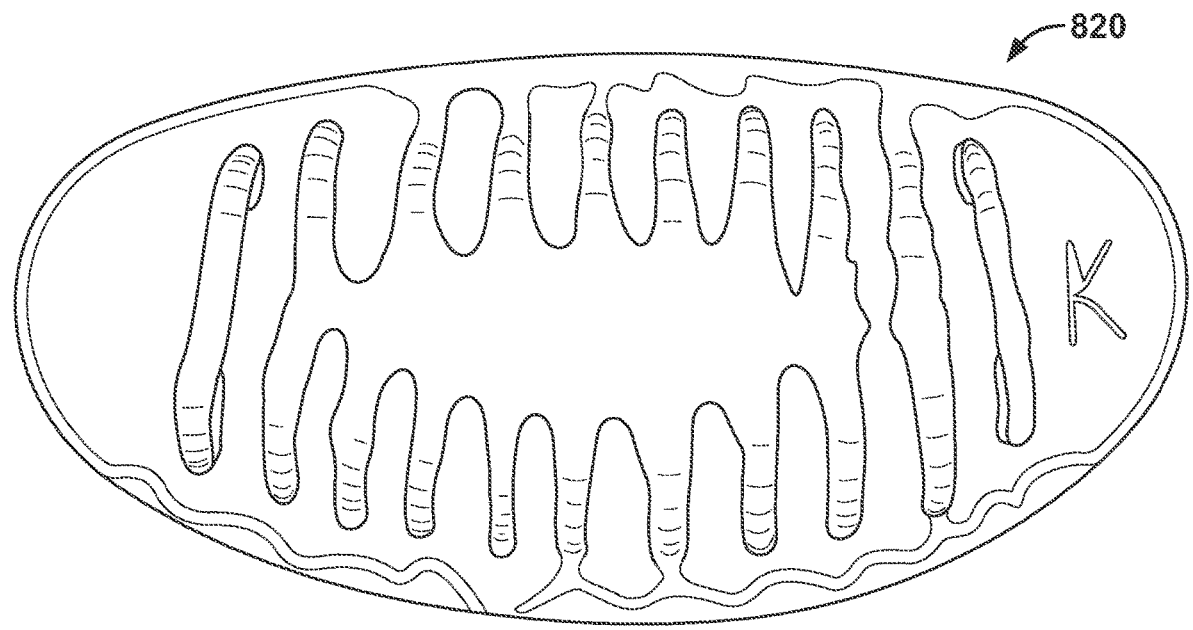
FIG. 62 is a rear view of a front face or striking face wax mold for a wood-type golf club head including a ribbed structure.
Figure 63:
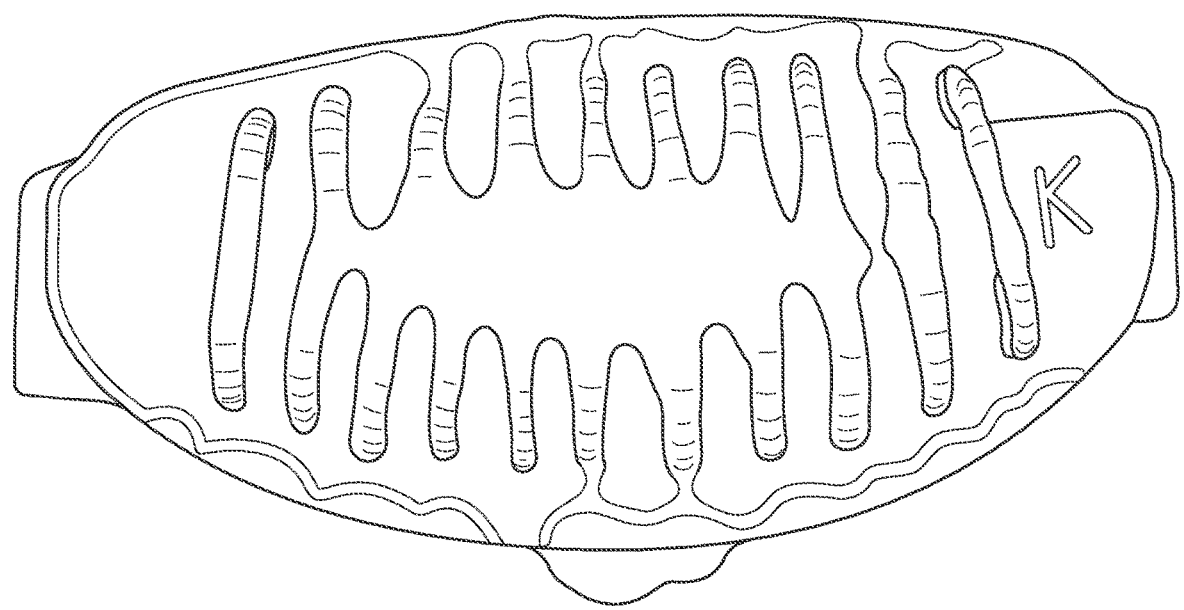
FIG. 63 is a rear view of a front face or striking face for a wood-type golf club head formed from a casting made from the wax mold of FIG. 62.

In some embodiments, the 3-D structures incorporated onto the striking faces of wood-type golf club heads may be difficult to manufacture using conventional manufacturing processes. Additive manufacturing processes may be leveraged to enable efficient and accurate manufacturing of these striking faces of wood-type golf club heads. For example, FIG. 62 illustrates a face insert 820 that is based on the face insert 810 and manufactured via an additive manufacturing process and may be used in a casting process. In some embodiments, the face insert 820 may be manufacturing out of an investment casting material (e.g., wax) and may be manufactured via an additive manufacturing process. In some embodiments, conventional, non-additive manufacturing processes may not be able to create the 3-D structure arranged on the rear side of the striking faces described herein, for example, do to the presence of a lattice structure, an undercut, or a gap. Additive manufacturing may be leveraged to efficiently and accurately manufacture a face insert 820. Once the face insert 820 is manufactured via an additive manufacturing process, the face insert 820 may be used to create a casting mold, or another mold (e.g., metal injection molding mold), of a striking face of a wood-type golf club head by shelling the mold with a slurry to form a shell. Once the shell has formed, the investment casting material (e.g., wax) may be burned out and metal may be poured into the cavity defined by the shell to form a casting of the face insert. As illustrated in FIG. 63, the casting mold or other type of mold may be used to manufacture the striking face of a wood-type golf club head with an accurate representation of the desired 3-D structure arranged on the rear side of the striking face. The manufactured striking face illustrated in FIG. 63 may then be post-processed to conform to factory finish standard and may be attached to a club head body.

Figure 64:
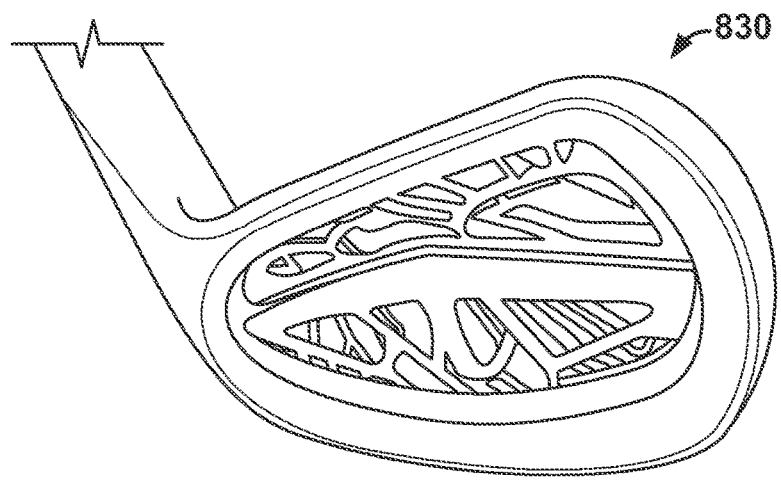
FIG. 64 is a top, back, right isometric view of a iron-type golf club head wax mold according to the present disclosure.
Figure 65:
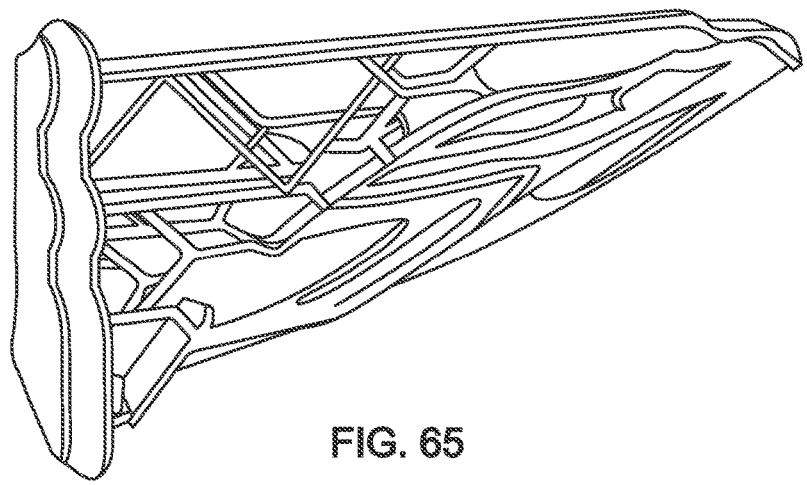
FIG. 65 is a front view of a 3-D structure of the iron-type golf club head wax mold of FIG. 64.
Figure 66:
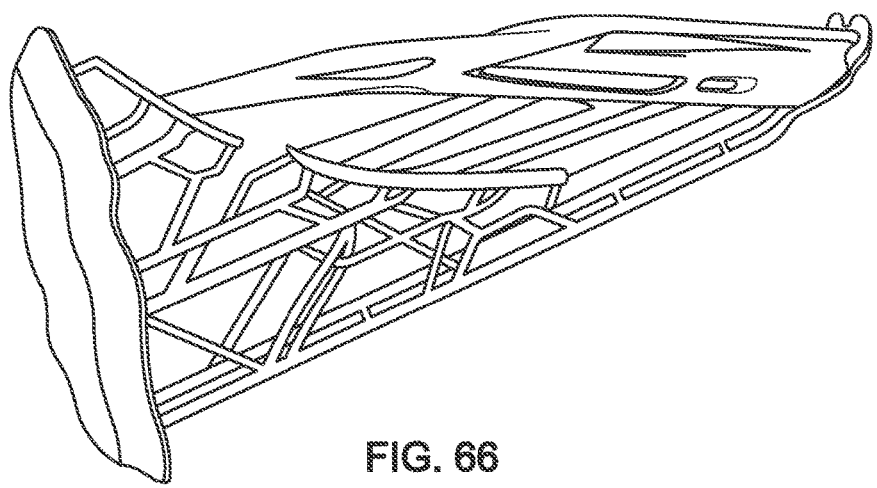
FIG. 66 is a back view of a 3-D structure of the iron-type golf club head wax mold of FIG. 65

In some embodiments, the additive manufacturing of a mold, or a structure that is used to make a mold in an investment casting process, may be used to manufacture iron-type golf club heads. For example, FIG. 64 illustrates a club head mold 830 for an iron-type golf club head that may be manufacture via an additive manufacturing process. In some embodiments, the club head 830 may be manufactured out of an investment casting material (e.g., wax). The manufacture of the club head 830 via an additive manufacturing process may enable the creation of unique undercuts and intricate geometries, for example, arranged on a rear surface or rear cavity of an iron-type golf club head, among other locations. For example, FIGS. 65 and 66 illustrated a 3-D structure that may be incorporated into the club head 830 of FIG. 64.

In general, the use of a wax pattern mold that is printed via an additive manufacturing process may increase efficiency, decrease costs, and enable the creation of more complex club head geometries, when compared to convention manufacturing processes. For example, creating a wax pattern mold via an additive manufacturing process does not require tooling when creating a design of the mold. A 3-D model of the mold may be created in 3-D printing software, where conventional investment casting mold requires the creation of a wax tool. Once the part is designed in 3-D printing software, the wax pattern mold may be printed via an additive manufacturing process with casting gates, while conventional investment castings require wax to be injected into the wax tool.

Figure 67:
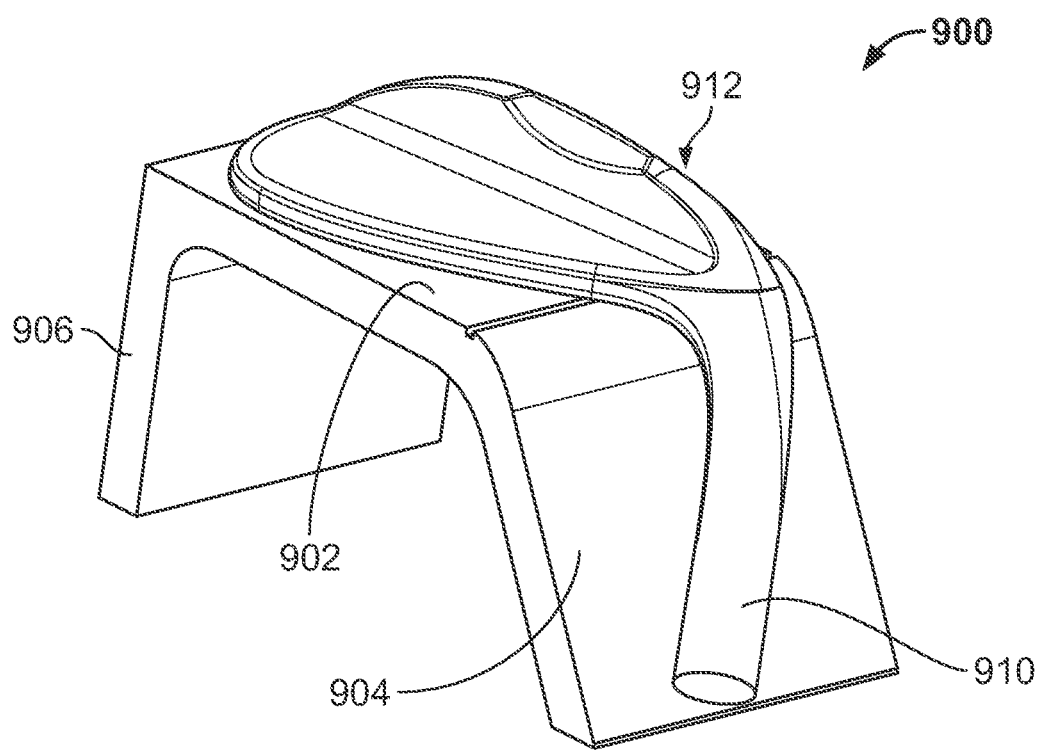
FIG. 67 is a top, front, left isometric view of a sintering support according to one aspect of the present disclosure.
Figure 68:
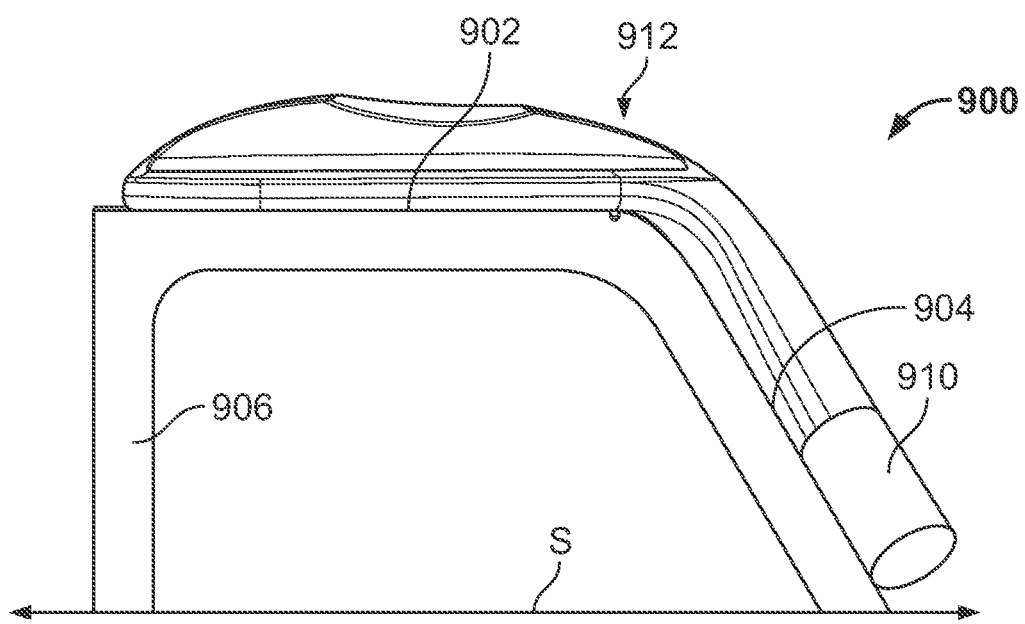
FIG. 68 is a front view of the sintering support of FIG. 67.

As described herein, in some embodiments, a golf club head may be required to be sintered after manufacture via an additive manufacturing process. In these embodiments, a support structure or fixture may be required to aid in maintaining orientation and shape of the green part during sintering. FIGS. 67 and 68 illustrated one embodiment of a sintering support 900 that may be used to support a golf club head during sintering. In the illustrated embodiment, the sintering support 900 may be used to support an iron-type golf club head during sintering. The sintering support 900 may include a face surface 902, a hosel surface 904, and a support wall 906. The hosel surface 904 may extend from one side of the face surface 902 at an angle that is defined by a lie angle of the golf club head. The support wall 906 may extend generally perpendicularly from a side of the face surface 902 that is opposite to the hosel surface 904.

In the illustrated embodiment, the face surface 902 may be arranged generally parallel to a sintering plane S that the sintering support 900 rests on during sintering. In this way, for example, when a golf club head is arranged on the sintering support 900, the face surface 902 orients a front face or striking face of a golf club head generally parallel to the build plane and provides support to the front face or striking face. The arrangement and support of the front face or striking face provided by the sintering support 900 aids in reducing or preventing warping of the golf club head geometry during sintering. In addition, the angle between the face surface 902 and the hosel surface 904 being equal to a lie defined by the golf club head further aids in reducing or preventing warping of the golf club head geometry during sintering.

Figure 69:
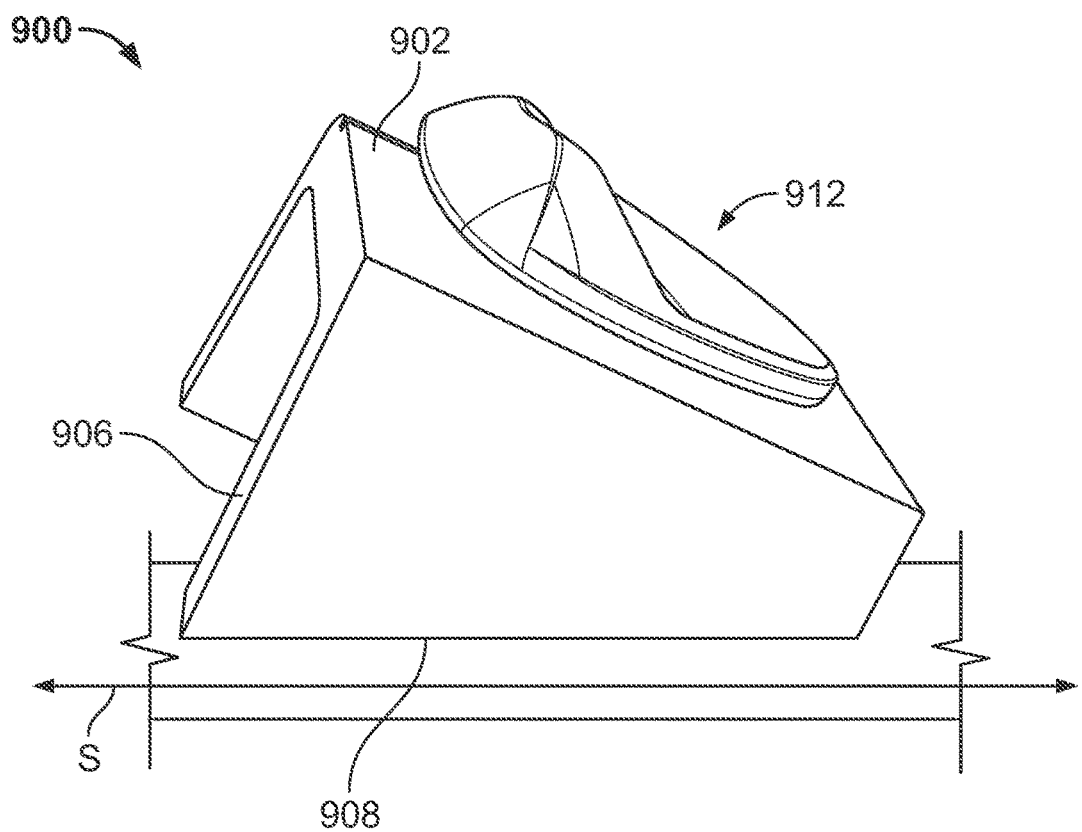
FIG. 69 is a right side view of a sintering support according to another aspect of the present disclosure.
Figure 70:
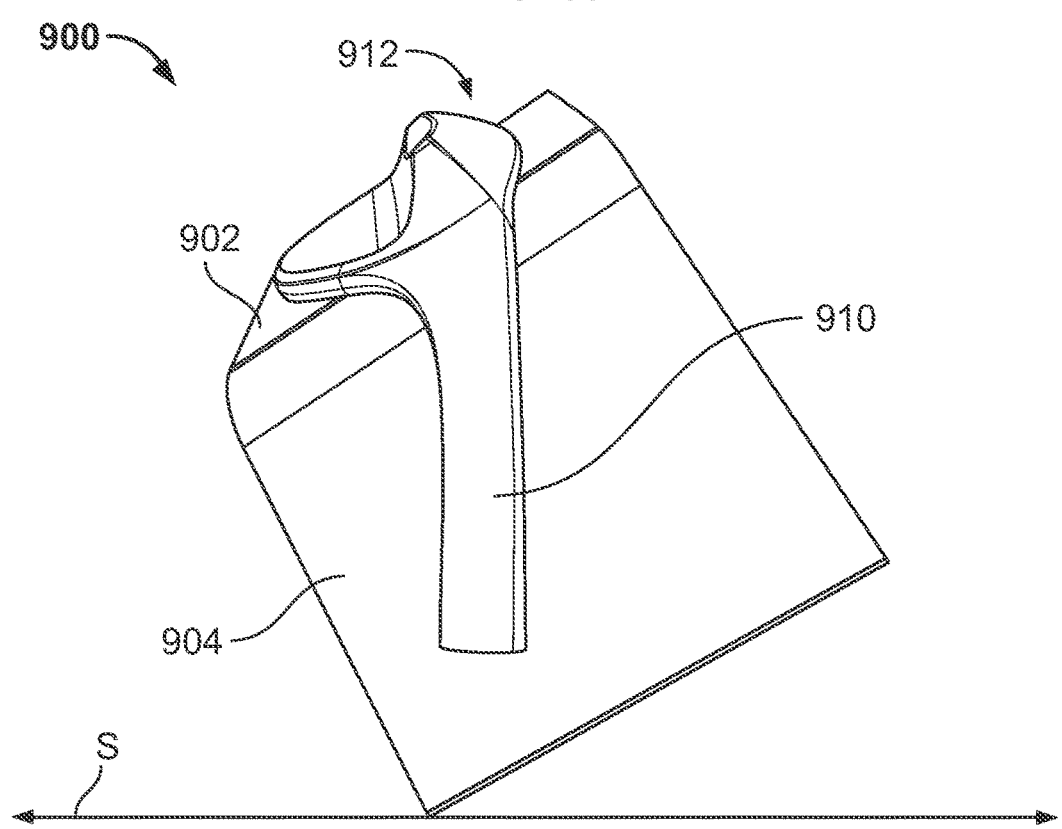
FIG. 70 is a left side view of a sintering support according to the present disclosure.

Referring to FIGS. 69 and 70, in some embodiments, the sintering support 900 may angle the golf club head supported thereon, such that a hosel of the golf club head is arranged generally perpendicular to the sintering plane S or generally parallel to a direction of gravity. In this way, for example, the sintering support 900 may further aid in preventing warping of the club head geometry during the sintering process. In the illustrated embodiment, a bottom edge 908 of the support wall 906 may be arranged at an angle relative to the face surface 902. When the bottom edge 908 of the support wall 906 is placed on the sintering plane P, the angle between the bottom edge 908 of the support wall 906 and the face surface 902 may arrange a hosel 910 of a golf club head 912 in a direction that is generally perpendicular to the sintering plane P or generally parallel to a direction of gravity. In this orientation, the face surface 902 may be angled relative to the sintering plane S. The orientation of the hosel 910 in a direction that is generally perpendicular to a direction of gravity may prevent movement of the hosel 910 during sintering, which maintains the lie and loft defined by the golf club head 912 pre-sintering.

In some embodiments, the sintering support 900 may be fabricated via an additive manufacturing process. For example, the face surface 902, the hosel surface 904, and the support wall 906 may be formed layer by layer by an additive manufacturing process.

Any of the embodiments described herein may be modified to include any of the structures or methodologies disclosed in connection with different embodiments. Further, the present disclosure is not limited to club heads of the type specifically shown. Still further, aspects of the club heads of any of the embodiments disclosed herein may be modified to work with a variety of golf clubs.

As noted previously, it will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. Various features and advantages of the invention are set forth in the following claims.

INDUSTRIAL APPLICABILITY

Numerous modifications to the present disclosure will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

We claim:

1. A process of manufacturing a golf club component, comprising:
spreading a thin layer of metal powder over a build plane defined over a build platform;
bonding, using a laser, portions of the thin layer of metal powder, wherein the spreading and bonding are repeated until the golf club component is formed;
cooling the golf club component; and
extracting loose powder from the golf club component,
wherein the golf club component comprises a lattice structure positioned within an internal cavity of the golf club component and the lattice structure is interrupted by a solid portion that extends along a bottom side of the golf club component from a toe region of the golf club component to a location between the toe region and a heel region of the golf club component,
wherein a cavity extends into the solid portion and a weight is positioned within the cavity of the solid portion.

2. The process of manufacturing the golf club component of claim 1, wherein the weight is attached or secured within the cavity via a sintering process.

3. The process of manufacturing the golf club component of claim 1, wherein the weight is formed by a metal injection molding process.

4. The process of manufacturing the golf club component of claim 1, wherein the lattice structure defines a hybrid structure that varies in one or more of unit cell type, unit cell geometry, unit cell size, segment length, segment thickness, segment volume, and unit cell density at one or more locations along the lattice structure.

5. The process of manufacturing the golf club component of claim 1, wherein the golf club component includes an externally visible lattice structure.

6. The process of manufacturing the golf club component of claim 1, wherein the step of extracting loose powder from the golf club component includes removing any loose metal powder from the golf club component.

7. The process of manufacturing the golf club component of claim 1, wherein the build plane is rotationally offset from a ground plane, the ground plane defined as a horizontal plane parallel to the ground when the golf club component is at address.

8. A process of manufacturing a golf club component, comprising:
spreading a thin layer of metal powder over a build plane defined over a build platform; and
bonding, using a laser, portions of the thin layer of metal powder, wherein the spreading and bonding are repeated until the golf club component is formed;
wherein the golf club component comprises a lattice structure positioned within an internal cavity of the golf club component, and wherein the lattice structure is formed by a plurality of segments,
wherein the lattice structure defines a lattice plane L1 that forms a lattice build angle A1 with respect to the build plane, and a lattice plane L2 that forms a lattice build angle A2 with respect to the build plane, each of the lattice plane L1 and the lattice plane L2 is formed by a portion of the plurality of segments that are aligned and orientated at the lattice build angle A1 and the lattice build angle A2, respectively, relative to the build plane, and
wherein each of the lattice build angle A1 and the lattice build angle A2 is greater than or equal to 30 degrees.

9. The process of manufacturing the golf club component of claim 8, wherein the lattice structure defines a lattice plane L3 that forms a lattice build angle A3 with respect to the build plane, and a lattice plane L4 that forms a lattice build angle A4 with respect to the build plane, each of the lattice plane L3 and the lattice plane L4 is formed by a portion of the plurality of segments that are aligned and orientated at the lattice build angle A3 and the lattice build angle A4, respectively, relative to the build plane.

10. The process of manufacturing the golf club component of claim 9, wherein each of the lattice build angle A3 and the lattice build angle A4 is greater than or equal to 30 degrees.

11. The process of manufacturing the golf club component of claim 9, wherein each of the lattice plane L1, the lattice plane L2, the lattice plane L3, and the lattice plane L4 extend in varying directions and form a plurality of intersection points where one or more of the plurality of segments that form the lattice plane L1, the lattice plane L2, the lattice plane L3, and the lattice plane L4 intersect.

12. The process of manufacturing the golf club component of claim 8, wherein the build plane is orientated parallel to a line that extends perpendicularly through a front face of the golf club component.

13. The process of manufacturing the golf club component of claim 8, wherein the lattice structure is formed by a plurality of gyroid structures.

14. The process of manufacturing the golf club component of claim 8, wherein the build plane is rotationally offset from a ground plane, the ground plane defined as a horizontal plane parallel to the ground when the golf club component is at address.

15. The process of manufacturing the golf club component of claim 8, wherein the golf club component includes an externally visible lattice structure.

16. A process of manufacturing a golf club component, comprising:
   printing a material, layer by layer, along a build plane to form a printed part; and
   sintering the printed part to form the golf club component, wherein, during the step of sintering, the printed part is resting on a sintering plane that is angled with respect to the build plane.

17. The process of manufacturing the golf club component of claim 16, wherein the golf club component comprises a lattice structure,
   wherein the lattice structure is formed by a plurality of segments,
   wherein each of the plurality of segments defines a lattice plane,
   wherein each of the lattice planes is angled with respect to the build plane and a ground plane, and
   wherein the ground plane is defined as a horizontal plane parallel to the ground when the golf club component is at address.

18. The process of manufacturing the golf club component of claim 16, wherein the build plane is offset from a ground plane by between about 5 degrees and about 160 degrees,
   wherein the ground plane is defined as a horizontal plane parallel to the ground when the golf club component is at address, and
   wherein the build plane is not a face angle of the golf club component.

19. The process of manufacturing the golf club component of claim 16, wherein the sintering plane is defined by a sintering support surface, and
   wherein the sintering plane is arranged to be non-parallel relative to the build plane.

20. The process of manufacturing the golf club component of claim 1, wherein the lattice structure defines a variable structure that varies in one or more of unit cell type, unit cell geometry, unit cell size, segment length, segment thickness, segment volume, and unit cell density at one or more locations along the lattice structure.

* * * * *

UNITED STATES PATENT AND TRADEMARK OFFICE
CERTIFICATE OF CORRECTION

| | |
|---|---|
| PATENT NO. | : 12,269,209 B2 |
| APPLICATION NO. | : 18/436759 |
| DATED | : April 8, 2025 |
| INVENTOR(S) | : Ryan L. Roach et al. |

Page 1 of 1

It is certified that error appears in the above-identified patent and that said Letters Patent is hereby corrected as shown below:

In the Specification

Column 13, Line 45, "mayor" should be --may or--.

Signed and Sealed this
Twenty-seventh Day of May, 2025

Coke Morgan Stewart
*Acting Director of the United States Patent and Trademark Office*